United States Patent [19]
Tomida et al.

[11] Patent Number: 5,661,564
[45] Date of Patent: Aug. 26, 1997

[54] FACSIMILE SYSTEM OPERABLE IN TONER SAVE MODE, DEPENDING UPON IMPORTANCE OF ORIGINAL IMAGE

[75] Inventors: Wataru Tomida, Owariasahi; Kazunobu Asai, Nagoya, both of Japan

[73] Assignee: Brother Kogyo Kabushiki Kaisha, Nagoya, Japan

[21] Appl. No.: 423,867

[22] Filed: Apr. 18, 1995

[30] Foreign Application Priority Data

Apr. 25, 1994 [JP] Japan .................... 6-086203

[51] Int. Cl.⁶ .................... H04N 1/387; H04N 1/32; G03G 21/00
[52] U.S. Cl. .................... 358/296; 358/298; 358/468; 399/45; 399/85; 399/138
[58] Field of Search .................... 358/296, 298, 358/400, 401, 434, 462, 464, 468, 486; 399/45, 85, 138, 151

[56] References Cited

U.S. PATENT DOCUMENTS

| | | | |
|---|---|---|---|
| 4,821,068 | 4/1989 | Honma et al. | 399/51 |
| 5,124,732 | 6/1992 | Manzer et al. | 399/9 X |
| 5,235,384 | 8/1993 | Oka et al. | 399/27 |
| 5,355,200 | 10/1994 | Ohba et al. | 355/246 |
| 5,483,625 | 1/1996 | Robertson et al. | 395/117 |
| 5,581,358 | 12/1996 | Seto et al. | 358/298 |
| 5,583,621 | 12/1996 | Narukawa | 399/58 |

FOREIGN PATENT DOCUMENTS 2-144574  6/1990  Japan .................... B41J 3/12

*Primary Examiner*—Eric Frahm
*Attorney, Agent, or Firm*—Oliff & Berridge

[57] ABSTRACT

A facsimile system wherein an original image is recorded in a matrix of dots by application of a toner to local spots on a recording medium, and which includes a non-toner-save controller for recording the original image in a non-toner-save mode, a toner-save controller for recording a toner-save image in a toner-save mode such that the toner-save image generated on the basis of the original image has a lower density of image dots than the original image, and a mode selector for activating one of the non-toner-save controller and the toner-save controller to select the corresponding non-toner-save or toner-save recording mode, on the basis of a degree of importance of the subject matter or content of the original image data.

16 Claims, 36 Drawing Sheets

NON-IRRADIATED LOCAL SPOTS (AT WHICH IMAGE DOTS ARE NOT FORMED)

IRRADIATED LOCAL SPOTS (AT WHICH IMAGE DOTS ARE FORMED)

FIG. 29

ENCODED IMAGE DATA

| ADDRESS | COMPRESSED CODED DATA | | | | |
|---------|------|------|---|------|------|
| 0000 | X1 | X2 | | X255 | X256 |
| 0100 | X257 | X258 | | X511 | X512 |
| ⋮ | ⋮ | ⋮ | | ⋮ | ⋮ |

FIG. 30

DECODED IMAGE DATA (DOT DATA)

| LINE | ADDRESS | DOT DATA | | | | |
|------|---------|-----|-----|---|------|------|
| 1 | 0000 | Y1 | Y2 | | Y215 | Y216 |
| 2 | 00D8 | Y217 | Y218 | | Y431 | Y432 |
| | | ⋮ | ⋮ | | ⋮ | ⋮ |
| BYTE NUMBER → | | 1 | 2 | | 215 | 216 |

FIG.31

| RESOLUTION | | K | K |
|---|---|---|---|
| OWN RESOLUTION | REMOVE FACSIMILE RESOLUTION | | |
| SUPER-FINE | STANDARD | 4 | 2 |
| SUPER-FINE | FINE | 2 | 2 |
| FINE | STANDARD | | |
| SAME RESOLUTION | | 1 | 2 |

FIG. 34
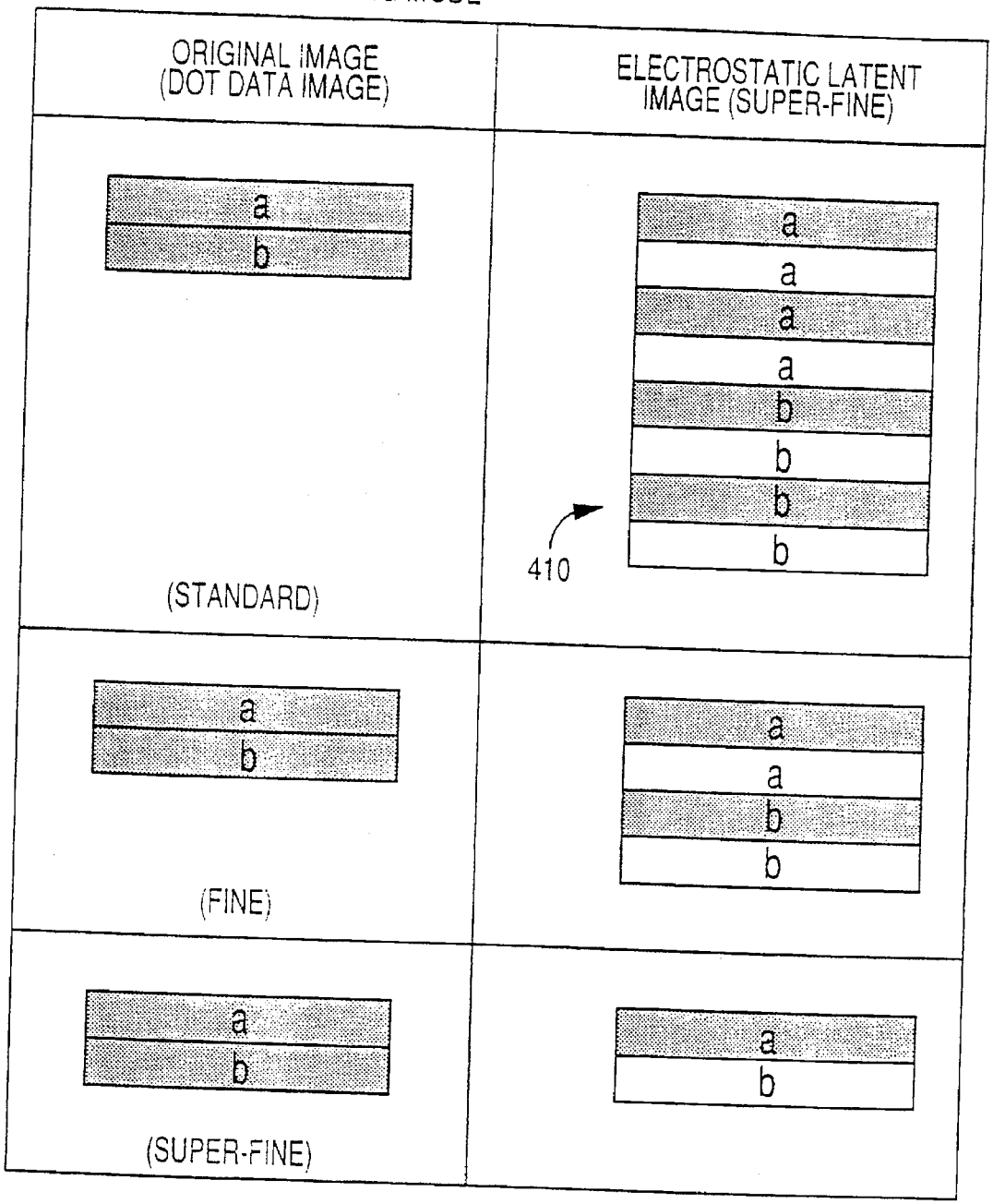
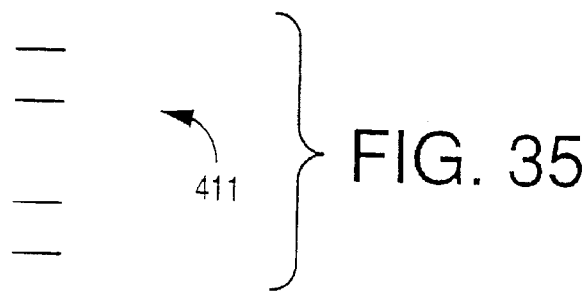
FIG. 35

FIG. 39

MODIFIED DECODED IMAGE DATA

| LINE | ADDRESS | DOT DATA | | | | |
|------|---------|------|------|---|------|------|
| 0 | 0000 | 0 | 0 | | 0 | 0 |
| 1 | 00D8 | Y1 | Y2 | | Y215 | Y216 |
| 2 | 01B0 | Y217 | Y218 | | Y431 | Y432 |
|   |   | ⋮ | ⋮ | | ⋮ | ⋮ |

FACSIMILE SYSTEM OPERABLE IN TONER SAVE MODE, DEPENDING UPON IMPORTANCE OF ORIGINAL IMAGE

BACKGROUND OF THE INVENTION

1. Field of the Invention

The present invention relates to a facsimile system having an image recorder or printer capable of recording an image using a toner.

2. Discussion of the Related Art

In a recording or printing apparatus having a recording portion adapted to reproduce an image with a toner, it is desired to save the toner, namely, minimize the amount of consumption of the toner. An example of an image recording apparatus which is operable in a toner save mode for reducing the toner consumption is disclosed in JP-A-2-144574 (published in 1990), which includes (a) a recording portion for recording an image on a recording medium, in a matrix of dots such that image dots are formed by deposition of a toner at selected ones of local spots which correspond to picture elements of the matrix, (b) a non-toner-save control portion for controlling the recording portion in a non-toner-save mode according to original image data representative of an original image to be reproduced, (c) a toner-save control portion for controlling the recording portion in a toner-save mode according to toner-save image data representative of a toner-save image whose density of image dots is lower than that of the original image and which is recognizable as an image similar to the original image, and (d) an operator-controlled mode selector switch for selecting one of the non-toner save and toner-save control portions to effect recording in the corresponding one of the non-toner-save and toner-save modes.

The toner-save control portion for controlling the recording portion in the toner-save mode includes image-dot determining means for determining, on the basis of the original image data, whether an image dot is formed at each local spot or picture element position of the matrix. The image-dot determining means is adapted to generate toner-save image data so that where image dots are to be formed at two or more successive local spots in a line (row) or column of the dot matrix according to the original image data, the image dots to be actually formed are omitted at every other local spot of those successive local spots. If the image dots are to be formed according to the original image data at three successive local spots in a certain line, for example, the image dot is actually omitted at the intermediate one of the three successive local spots. The omission of the image dots in a line or column is effected uniformly over the entire line or column.

Thus, the image-dot determining means of the toner-save control portion of the apparatus described above is arranged to perform a data processing operation for each local spot or picture element position of the dot matrix, to determine whether an image dot is actually formed at each local spot according to the toner-save image data.

When the non-toner-save control portion is selected by manual operation of the mode selector switch, the recording portion is controlled in the non-toner-save mode according to the original image data. When the toner-save control portion is selected by the mode selector switch, the recording portion is controlled in the toner-save mode according to the toner-save image data generated as described above.

Where the recording apparatus constructed as described above is used in a facsimile system, the amount of toner consumption by the system may be reduced.

However, the user of the facsimile system must manipulate the mode selector switch to select the toner-save or non-toner-save mode. This manipulation is cumbersome.

In this respect, it is noted that a facsimile system receives from a remote facsimile transmitter, facsimile data which include original image data representative of an original image to be reproduced. The non-toner-save mode or toner-save mode must be selected depending upon the degree of importance of the original image to be received. To this end, the user must check each original image to be received, and operate the mode selector switch. This procedure is cumbersome to the user.

In some situations, the user of the facsimile system is not able to know the content of the facsimile data to be received from a remote facsimile transmitter, and is not able to check the nature or importance of the image represented by the original image data. Some facsimile systems are adapted such that a recording operation is started after an indication of the remote facsimile transmitter is provided on a display. In this case, the user may estimate or guess the degree of importance of the image data to be received and operate the mode selector switch depending upon the estimated degree of importance of the image data. However, it is difficult for the user to estimate the importance of image data to be received if the facsimile system of the user does not display an identification of the remote facsimile transmitter prior to an image recording operation on the facsimile system in question. In this case, the user cannot manipulate the mode selector switch to select the appropriate one of the non-toner-save and toner-save modes.

SUMMARY OF THE INVENTION

It is therefore an object of the present invention to provide a facsimile system which is automatically placed in a toner-save mode without user's manipulation of a mode selector switch, depending upon the degree of importance of image data which have been received.

The above object may be achieved according to the principle of the present invention, which provides a facsimile system comprising: (a) facsimile data memory means for storing facsimile data; (b) image data generating means for generating original image data on the basis of the facsimile data, the original image data representing an original image; (c) a recording portion for effecting a recording operation on a recording medium in a matrix of dots by selective application of a toner to local spots on the medium, the local spots corresponding to picture elements of the dot matrix; (d) a non-toner-save control portion for controlling the recording portion according to the original image data to form the original image in a non-toner-save recording mode; (e) a toner-save control portion for controlling the recording portion according to a toner-save image data to form a toner-save image in a toner-save recording mode, the toner-save image having a lower density of image dots than the original image and being recognizable as an image similar to the original image, the toner-save control portion generating the toner-save image data on the basis of the original image data; and (f) mode selector means for activating one of the non-toner-save control portion and the toner-save control portion to select a corresponding one of the non-toner-save and toner-save recording modes, on the basis of a degree of importance of a subject matter of the original image data.

The mode selector means comprises, for example, importance determining means for determining the degree of importance of the subject matter or content of the original image data, and selects the non-toner-save control portion or the toner-save control portion on the basis of a result of a determination made by the importance determining means. The importance of the original image data may be determined directly from the content of the original image data per se, or may be estimated on the basis of a part of the facsimile data stored in the facsimile data memory. In the former case, for example, the original image data representing a facsimile communication record indicative of facsimile communications that have been effected with a remote facsimile system, is determined to have a relatively low degree of importance. In the latter case, for example, the importance of the original image data is estimated on the basis of ancillary data of the facsimile data. The ancillary data are data associated with facsimile communication between the present facsimile system and a remote facsimile system from which the present facsimile system have received the facsimile data. The ancillary data include, for instance, data indicative of the facsimile number of the remote facsimile transmitter.

In the facsimile system of the present invention constructed as described above, either the non-toner-save control portion or the toner-save control portion is automatically selected depending upon the importance of the subject matter of the original image data, to control the recording portion in the corresponding non-toner-save or toner-save recording mode. Thus, the present facsimile system does not require the user to determine the importance of the original image data and manipulate a mode selector switch to select the non-toner-save or toner-save recording mode. Accordingly, the user is not required to know the subject matter of the original image data, namely, the content of an image to be reproduced.

When the toner-save control portion is selected and activated by the mode selector means, the recording portion is controlled according to the toner-save image data in the toner-save recording mode to form the toner-save image. In the toner-save recording mode, the amount of consumption of the toner is smaller than in the non-toner-save recording mode in which the recording portion is operated according to the original image data. The toner-save image data are formulated so that the toner-save image is recognizable as an image similar to the original image.

In one preferred form of the present invention, the facsimile data stored in the facsimile data memory means comprise primary data, and ancillary data associated with facsimile communication between the claimed present facsimile system and a remote facsimile system from which the present facsimile system receives the facsimile data. The facsimile data memory means comprises ancillary data memory means for storing the ancillary data of the facsimile data, and primary data memory means for storing the primary data. The image data generating means comprises means for generating the original image data on the basis of the primary data. Further, the present form of the invention is adapted such that the ancillary data memory means comprises remote party information memory means for storing remote party information indicative of the remote facsimile system, and the mode selector means comprises importance determining means for determining the degree of importance of the subject matter of the original image data, on the basis of the remote party information.

In the above preferred form of the invention, the importance determining means determines the degree of importance of the subject matter of the original image data corresponding to the primary data, on the basis of the remote party information which indicates the remote facsimile system. Described more specifically, the importance determining means determines that the subject matter of the original image data has a relatively high degree of importance, if the remote facsimile system indicated by the remote party information is expected to transmit the primary data whose subject matter is relatively important. If the remote facsimile system is expected to transmit the primary data whose subject matter is not relatively important, the importance determining means determines that the subject matter of the original image data has a relatively low degree of importance. Thus, the importance of the primary data received from the remote facsimile system is determined on the basis of the remote party information which identifies the remote facsimile system.

The remote party information is a part of the ancillary data of the facsimile data received from the remote facsimile system and is stored in the remote party information memory means, while the primary data of the facsimile data are stored in the primary data memory means, so that the image data generating means generates the original image data on the basis of the primary data.

In one advantageous arrangement of the above preferred form of this invention, the mode selector means further comprises remote facsimile receiver number-related memory means for storing number-related data related to a facsimile number of each of at least one remote facsimile receiver to which facsimile data are highly expected to be transmitted from the present facsimile system, and the remote party information comprises number-related data related to a facsimile number of the remote facsimile system from which the facsimile data have been received by the present facsimile system. In the present case, the importance determining means is adapted to determine the degree of importance of the subject matter of the original image data, by comparing the number-related data stored in the remote party information memory means with the number-related data stored in the remote facsimile receiver number-related memory means.

In the above arrangement, the importance of the subject matter of the original image data obtained from the primary data received from the remote facsimile system is determined depending upon whether the facsimile number of the remote facsimile system is found in the remote facsimile receiver number-related memory means, that is, is identical with any one of the facsimile numbers of the remote facsimile receivers which are stored in the remote facsimile receiver number-related memory means. Usually, the remote facsimile receivers whose numbers are stored in the remote facsimile receiver number-related memory means are expected to transmit primary data whose subject matters are relatively important.

The facsimile number of the remote facsimile system from which the primary data (facsimile data) have been received is stored as part of the remote party information in the remote party information memory means.

On the other hand, the facsimile or telephone numbers of the selected remote facsimile receivers (remote facsimile systems) to which the present facsimile system is expected to frequently transmit facsimile data are often stored in the remote facsimile receiver number-related memory means. Accordingly, it can be estimated with high accuracy that the importance of the primary data (image data) received from any one of the selected remote facsimile receivers is relatively high. Therefore, it is reasonable for the importance determining means of the mode selector means to determine that the importance of the subject matter of the original image data is relatively high, if the facsimile number of the remote facsimile system from which the facsimile data have been received is identical with the facsimile numbers stored in the remote facsimile receiver number-related memory means.

The mode selector means may be adapted to select the non-toner-save recording mode, if the remote facsimile system from which the facsimile data have been received is one of the selected remote facsimile receivers, namely, if the subject matter of the original image data (primary data) is determined to be important. According to this arrangement, the original image whose content is important is recorded in the non-toner-save recording mode, without saving the toner. On the other hand, however, the selected remote facsimile receivers who are expected to transmit important primary data can be relatively easily contacted to ask on the content of the transmitted primary data (original image data), if the toner-save image reproduced in the toner-save recording mode is illegible or invisible. This means that the mode selector means may be adapted to select the toner-save recording mode if the subject matter of the original image data is determined to be important.

The mode selector means may be arranged to activate the non-toner-save control portion or toner-save control portion to select the corresponding non-toner save or toner-save recording mode, according to a predetermined relationship between the determined importance of the subject matter of the original image data and the selected recording mode. As indicated above, one relationship is formulated to select the non-toner-save recording mode if the subject matter is important and select the toner-save recording mode if the subject matter is not important, while another relationship is formulated to select the non-toner-save recording mode if the subject matter is not important and select the toner-save recording mode if the subject matter is important. However, suitable operator-controlled means may be provided to enable the user of the present facsimile system to select one of the two relationships indicated above. In this case, the importance determining means of the mode selector means operates according to the relationship selected by the operator-controlled means.

The remote facsimile receiver number-related memory means may be adapted to store two groups of facsimile numbers of the remote facsimile receivers, one group consisting of the facsimile numbers of the remote facsimile receivers expected to transmit the relatively important primary data, and the other group consisting of the facsimile numbers of the remote facsimile receivers not expected to transmit the relatively important primary data. Alternatively, this memory means may be adapted to store three or more groups of facsimile numbers of the remote facsimile receivers, which groups correspond to different degrees of possibility that the remote facsimile receivers transmit the relatively important primary data. In the above cases, the importance determining means determines the importance or non-importance or the degree of importance of the original image data depending upon the group to which the facsimile number of the remote facsimile system (from which the facsimile data have been received) belongs.

In another advantageous arrangement of the above preferred form of this invention, the mode selector means further comprises reception facsimile number-related memory means for storing number-related data related to at least one of a plurality of reception facsimile numbers of the present facsimile system which are available for reception of facsimile data from remote facsimile transmitters, and the remote party information stored in the remote party information memory means comprises number-related data related to one of the reception facsimile numbers which has been called by the remote facsimile system from which the facsimile data have been received by the present facsimile system. In this arrangement, the importance determining means is adapted to determine the degree of importance of the subject matter of the original image data, by comparing the number-related data stored in the remote party information memory means, with the number-related data stored in the reception facsimile number-related memory means.

Usually, the users of the remote facsimile transmitters who are expected to transmit relatively important facsimile data are informed of the reception facsimile numbers that are available on the present facsimile system for reception of the facsimile data under a distinctive ringing service. Accordingly, if the facsimile number of the remote facsimile system from which the facsimile data have been received by the present facsimile system is identical with any one of those reception facsimile numbers stored in the reception facsimile number-related memory means, the original image data generated on the basis of the primary data of the facsimile data received from that remote facsimile system is estimated to have a relatively high degree of importance. Thus, the importance determining means of the mode selector means may determine the importance of the original image data on the basis of the data stored in the remote party information memory means and the reception facsimile number-related memory means.

In another preferred form of this invention, the matrix of dots is defined by a plurality of parallel lines extending in a first direction, and a plurality of parallel columns extending in a second direction perpendicular to the first direction, and the toner-save control portion generates the toner-save image data which include non-imaging data sets for inhibiting the application of the toner to all of the local spots which are arranged along selected ones of the parallel lines and/or the parallel columns of the matrix of dots, so that the toner-save image is partially defined by blank lines and/or blank columns of picture elements which correspond to the respective non-imaging data sets. The toner-save control portion controls the recording portion in the toner-save recording mode according to the toner-save image data which include the non-imaging data sets. The blank lines and blank columns appearing in the toner-save image as respective lines and columns represented by at least one equation L=M×m+p, where "L" represents the blank lines and columns, "M" is an integer not smaller than "2", "m" is an integer which increases from "0" in increment of "1", and "p" is an integer between "1" (inclusive) and "M" (inclusive).

In the above preferred form of the invention, the toner-save image data generated by the toner-save control portion include the non-imaging data sets for forming respective blank lines or blank columns along which no image dots are formed at the respective local spots by application of the toner, whereby the toner consumption is reduced in the toner-save recording mode. The blank lines or blank columns of the toner-save image correspond to the selected lines or columns of the matrix of dots, which are determined by at least one equation L=M×m+p as described below in detail.

In the above form of the invention, there are three different cases. In the first case, only the blank lines are formed. In the second case, only the blank columns are formed. In the third case, both the blank lines and the blank columns are formed. In the interest of simplification, the following description refers to the blank lines. The same description substantially applies to the blank columns. For improved data processing efficiency, however, it is generally desirable that the non-imaging data sets included in the toner-save image data consist solely of the data sets for the blank lines.

Where the positions of the blank lines are determined by a single equation L=M×m+p, a selected one of two or more successive lines is made blank. For example, the blank line appears every second line of the dot matrix if the value of the integer "M" used in a single equation L=M×m+p is equal to "2", and every third line of the dot matrix if the value of the integer "M" is equal to "3". That is, the integer "M" represents the number of successive lines of the dot matrix which belong to each group including one or more blank lines. If the integer "M" is equal to "4", for example, the fourth one of the four successive lines may be made blank, where the integer "p" is equal to "4".

Where the value of the integer "M" is "3" or more, two or more equations L=M×m+p may be used, so that each group of successive lines may include two or more blank lines. If the integer "M" is "3" two equations L=M×m+p may be used, for example. In this case, any combination of two lines selected from the group consisting of three successive lines may be made blank. For example, one equation is L=3×m+1 and the other equation is L=3×m+2. Namely, the integer "p" has different values "1" and "2" in the two equations (3×m+p). Similarly, the first and third lines, or the second and third lines may be made blank, by using different values of the integer "p".

Where the value of the integer "M" is "4", two or three equations L=4×m+p may be used. If the image dots are formed along the first line of each group of four successive lines, the following lines may be made blank, for instance: (i) second, third and fourth lines ("p"=2, 3, 4); (ii) second and fourth lines ("p"=2, 4); (iii) second and third lines ("p"=2, 3); and (iv) third and fourth lines ("p"=3, 4).

The value of the integer "p" in each equation L=M×m+p may be either variable or fixed. Where the value or values of the integer "p" is/are fixed, it is not necessary to determine the value or values of the integer "p" depending upon the type of the original image data, for example. In this case, the second line of each group is made blank where the integer "p" in the single equation "2×m+p) is "2", and the second and third lines are made blank where the integer "p" in one of the two equations L=3×m+p) is "2" while the integer "p" in the other equation L= 3×m+p is "3". The second, third and fourth lines are made blank where the values of the integer "p" in the three equations L=4×m+p are "2", "3" and "4" respectively.

It is possible to determine the value of the integer "M" used in the equation or equations L=M×m+p, depending upon the situation, for example, depending upon the type of the original image data. For instance, the value of the integer "M" is selected to be either "2" or "3". Further, if the value "M" in two equations L=M×m+p used is "3", for example, the values of the integer "p" may be suitably determined, for example, "2" and "3". In this case, the second and third lines are made blank.

In the present preferred form of the invention in which the toner-save image data include the non-imaging data sets for forming the blank lines and/or blank columns, the toner-save image data can be more efficiently and economically generated on the basis of the original image data, because the present arrangement does not require conventionally effected data processing to determine whether an image dot should be formed at each of the local spots in each of the parallel lines or parallel columns of the dot matrix. For example, the non-imaging data sets may be commands which merely cause a line feeding incremental rotation of a photosensitive drum of the recording portion, or dot data sets whose bits are all "0" commanding the absence of image dots at the respective local spots.

In a further preferred form of the invention, the mode selector means comprises importance determining means for determining the degree of importance of the subject matter of the original image data, directly on the basis of the original image data. Where the image data generating means includes means for generating communication record data on the basis of the ancillary data stored in the ancillary data memory means, the original image consists of a communication record indicative of facsimile communications between the present facsimile system and a remote facsimile system from which the facsimile data have been received. In this case, the importance determining means of the mode selector means determines that the communication record has a low degree of importance, and activates the toner-save control portion to control the recording portion for recording the communication record in said toner-save recording mode. Usually, the communication record is not so important, and is desirably recorded in the toner-save mode for reduced toner consumption.

In a still further preferred form of the invention, the mode selector means may comprise local importance determining means for determining that a predetermined portion of the original image data is important, and activates the non-toner-save control portion to control the recording portion according to the predetermined portion of the original image data in the non-toner-save recording mode, even if the toner-save control portion is activated to select the toner-save recording mode for the other portion of the original image data.

Generally, an initial portion of an original image represented by the original image data which are generated by the image data generating means on the basis of the primary data of the facsimile data is likely to include comparatively important information, such as the name of the remote facsimile transmitter from which the facsimile data have been received, and an identification of the subject matter of the original image. In this sense, it is desirable to select the toner-save recording mode for such initial portion of the original image.

The remote facsimile system from which the facsimile data have been received may have an image reading device which is adapted to read in a selected one of two reading modes, that is, a dither-matrix gray scale reading mode, and an ordinary reading mode. For example, a photograph portion of a page of image is read in the dither-matrix gray scale reading mode, while the other portion (i.e., descriptive portion consisting of characters) is read in the ordinary reading mode. In this case, the mode selector means of the present facsimile system selects the non-toner-save recording mode for the gray-scale portion of the original image which has been read in the dither-matrix gray scale mode in the remote facsimile system, and selects the toner-save recording mode for the other non-gray-scale portion of the original image which has been read in the ordinary reading mode in the remote facsimile system. The gray-scale portion may be detected on the basis of the ancillary data of the facsimile data received from the remote facsimile transmitter, or on the basis of the original image data represented by the primary data of the facsimile data. In the latter case, the gray-scale portion of the original image may be detected on the basis of the number of changes in the adjacent data bits (from "0" to "7" or vice versa) per unit volume of the original image data, more specifically, based on a fact that the gray scale portion generally has a relatively large number of changes in the adjacent data bits per unit volume of the original image data.

Thus, the selection of the non-toner-save and toner-save recording modes for each of different portions of the original image to be reproduced on the same page of the recording medium permits an adequate recording operation with the recording portion placed in the non-toner-save mode for the relatively important portion of the page and in the toner-save mode for the other portion of the page.

BRIEF DESCRIPTION OF THE DRAWINGS

The above and optional objects, features, advantages and technical significance of the present invention will be better understood by reading the following detailed description of presently preferred embodiments of the invention, when considered in connection with the accompanying drawings in which:

FIG. 29 is a view schematically showing encoded image data stored in the RAM of FIG. 20;

FIG. 30 is a view schematically showing decoded image data stored in the RAM;

FIG. 31 is a view showing a table stored in the ROM, which table represents a relationship between image resolutions and control constants used in a toner-save recording mode of the facsimile system;

FIG. 34 is a view schematically indicating an image recorded on the medium in the toner-save recording mode;

FIG. 35 is a view indicating a marking recorded on the medium in the toner-save recording mode;

FIG. 39 is a view schematically indicating modified decoded image data generated by a control device of a facsimile system according to a still further embodiment of the invention;

DETAILED DESCRIPTION OF THE PREFERRED EMBODIMENTS

Figure 1:
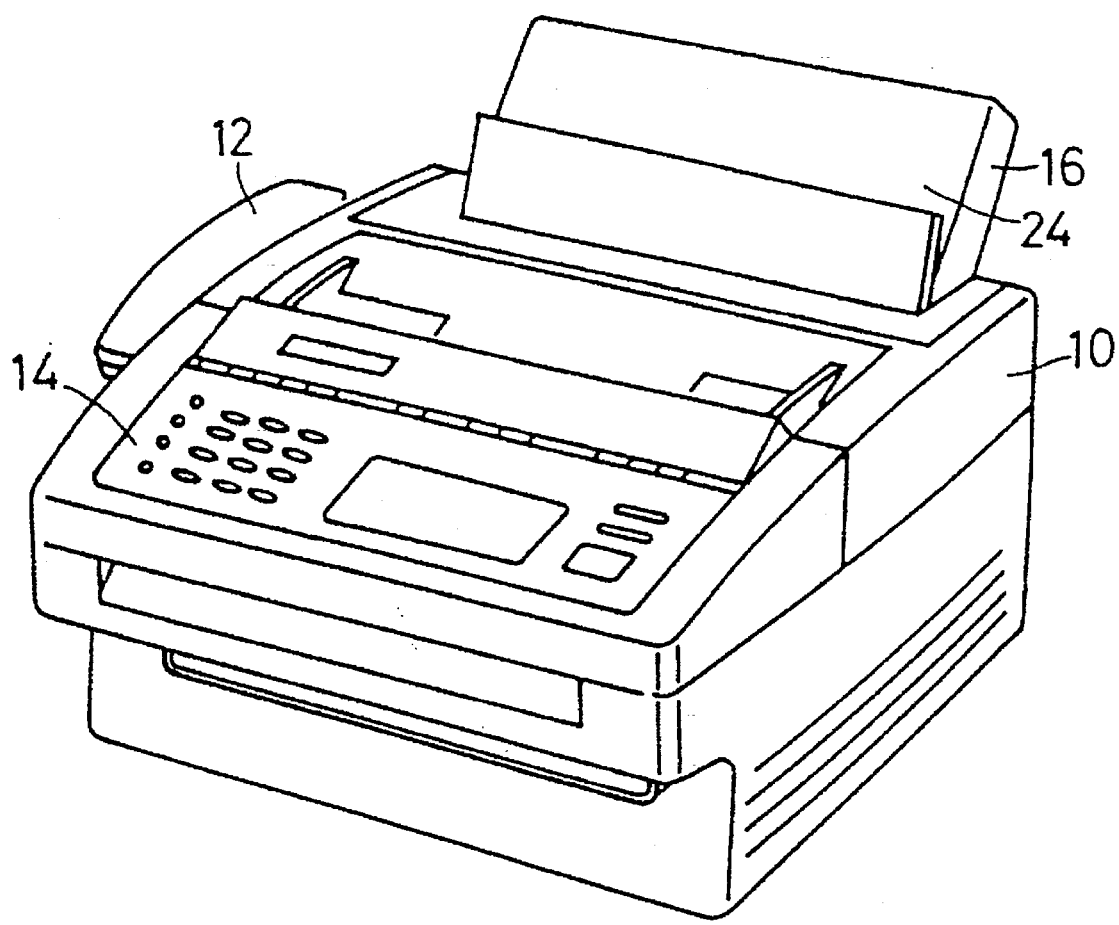
FIG. 1 is a perspective view of a facsimile system constructed according to one embodiment of the present invention.
Figure 2:
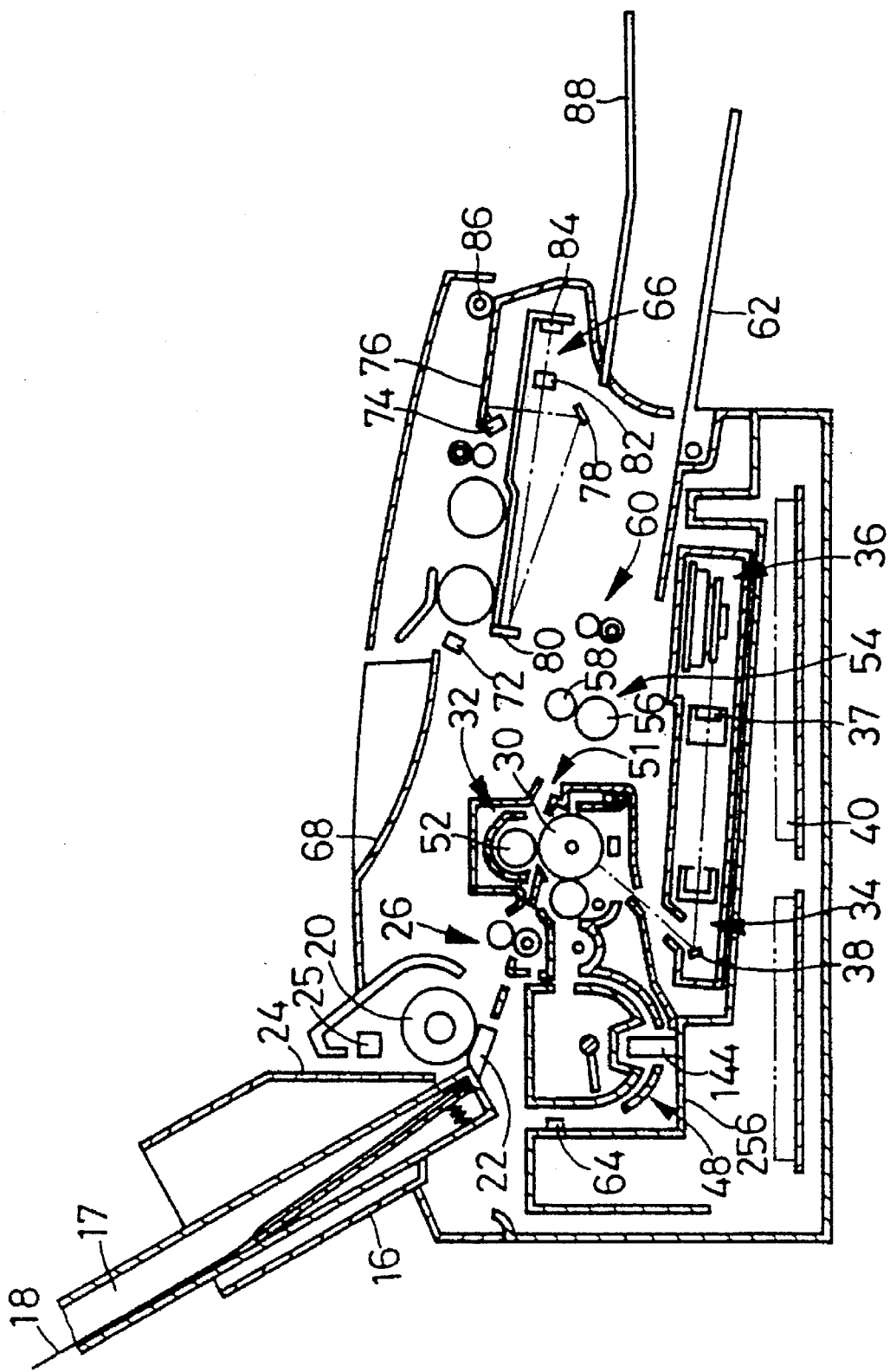
FIG. 2 is a side elevational view in cross section of the facsimile system of FIG. 1.

Referring first to the perspective view of FIG. 1, there is shown a facsimile system equipped with a telephone. The facsimile system incorporates a facsimile transmitter, a facsimile receiver, and a telephone receiver having a hand set 12 provided on a left side of a main body 10. The facsimile system has an operator's control panel 14 on the upper surface of a front portion of the main body 10, and a cassette receptacle 16 in a rear portion of the main body 10. The cassette receptacle 16 is adapted to removably receive a paper cassette 17 as indicated in FIG. 2.

The paper cassette 17 accommodates a stack of paper sheets 18. Near the inner end of the cassette receptacle 16, there is disposed an automatic sheet feeder including a feed roll 20 and a separator pad 22 which cooperate to feed the paper sheets 18 one after another, such that the uppermost sheet 18 of the stack in the paper cassette 17 is delivered from the cassette 17. The cassette receptacle 16 is partly defined by an upper wall which provides a manual sheet insertion table 24 on which a sheet 18 is manually placed by the operator such that the leading end of the sheet 18 is located slightly above the leading end of the stack of paper sheets 18 in the paper cassette 17. The sheet placed on the table 24 is also fed by the automatic sheet feeder. The sheet 18 placed on the manual sheet insertion table 24 is detected by a paper sensor 25 located above the feed roll 20.

The sheet 18 fed by the automatic sheet feeder is transferred by a pair of transfer rolls 26 to a nip between a photosensitive drum 30 and a transfer device 32.

The circumferential surface of the photosensitive drum 30 is imagewise scanned by a laser beam by a scanner unit 34, so that an electrostatic latent image is formed on the photosensitive drum 30. The scanner unit 34 includes a laser generator 36, a condenser lens 37 and a reflector mirror 38. The laser generator 36 has a laser source for generating the laser beam under the control of a control device 40, and a polygon mirror for deflecting the laser beam so that the photosensitive drum 30 is scanned in the axial direction by the deflected laser beam. The laser beam is condensed by the lens 37, and reflected by the mirror 38 to irradiate the photosensitive drum 30.

Figure 17:
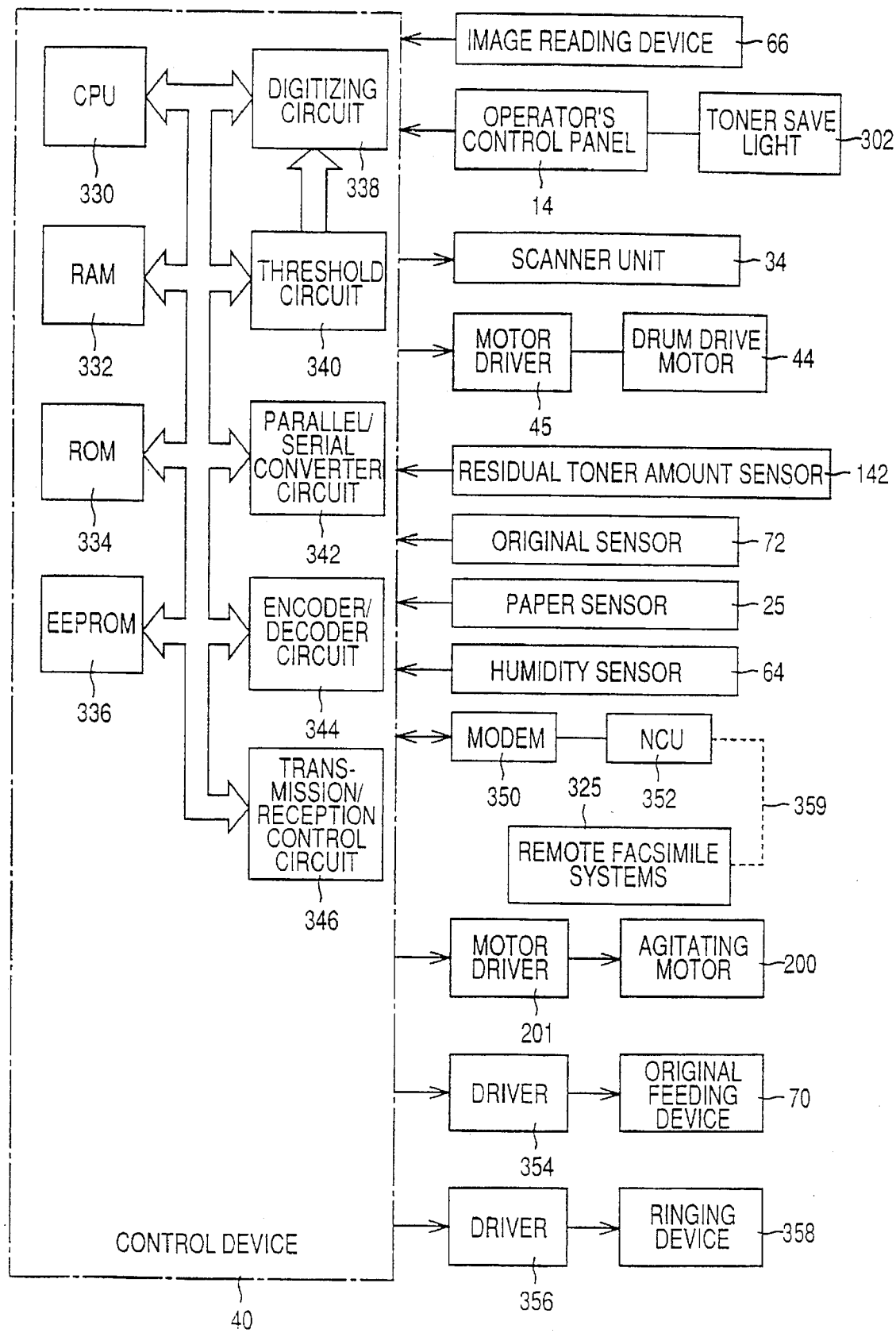
FIG. 17 is a block diagram illustrating a control device of the facsimile system of FIG. 1.
Figure 18A:
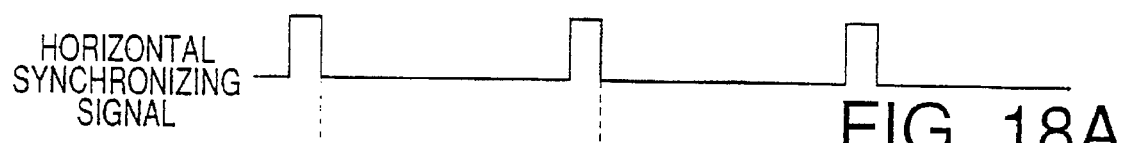
FIG. 18 is a view schematically illustrating an electrostatic latent image formed on a photosensitive drum of the facsimile system.
Figure 18B:
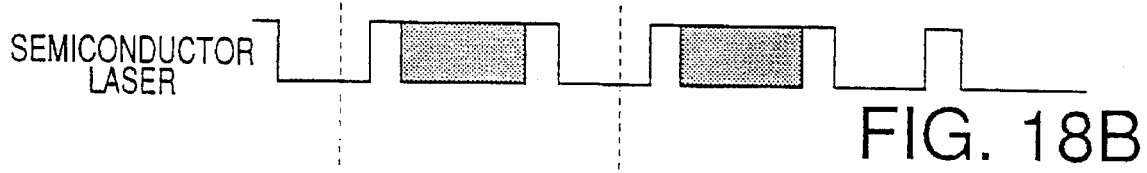
Figure 18C:
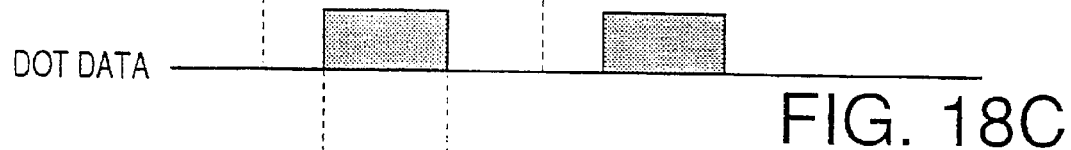
Figure 18D:
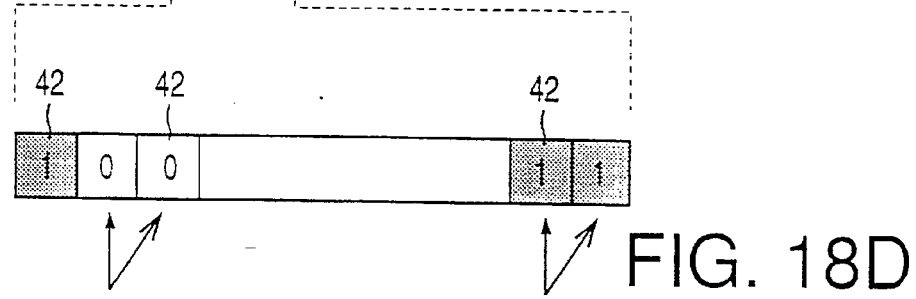

The photosensitive drum 30 is repeatedly scanned or irradiated along parallel lines by the laser beams modulated according to image data so as to form an electrostatic latent image while the drum 30 is rotated. The latent image is formed in a matrix of dots corresponding to local spots or picture elements 42 (FIG. 17). The size of each dot or picture element 42 in a primary scanning direction (parallel to the axial direction of the drum 30) is determined by the laser scanning speed, while the size in a secondary scanning direction (parallel to the rotating direction of the drum 30) is determined by the rotating speed of the drum 30. In the present embodiment, the scanning direction and rotating speed of the drum 30 are determined so that each dot or picture element 42 has a size of ⅛ mm in the primary scanning direction and a size of ⅟₁₅.₄ mm in the secondary scanning direction, when the resolution of the image is set at a SUPER-FINE value as described below.

The photosensitive drum 30 is rotated by a drum drive motor 44 (FIG. 17), which is connected to the control device 40 through a motor driver 45.

The scanner unit 34 is controlled according to image data supplied from the control device 40 so that each laser beam corresponding to each line (row) of local spots or picture elements 42 in the primary scanning direction is modulated such that the local spots 42 at which image dots are formed are irradiated by the laser beam while the local spots 42 at which no image dots are formed are not irradiated. In the present facsimile system, the control device 40 provides two different kinds of image data, that is, non-toner-save image data used in a non-toner-save recording mode, and a toner-save image data used in a toner-save recording mode, as explained below in detail. The image reproduced according to the toner-save image data has a lower density of image dots than that reproduced according to the non-toner-save image data.

The electrostatic latent image is formed on the surface of the photosensitive drum 30 by sequential scanning along successive lines according to a batch of image data. The latent image formed on the drum 30 is developed into a visible image consisting of image dots formed of a developing material in the form of a toner 50 (FIG. 14) deposited on the drum 30 by a developing device 48 which will be described. The visible image is transferred from the photosensitive drum 30 onto the sheet 18 by the transfer device 32. The toner remaining on the drum 30 is removed by a cleaning device 51.

The transfer device 32 includes a transfer roll 52 for charging the sheet 18 to transfer the toner 50 from the drum 30 onto the sheet 18. After the toner 50 is transferred to the sheet 18, the sheet 18 is discharged by a suitable device, and is then fed to an image fixing device 54 while being guided by a suitable guide. The image fixing device 54 has a heating roll 56 and a pinch roll 58, for fixing the toner 50 on the sheet 18. The sheet 18 leaving the fixing device 54 is ejected by a pair of ejector rolls 60, onto a paper outlet tray 62 attached to the front side of the main body 10.

Adjacent to the developing device 48, there is provided a humidity sensor 64 whose output is applied to the control device 40.

In an upper front portion of the main body 10, there is disposed an image reading device 66 which receives original sheets one after another from an original table 68, which provides an intermediate recessed portion of the top surface of the main body 10. Each original sheet bears an original image to be reproduced on the corresponding sheet 18, and is fed by an original feeding device 70 (FIG. 17) from the table 68 to the image reading device 66 upon generation of a reading start command. The original feeding device 70 includes suitable feed rolls. The original sheets placed on the table 68 are detected by an original sensor 72.

The image reading device 66 includes a light source 74, an original support plate 76, reflector mirrors 78, 80, a condenser lens 82, and a line image sensor 84. The image on the original sheet on the support plate 76 is irradiated by a radiation generated by the light source 74, and the radiation reflected by the original sheet is reflected by the mirrors 78, 80. The radiation is then incident upon the line image sensor 84 through the condenser lens 82. The line image sensor 84 reads successive lines of the image on the original sheet one line at a time. The original support plate 76 has a glass pane or other transparent planar member supported by an opaque member. The original sheet is irradiated through the transparent planar member. The size of the picture elements of the image read by the line image sensor 84 is the same as that of the picture elements 42 of the electrostatic latent image on the photosensitive drum 30 described above, when the resolution is set at the SUPER-FINE value. In the present facsimile system, the resolution of the image is variable in three steps, that is, may be set at a selected one of SUPER-FINE, FINE and STANDARD values. The operating speed of the original feeding device 70 is controlled according to the selected resolution value. The original sheet which has passed the original support plate 76 is fed out onto an original outlet tray 88 by an original ejector roll 86.

The developing device 48, which is constructed as described in detail in Japanese Patent Application No. 6-19227, will be described by reference to FIGS. 3–13.

Figure 3:
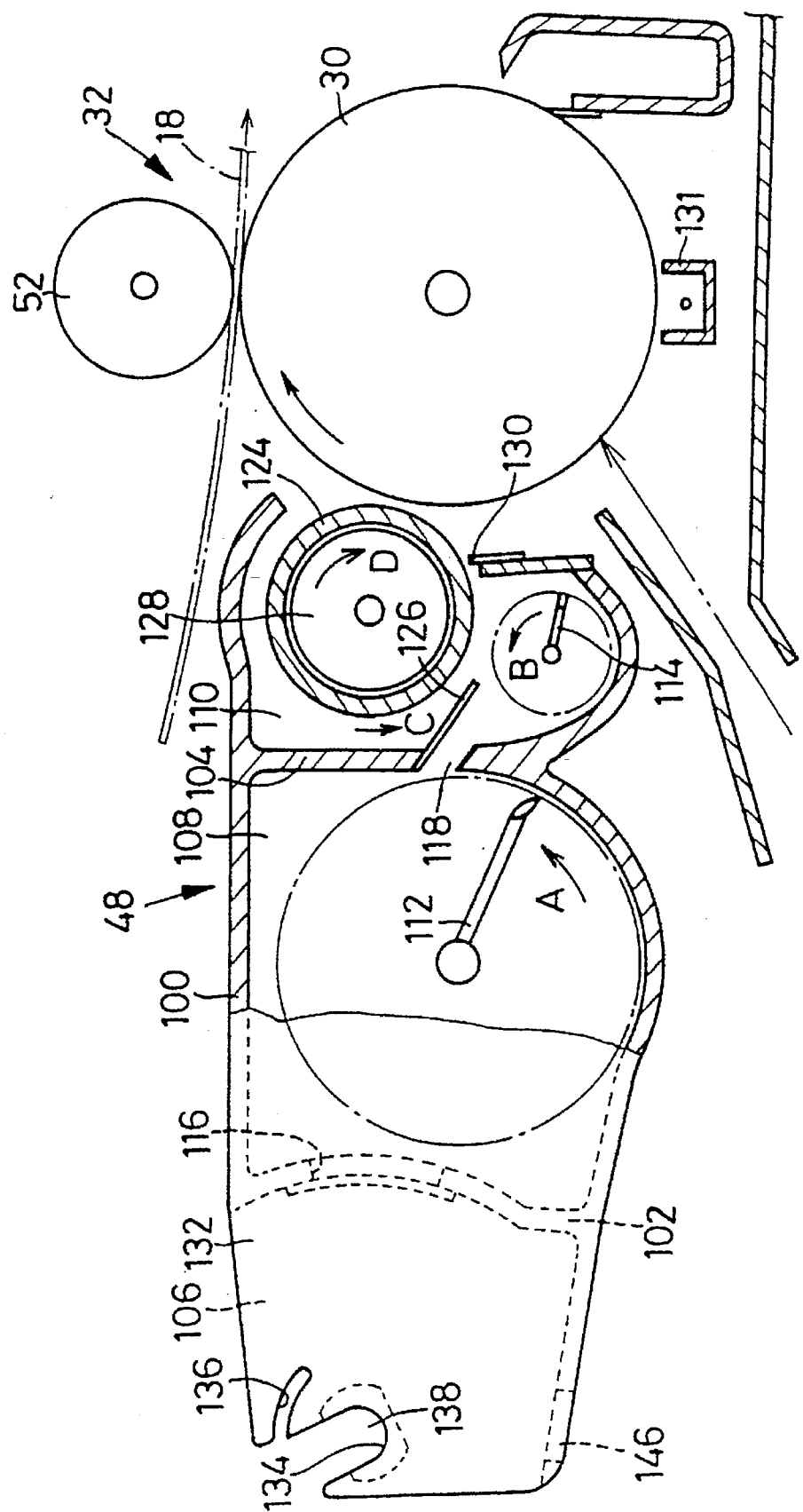
FIG. 3 is a side elevational view partly in cross section of a developing device of the facsimile system.

As shown in FIG. 3, the developing device 48 has a housing 100 which is divided by partition walls 102, 104 into three chambers: a cartridge chamber 106; an agitating chamber 108; and a developing chamber 110. A first and a second agitating member 112, 114 are disposed rotatably in the agitating and developing chambers 108, 110, respectively.

The partition wall 102 which separates the cartridge and agitating chambers 106, 108 from each other has an opening 116. Similarly, the partition wall 104 which separates the agitating and developing chambers 108, 110 from each other has an opening 118.

Figure 4:
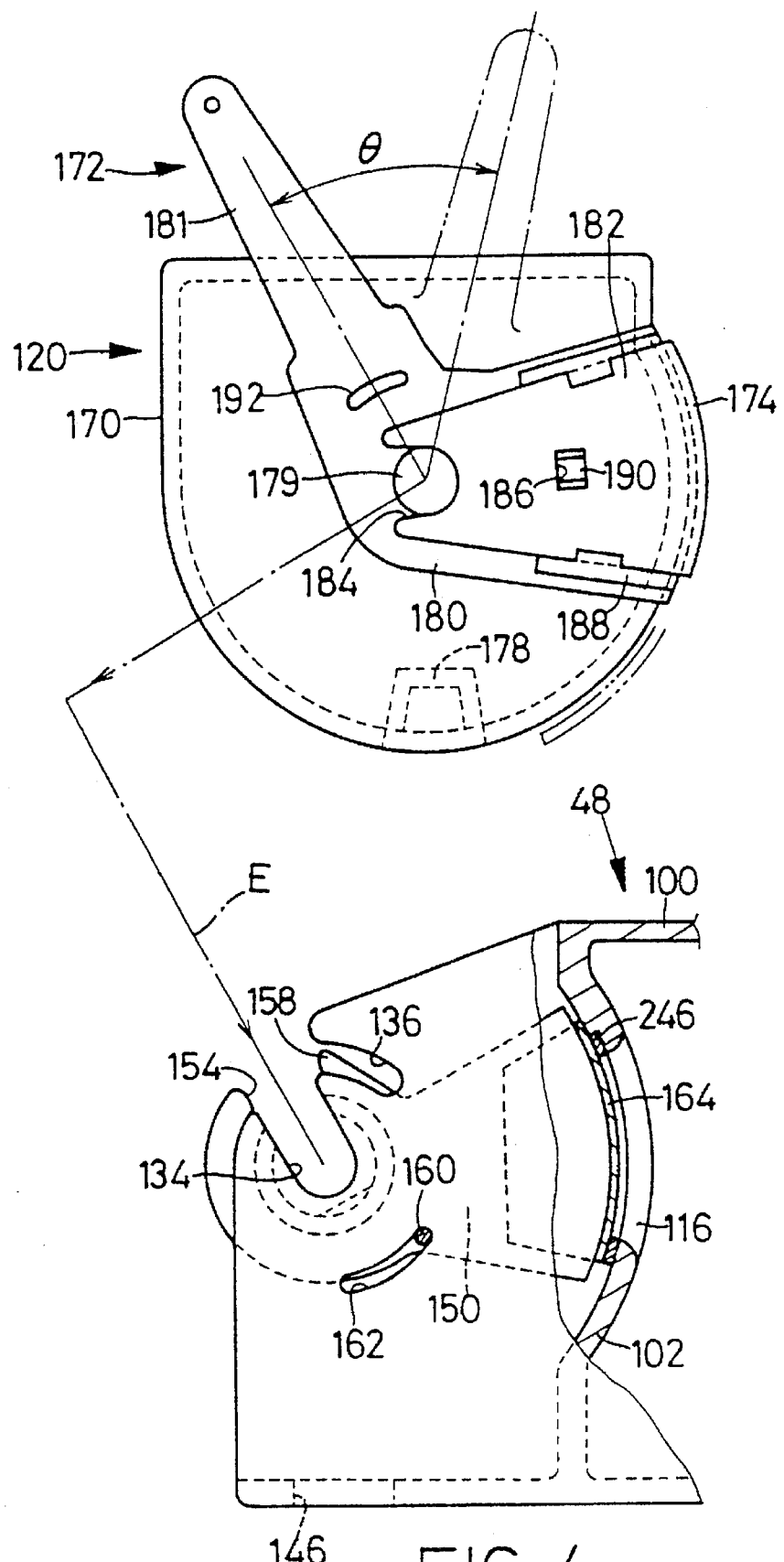
FIG. 4 is a side elevational view partly in cross section of a portion of the developing device of FIG. 3 at which a toner cartridge is mounted.
Figure 5:
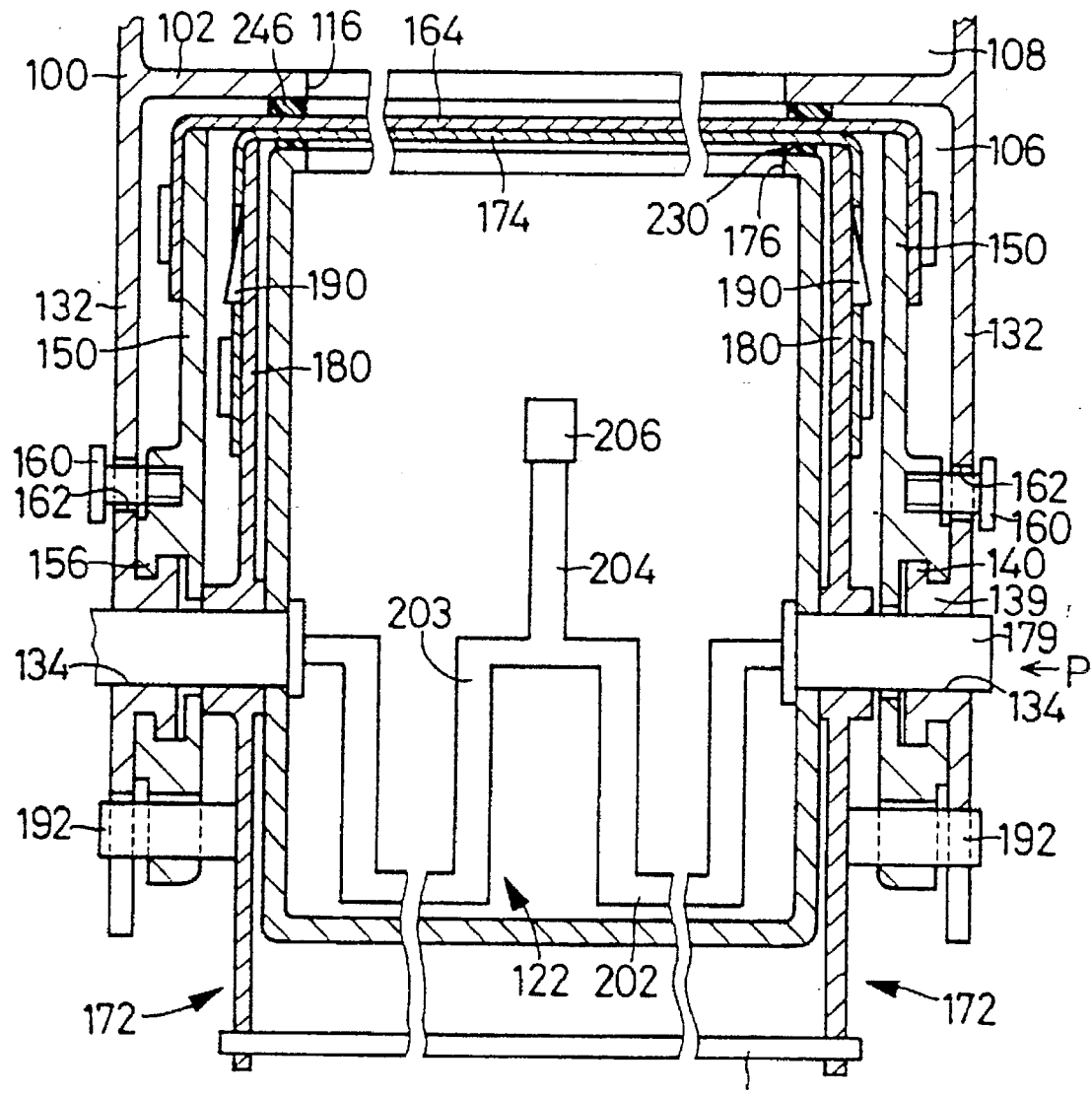
FIG. 5 is a plan view in cross section of a toner cartridge chamber of the developing device.

When a toner supply in the form of a toner cartridge 120 is received in the cartridge chamber 106 as shown in FIG. 4, the toner 50 contained in the toner cartridge 120 is supplied into the agitating chamber 108 through the opening 116 while the toner 50 is agitated by a third agitating member 122, as indicated in FIG. 5. The toner 50 is then supplied into the developing chamber 110 through the opening 118 while the toner is agitated by the first agitating member 112. The toner 50 in the developing chamber 110 is agitated by the second agitating member 114, together with a magnetic carrier accommodated in the developing chamber 110, whereby the toner 50 is fed up toward a developing sleeve 124.

A restrictor plate 126 is disposed above the opening 118, to prevent a movement of the toner 50 from the agitating chamber 108 directly onto the developing sleeve 124. Namely, the restrictor plate 126 functions to direct the toner 50 to the second agitating member 114 located below the developing sleeve 124.

A major portion of the partition wall 102 has a cross sectional shape of an arc having a center at a point within the cartridge chamber 106, as is apparent from FIG. 3. This arcuate portion of the partition wall 182 follows the corresponding portion of the outer circumferential surface of the toner cartridge 120.

Within the developing sleeve 124, there is disposed a magnet roll 128. The developing sleeve 124 and the magnet roll 128 are rotated in the opposite directions. The toner 50 with the magnetic carrier is deposited on the circumferential surface of the developing sleeve 124, and the thickness of the layer of the toner 50 on the sleeve 124 is suitably adjusted or controlled by a doctor blade 130 disposed adjacent to the sleeve 124.

The toner 50 uniformly deposited on the surface of the developing sleeve 124 is charged by a charger 131, and is imagewise transferred to the local spots on the photosensitive drum 30 whose surface has been imagewise exposed to the modulated laser beams. That is, the toner 50 is transferred from the sleeve 124 to the local spots 42 which have been irradiated by the laser beams, but is not transferred to the local spots 42 which have not been irradiated. Thus, the electrostatic latent image formed by the scanner unit 34 is developed into the visible image of the toner 50.

Figure 7:
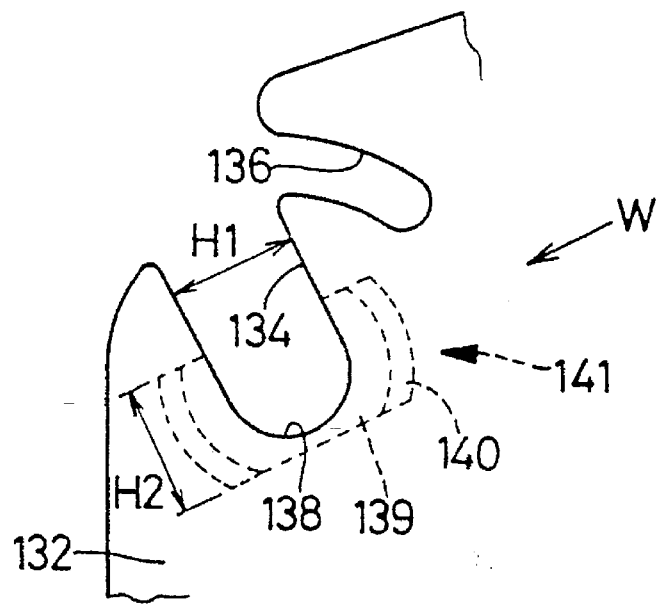
FIG. 7 is a view of a side wall of the toner cartridge chamber, taken in direction P indicated in FIG. 5.

As indicated in FIG. 5, the cartridge chamber 106 is partially defined by opposite side walls 132 each of which has a U-shaped groove 134 having a width H1, as indicated in FIG. 7. The U-shaped groove 134 has an arcuate bottom portion 138. An engaging groove 136 is formed in communication with the U-shaped groove 134 such that the engaging groove 136 has an arcuate shape whose center is located at the center of the arcuate bottom portion 138 of the U-shaped groove 134. As indicated in FIG. 5, an engaging protrusion 141 having a shaft portion 139 and a head portion 140 is provided near the arcuate bottom portion 138. The head portion 140 has a larger diameter than the shaft portion 139. The engaging protrusion 141 has parallel opposite flat faces, as shown in FIG. 7. A distance H2 between the flat faces of the protrusion 141 is slightly smaller than the width H1 of the U-shaped groove 134. As shown in FIG. 3, the bottom wall of the cartridge chamber 106 has a through-hole 146 through which a sensing portion 144 of a residual toner amount sensor 142 (which will be described by reference to FIG. 14) extends.

Figure 8:
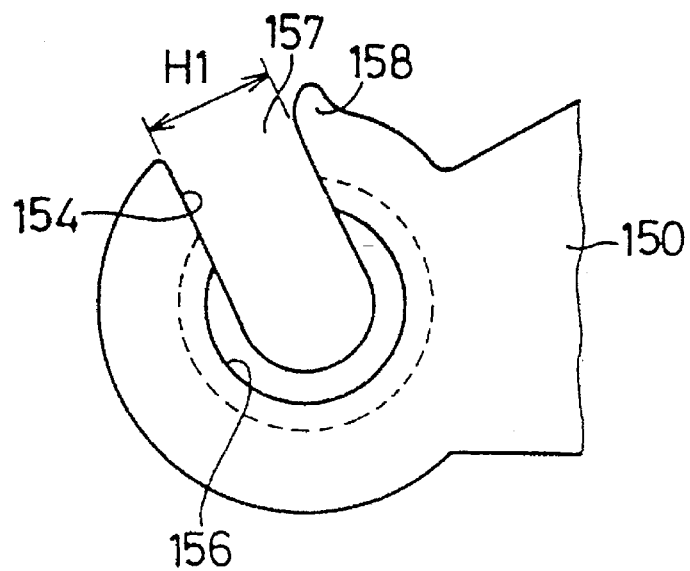
FIG. 8 is a view of an arm attached to the side wall of FIG. 7, taken in the direction P in FIG. 5.

To the inner surfaces of the opposite side walls 132 of the cartridge chamber 106, there are pivotally attached a pair of arms 150, as shown in FIG. 5. As shown in FIG. 8, each arm 150 has a support groove 154 corresponding to the U-shaped groove 134 with the width H1, and an engaging recess 156 engageable with the engaging protrusion 141. Since the distance H2 of the engaging protrusion 141 is slightly smaller than the width H1, the engaging recess 156 can engage the engaging protrusion 141 by moving the arm 150 in direction W (FIG. 7) such that an opening 157 of the recess 156 leads in the movement direction W. The engaging protrusion 141 and the engaging recess 156 are brought to an operating position by pivoting the arm 150 relative to the corresponding side wall 132 after the engaging protrusion 141 has reached the bottom of the recess 156. In the operating position, the protrusion 141 and recess 156 are not disengageable from each other and not rotatable relative to each other.

In the operating position indicated above, the support groove 154 of the arm 150 is aligned with the U-shaped groove 134 of the side wall 132, and a relay portion 158 of the arm 150 substantially extends across the engaging groove 136, as shown in FIG. 4.

Figure 9:
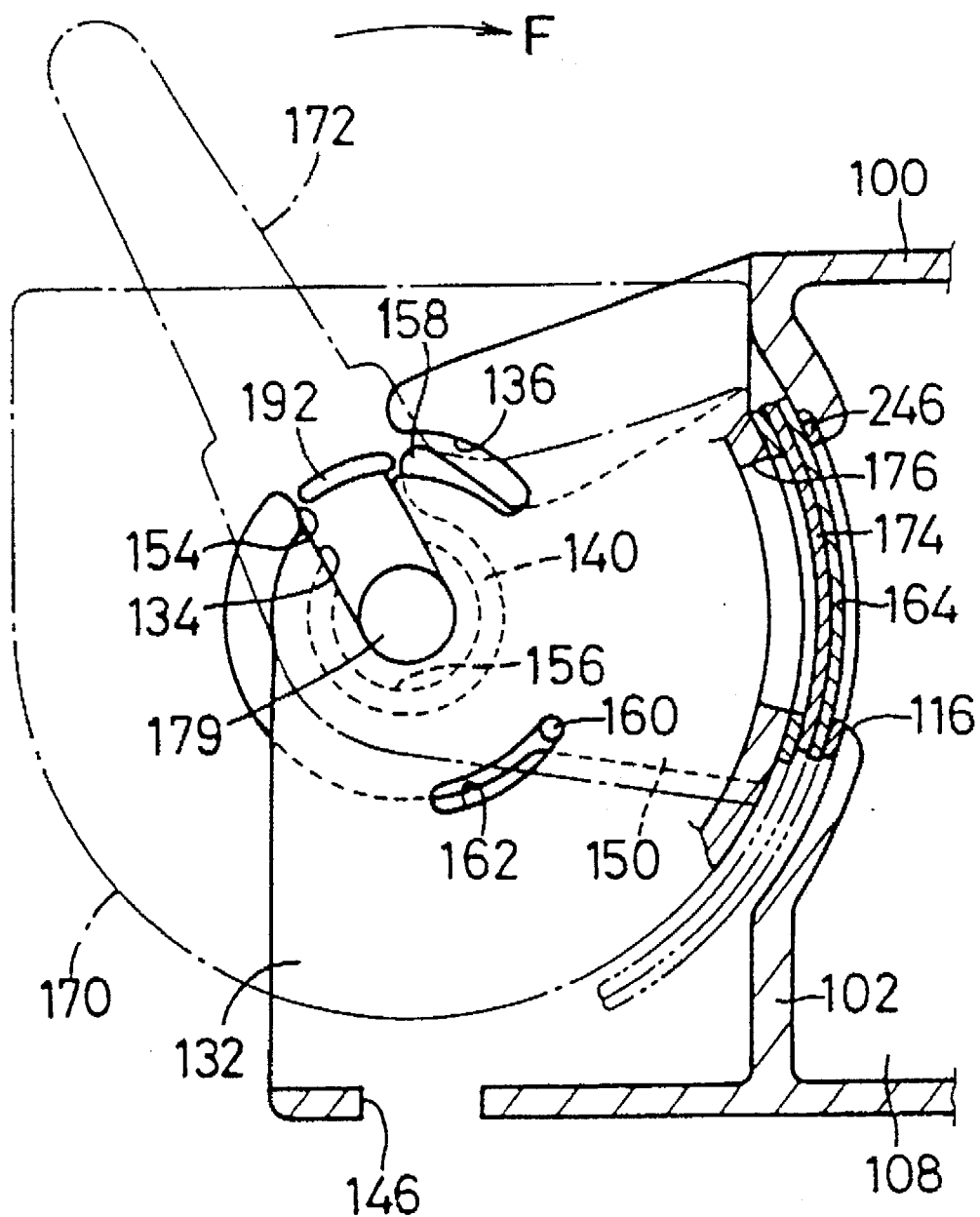
FIG. 9 is a side elevational view in cross section of the toner cartridge chamber and the toner cartridge received in the chamber.
Figure 10:
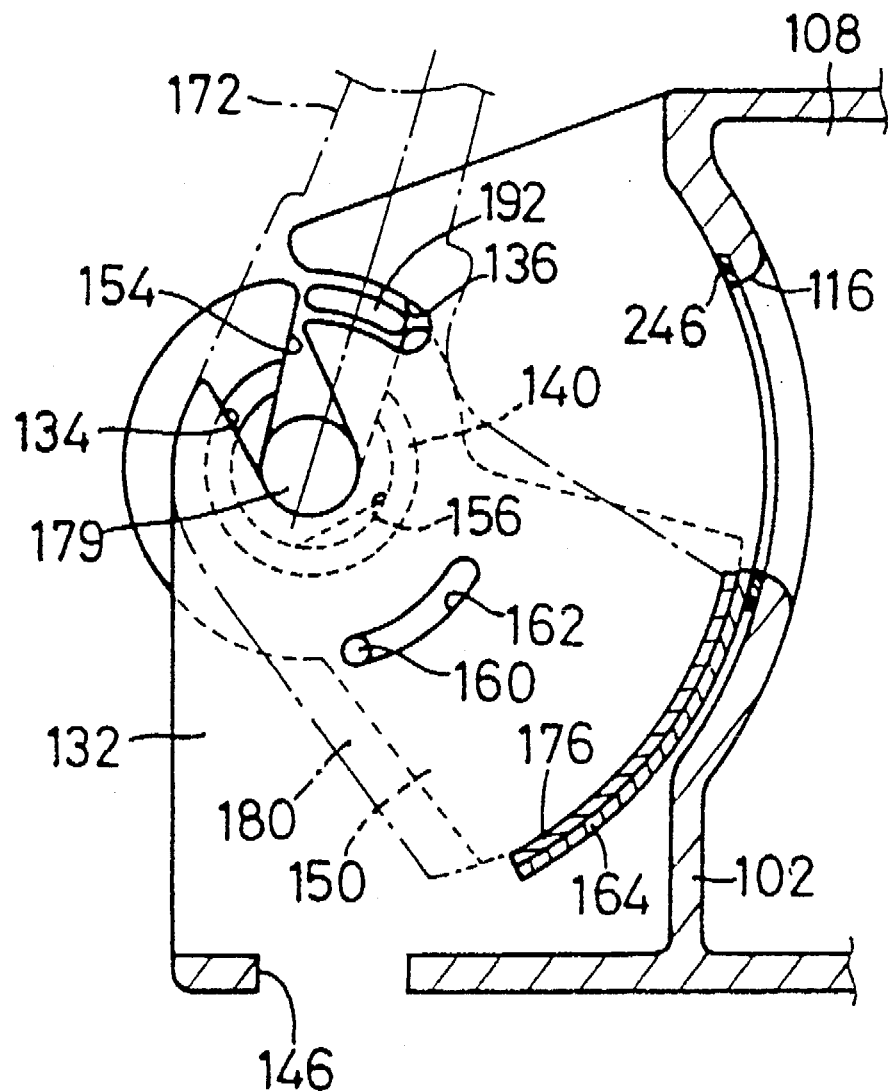
FIG. 10 is a side elevational view in cross section of the toner cartridge whose levers are pivoted.

Each of the arms 150 has a pin 160 fixed thereto. The pin 160 extends through an arcuate hole 162 formed through the corresponding side wall 132, so that the pivotal movement of the art 150 is limited by abutting contact of the pin 160 with the ends of the arcuate hole 160, as indicated in FIG. 9.

A first shutter 164 is secured at its end portions to the arms 150, so that the first shutter 164 closes the opening 116 formed through the partition wall 102. The first shutter 164 is an arcuate plate having a shape following the arcuate shape of the partition wall 102. The first shutter 164 is moved with the arms 150 upon pivotal movement of the arms 150.

The first shutter 164 is locked at a position for closing the opening 116 of the partition wall 102, by a first locking device 166, which will be described.

The toner cartridge 120 is removably received in the cartridge chamber 106 of the main body 10.

Figure 6:
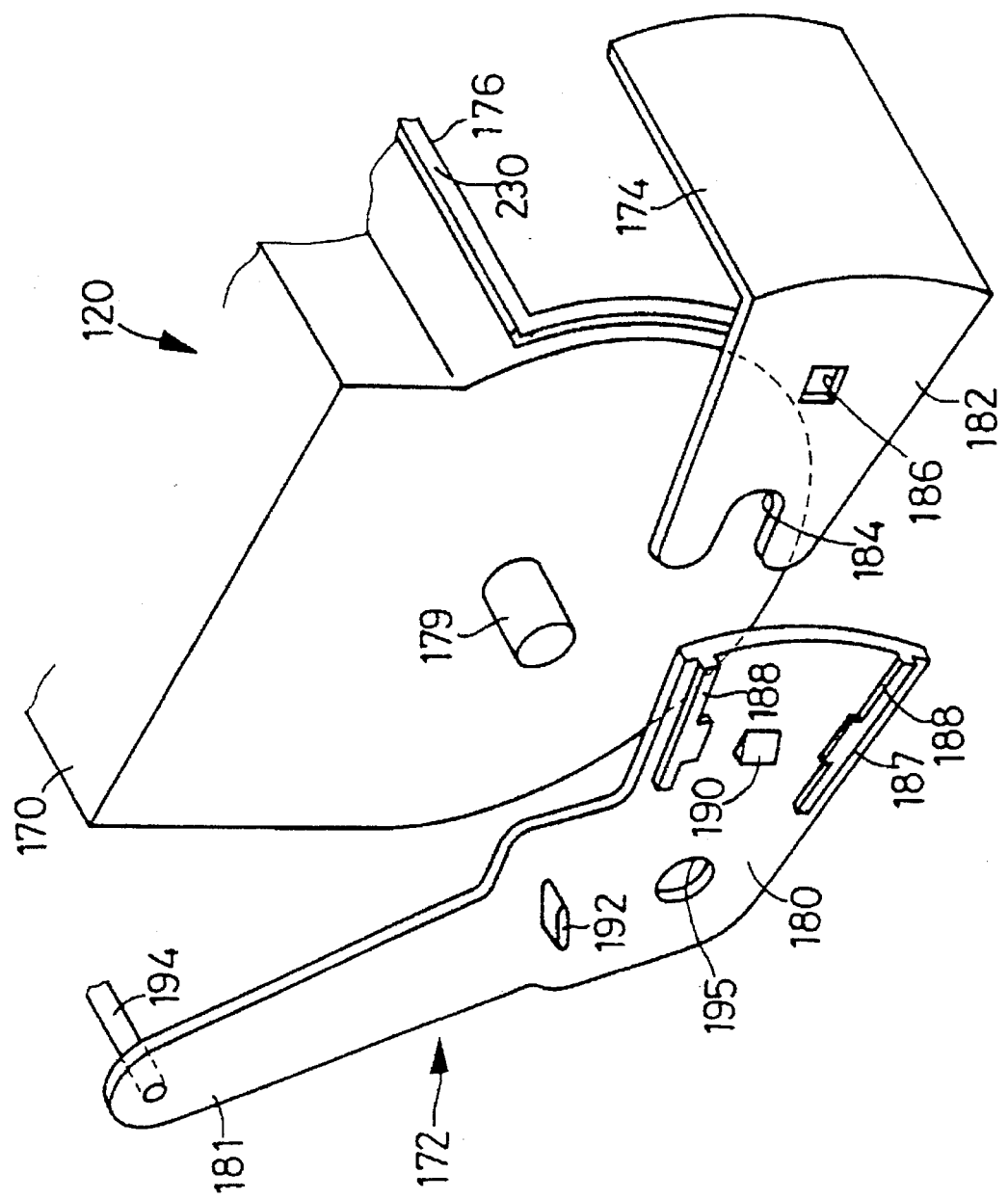
FIG. 6 is a perspective view showing a portion of the toner cartridge to be received in the toner cartridge chamber of FIG. 5.
Figure 14:
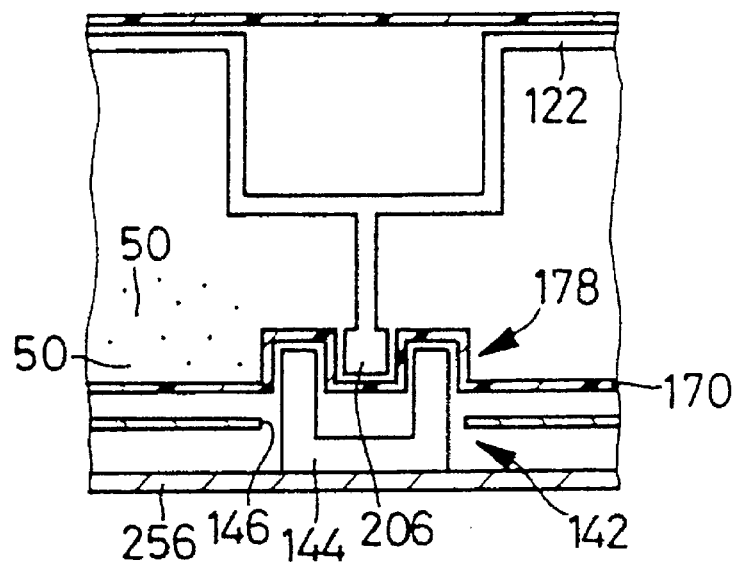
FIG. 14 is a front elevational view in cross section of a residual toner amount sensor and the neighboring members of the toner cartridge.
Figure 15:
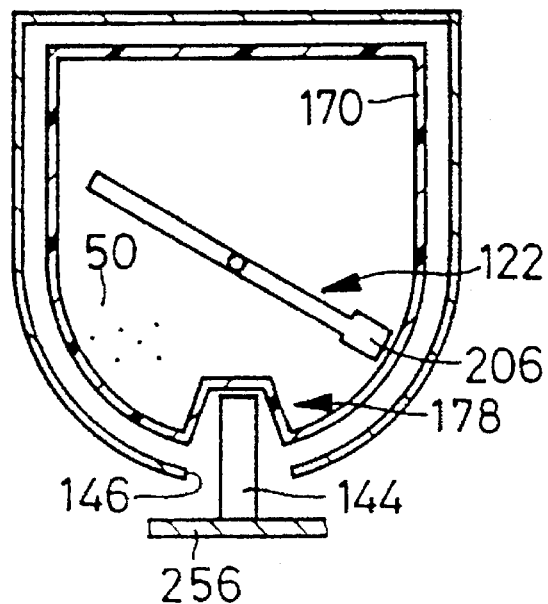
FIG. 15 is a side elevational view in cross section of the toner cartridge.

As shown in FIG. 6, the toner cartridge 120 has a housing 170, a pair of levers 172 and a second shutter 174. The housing 170 has a part-cylindrical portion having a length in the axial direction of the drum 30. The part-cylindrical portion has an opening 176 extending in the longitudinal direction. The opening 176 is closed by a second shutter 174. The part-cylindrical portion of the housing 170 has a pair of bottom projections 178 made of a transparent material, which are spaced apart from each other in the longitudinal direction, as shown in FIGS. 14 and 15. These bottom projections 178 define corresponding recesses which are open in the bottom surface of the housing 170. When the toner cartridge 120 is received in the cartridge chamber 106, the end portions of sensing portion 144 of the residual toner amount sensor 142 are positioned within the recesses provided by the projections 178, as shown in FIG. 15.

The housing 170 has a pair of support shafts 179 extending through respective opposite end walls in the longitudinal direction. The support shafts 179 are rotatable relative to the end walls of the housing 170. Each of these support shafts 179 supports a lever 172 such that the lever 172 is pivotable about the shaft 179. The lever 172 has a support portion 180 and a handle portion 181. The second shutter 174 indicated above are attached to the support portions 180 of the two levers 172 pivotally mounted on the respective shafts 179.

The second shutter 174 has two fixing end portions 182 attached to the support portions 180 of the levers 172. Each fixing end portion 182 has a generally sectorial shape, and a U-shaped cutout 184 at its distal end, and an engaging hole 186 at a middle part thereof. The second shutter 174 has a shutter portion extending between the fixing end portions 182. The shutter portion has an arcuate shape in cross section, which follows the part-cylindrical portion of the housing 170.

The support portion 180 of each lever 172 has substantially the same shape as the fixing end portion 182 of the second shutter 174. The support portion 180 has two guides 188 formed along the opposite edges extending in the direction of its length. Each guide 188 has a detent pawl 187. The support portion 180 further has an engaging pawl 190, which is provided between the two guides 180, for engagement with the engaging hole 186 of the second shutter 174. The engaging pawl 190 has a right-triangular shape in cross section. The handle portion 181 has an engaging projection 192 formed at a proximal portion thereof, for engagement with the engaging groove 136 formed in the side wall 132. The two levers 172 are connected to each other by a connecting rod 194, at the distal ends of the handle portions 181, so that the two levers 172 are pivoted as a unit. Each lever 172 has a support hole 195 for engagement with the support shaft 179 of the housing 170.

The second shutter 174 is attached to the support portions 180 of the levers 172 such that the fixing end portions 182 engage the respective guides 188 and detent pawls 187 while the engaging pawls 190 engage the engaging hole 186, and such that the bottom portion of the cutout 184 of the second shutter 174 is aligned with the support hole 195. Thus, the second shutter 174 is moved with the levers 172 upon pivotal movement of the levers 172.

The assembly of the two levers 172 and the second shutter 174 is attached to the housing 170 such that the two support shafts 179 extend through the support holes 195 formed through the levers 172 and through the cutouts 184 formed through the fixing end portions 182 of the second shutter 174. Thus, the toner cartridge 120 removably received in the cartridge chamber 106 is prepared.

The second shutter 174 is locked at a position for closing the opening 176 of the housing 170, by a second locking device 196 which will be described.

Within the toner cartridge 170, the third agitating member 122 is disposed rotatably about and with the support shafts 179, as shown in FIG. 5. The support shafts 179 are rotated by an agitating motor 200 (FIG. 17), which is connected to the control device 40 through a motor driver 201, so that the third agitating member 122 is rotated with the support shafts 179 under the control of the control device 40. In the present facsimile system, the agitating motor 201 is activated to operate the third agitating member 122 upon commencement of recording on the sheet or sheets 18. Similarly, the first and second agitating members 112, 114 are operated.

The third agitating member 122 includes a toner agitating portion 202 located near the inner surface of the housing 170. The toner agitating portion 202 has a central U-shaped portion 203, which functions to prevent an interference between the toner agitating portion 202 and the transparent bottom projections 178 of the housing 170, during rotation of the third agitating member 122. Namely, the two bottom projections 178 are located within the U-shaped portion 203 when the U-shaped portion 203 passes the bottom of the housing 170. The inner end of the U-shaped portion 203 remote from the inner surface of the housing 170 is aligned with the axis of rotation of the support shafts 179, that is, aligned with the axis of rotation of the agitating member 122. To the inner end of the U-shaped portion 203, there is attached an agitating arm 204 which has a wiper 206 at its distal end. The wiper 206 is formed of a felt or other fibrous material, or consists of a sponge or other soft porous member. The wiper 206 is adapted to pass a space between the two bottom projections 178, to remove a mass of the toner 50 in that space and clean the opposite surfaces of the projections 178 each time the agitating member 122 is rotated.

Figure 11:
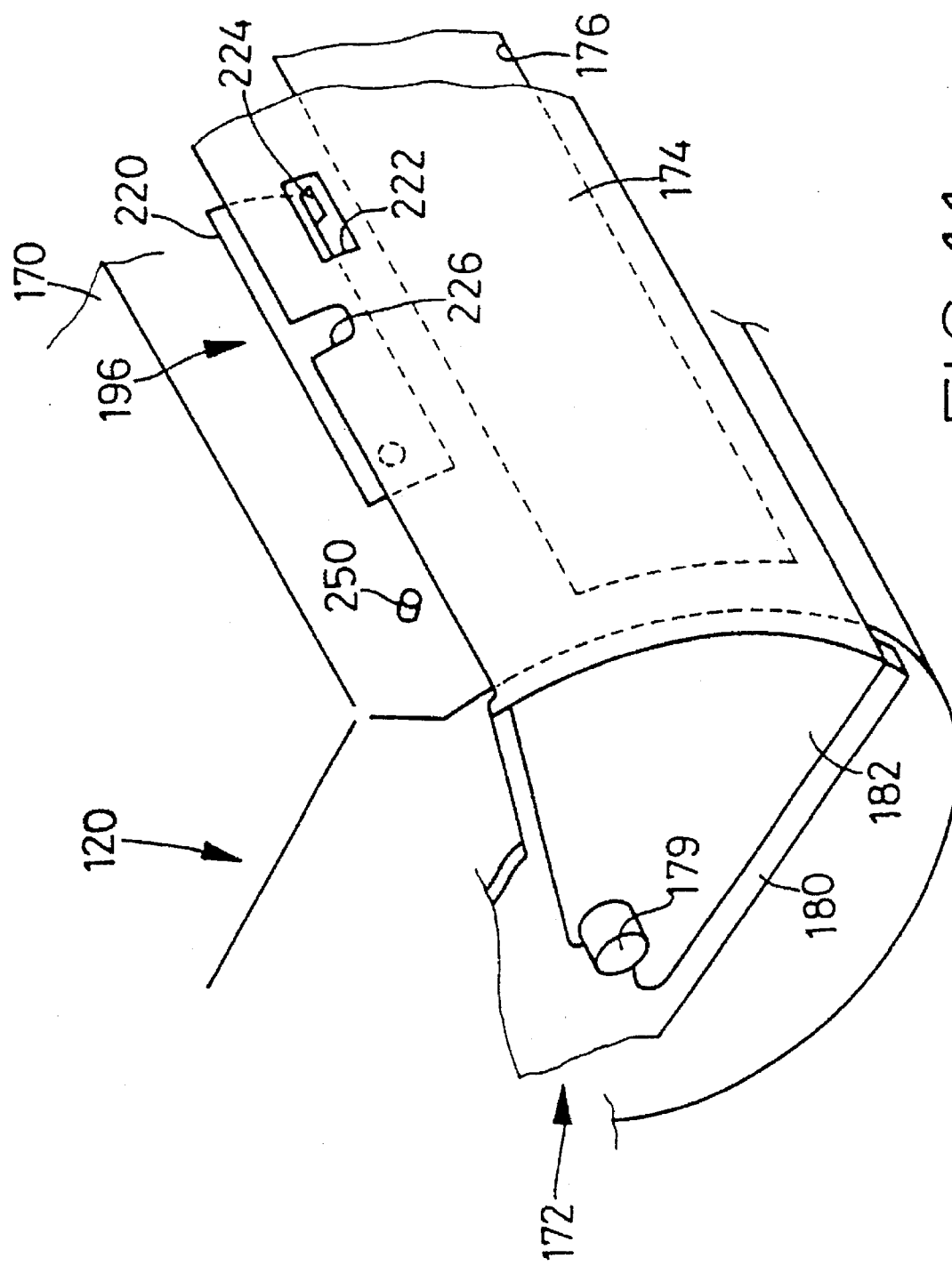
FIG. 11 is a perspective view of a second locking device for the toner cartridge.
Figure 12:
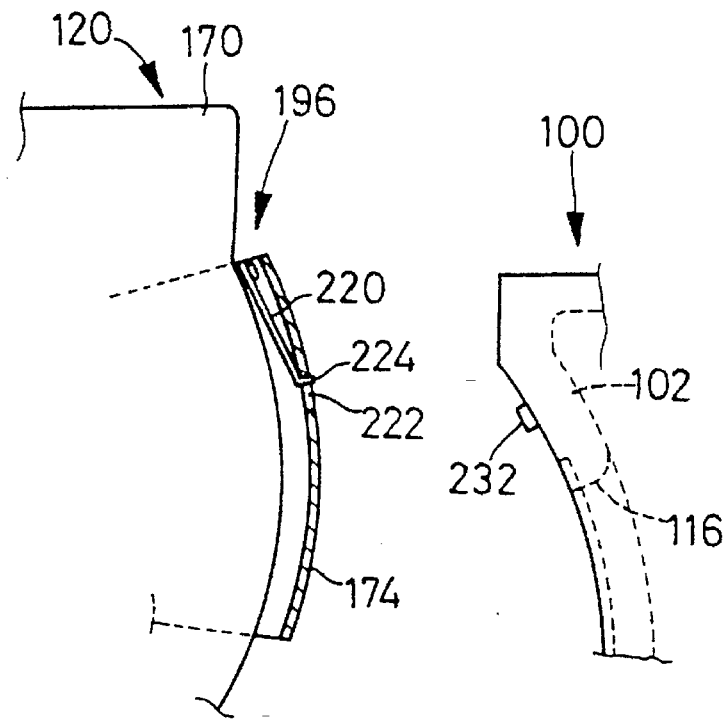
FIG. 12 is a side elevational view in cross section of the second locking device of FIG. 11 and unlocking members for the second locking device.

As shown in FIGS. 11 and 12, the second locking device 196 includes a sheet spring 220 fixed to the housing 170, and has an engaging hole 222 formed in the second shutter 174. The sheet spring 220 has a bent engaging portion 224 which is engageable with the engaging hole 222 of the second shutter 174, for locking the second shutter 174 relative to the housing 170, at the position for closing the opening 176.

The second shutter 174 has a U-shaped cutout 226 located within the area of the sheet spring 220 when the second shutter 174 is in the locked position. The cutout 226 is provided for unlocking the second shutter 174. The housing 170 has a sealing member in the form of a felt 230 disposed along the periphery of the opening 176, as shown in FIG. 6. The felt 230 prevents leakage of the toner 50 through a gap between the housing 170 and the second shutter 174.

As shown in FIG. 12, the partition wall 102 of the housing 100 of the developing device 48 has a tab 232 located above the opening 116. The tab 232 is engageable with the cutout 226 when the toner cartridge 120 is received in place in the cartridge chamber 106. Described more specifically, when the toner cartridge 120 is positioned within the cartridge chamber 106, the tab 232 pushes the sheet spring 220 toward the housing 170, extending through the cutout 226, whereby the engaging projection 224 is disengaged from the engaging hole 222, and the second shutter 174 is unlocked. As a result, the assembly of the second shutter 174 and levers 172 can be pivoted about the support shafts 179.

Figure 13:
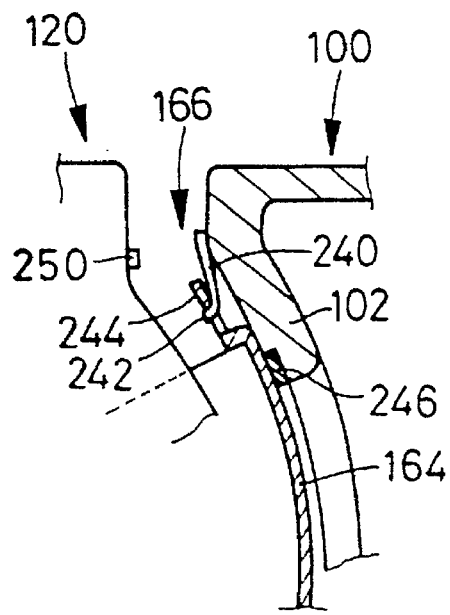
FIG. 13 is a side elevational view in cross section of a first locking device provided on a partition wall of the developing device of FIG. 3, and unlocking members for the first locking device.

The first locking device 166 has a locking arrangement similar to that of the second locking device 196. As shown in FIG. 13, the first locking device 166 includes a sheet spring 240 fixed to a portion of the partition wall 102 above the opening 116. The sheet spring 240 has a bent engaging projection 242, while the first shutter 164 has an engaging portion 244 formed near the upper edge. The engaging projection 242 is engageable with the engaging portion 244, for locking the first shutter 164 at the position for closing the opening 116. The partition wall 102 has a sealing member in the form of a felt 246 disposed along the periphery of the opening 116.

The housing 170 of the toner cartridge 120 has a tab 250 located above the opening 176. The tab 250 is provided to push the sheet spring 240 to unlock the first shutter 164 and permit pivotal movement of the first shutter 164 and the arms 150 relative to the partition wall 102.

When the toner cartridge 120 is positioned in the cartridge chamber 106, the support shafts 179 are inserted into the U-shaped grooves 134 and support grooves 154, in the direction indicated at E in FIG. 4. In this condition, the housing 170 of the toner cartridge 120 is positioned close to the partition wall 102, so that the tab 250 pushes the sheet spring 240 of the first locking device 166, while the tab 232 pushes the sheet spring 220 of the second locking device 196, whereby the first and second shutters 164, 174 are unlocked from the first and second locking devices 166, 196.

Then, the levers 172 are operated at the handle portions 181, so as to be pivoted in the direction indicated at F in FIG. 9, so that the second shutter 174 is pivoted relative to the housing 170, to open the opening 176, while at the same time the engaging projections 192 on the levers 172 act on the relay portions 158 of the levers 150, so as to pivot the levers 150 and the first shutter 164 relative to the partition wall 102, whereby the opening 116 is opened.

Since the arms 150 are pivoted relative to the housing 100 (side walls 132), the grooves 154 and the grooves 134 intersect each other, and the open ends of these grooves 154, 134 are closed. Further, the engagement of the engaging projections 192 with the engaging grooves 136 prevents disengagement of the support shafts 179 of the toner cartridge 120 from the U-shaped grooves 134.

There will next be described the residual toner amount sensor 142.

The sensor 142 is constituted by the sensing portion 144 and the wiper 206 attached to the third agitator 122, as shown in FIGS. 14 and 15. The sensing portion 144 is secured to a lower support plate 256 of the facsimile system. The sensor 142 is of a light-transmitting photosensor type wherein the sensing portion 144 has a light emitting element and a light sensitive element.

The sensing portion 144 extends through the through-hole 146 formed through the bottom wall of the housing 100 of the developing device 48. The light emitting element of the sensing portion 144 is located within one of the two U-shaped recesses formed by the respective bottom projections 178 of the housing 170 of the toner cartridge 120, while the light sensitive element is located within the other U-shaped recess, as indicated in FIG. 14. As described above, the bottom projections 178 are formed of a transparent material, so that a light beam generated by the light emitting element of the sensing portion 144 is received by the light sensitive element when the space between the two projections 178 is not filled with the toner 50, or when only a small amount of the toner 50 is present in that space.

If the level of the upper surface of the mass of toner 50 is higher than the light emitting and sensitive elements of the sensing portion 144 and if the wiper 206 is not located within the space between the bottom projections 178, the light beam generated by the light emitting element is blocked by the toner 50 filling the above-indicated space. In this case, therefore, no light is received by the light sensitive element.

In operation of the facsimile system, the third agitating member 122 is rotated, and the wiper 206 passes the above-indicated space each time the agitating member 122 is rotated. The passage of the wiper 206 causes the toner 50 to be removed from the above-indicated space, and also causes the opposite surfaces of the projections 178 to be cleaned by the wiper 206. Consequently, the light beam is temporarily received by the light sensitive element even if the amount of the toner 50 is sufficiently large. However, immediately after the wiper 206 has passed the above-indicated space, the space is re-filled by the toner 50, and the emitted light beam is blocked by the toner until the wiper 206 again enters the above-indicated space. Thus, the time period during which the light beam is received by the light sensitive element is shorter than the time period during which the light beam is blocked.

If the amount of the toner 50 is relatively small but the above-indicated space is filled with the toner 50, the time required for the toner 50 to re-fill the space after the toner in the space is removed by the wiper 206 is relatively long, whereby the time period during which the light beam is received by the light sensitive element is relatively long.

Therefore, the amount of the toner 50 remaining in the toner cartridge 50 can be detected on the basis of the time period during which the light beam generated by the light emitting element of the sensing portion 144 is received by the light sensitive element, namely, on the basis of a period between a moment at which the light sensitive element is turned ON and a moment at which the light sensitive element is turned OFF.

The output of the residual toner amount sensor 142, more precisely, the output of the light sensitive element of the sensing portion 144 is applied to the control device 40, which determines whether the period during which the light sensitive element is held ON is longer than a predetermined threshold. If the period is longer than the threshold, this means that the residual amount of the toner 50 is not sufficiently large, and that the cartridge 120 should be replaced with a new one in a short time. In this case, a CONDITION flag 1 used by the control device 40 is set to "1", as described below.

As the third agitating member 122 is operated during a recording operation of the facsimile system, the output of the sensor 142 is applied to the control device 40 during the recording operation.

Figure 19:
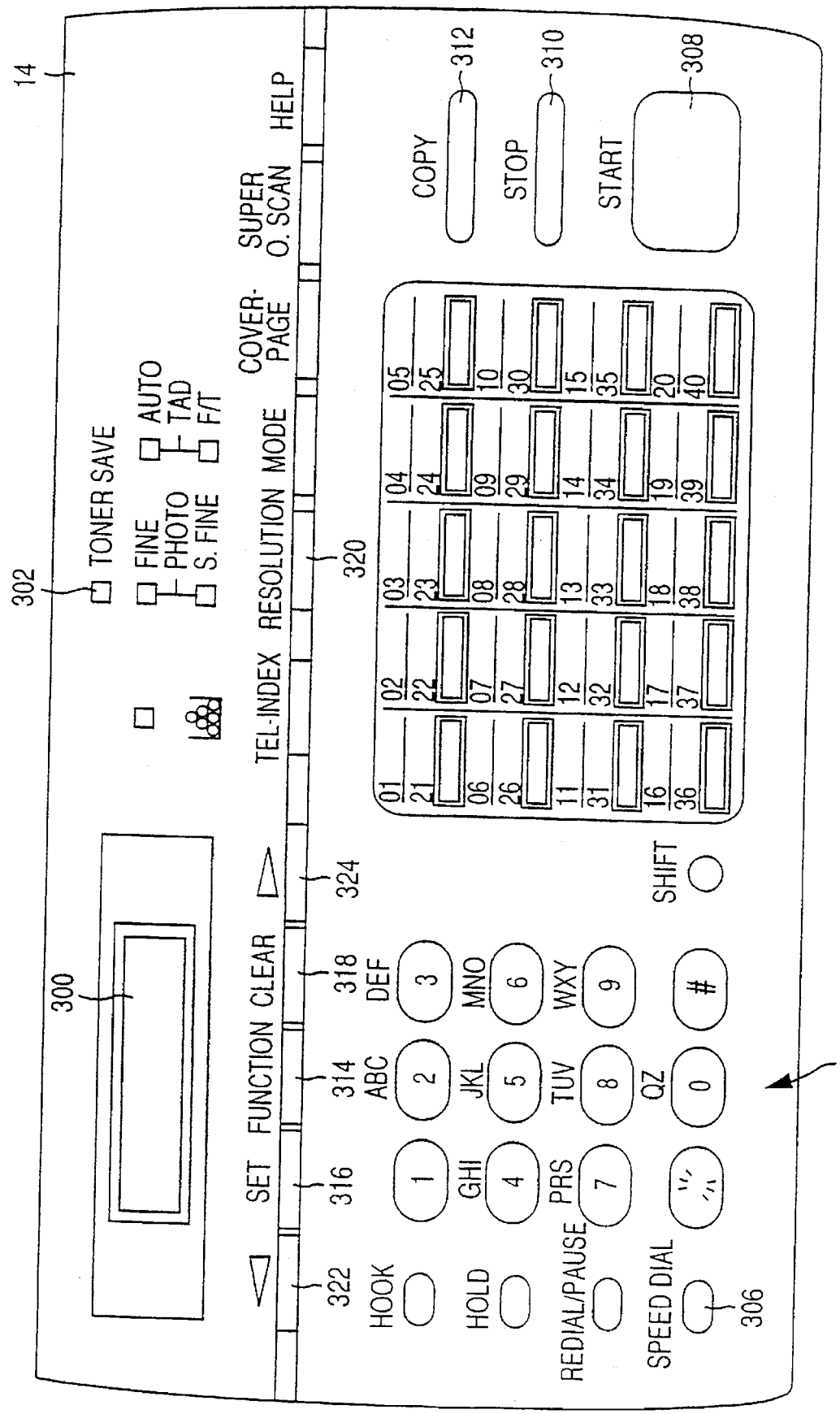
FIG. 19 is a plan view of an operator's control panel of the facsimile system.

Referring next to FIG. 19, there will be described the operator's control panel 14 provided on the upper surface of the front portion of the main body 10 of the facsimile system.

The operator's panel 14 has a relative rear section which provides a display 300 and a TONER SAVE light 302, a relatively front section which provides TEN keys 304, a SPEED DIAL key 306, a START key 308, a STOP key 310, and a COPY key 312, and an intermediate section which provides a FUNCTION key 314, a SET key 316, a CLEAR key 318, a RESOLUTION key 320, and CURSOR keys 322, 324.

The display 300 is adapted to indicate operating conditions of the facsimile system, and provides the user with procedures for operating the facsimile system. The TONER SAGE light 302 is turned on when the user has selected a TONER-SAVE recording mode or when a TONER SAVE flag (which will be described) is set at "1".

The TEN keys 304 are used to enter the facsimile or telephone numbers of remote facsimile systems (remote facsimile receivers) 325 (FIG. 17) when facsimile data are sent to the remote facsimile receivers 325. The TEN keys 304 are also used to register the facsimile numbers of the desired remote facsimile systems 325 in relation to respective facsimile number codes (e.g., two- or three-digit codes), and to select various functions of the present facsimile system.

The SPEED DIAL key 306 is used to generate the remote facsimile number represented by the facsimile number code entered through the TEN keys 304. The START key 308 is used to start the transmission of facsimile data to the specified remote facsimile receiver 325, and to register the patterns of call signals which call two or more telephone numbers used by the present facsimile system, which is of a distinctive ringing type as disclosed in co-pending U.S. application Ser. No. 08/348,900. The STOP key 310 is used to stop the selected functions, for example.

The FUNCTION key 314 is also used to provide indications on the display 300 of the functions available in the present facsimile system. The SET key 316 is used to set entered data for the various functions, while the CLEAR key 318 is used to cancel the selected functions. The RESOLUTION key 320 is used to select the resolution of the image to be reproduced. The image resolution is normally set at the STANDARD value. When the RESOLUTION key 320 is pressed once, the resolution is set to the FINE value. When the key 320 is pressed twice, the resolution is set to the SUPER-FINE value. When the key 320 is pressed three consecutive times, the facsimile system is placed in a GRAY SCALE mode in which the density of the image to be reproduced is set by the FUNCTION and CURSOR keys 314, 322, 324.

The CURSOR keys 322, 324 are used to move a cursor on the screen on the display 300, and to select the various functions. The CURSOR keys 322, 324 are also used to correct erroneously entered data, for example, erroneously entered numbers when the remote facsimile numbers are registered in relation to the respective facsimile number codes.

As shown in FIG. 2, the control device 40 is disposed in a lower section of the facsimile system. As indicated in the block diagram of FIG. 17, the control device 40 incorporates a central processing unit (CPU) 330, a random-access memory (RAM) 332, a read-only memory (ROM) 334, an electrically erasable programmable read-only memory (EEPROM) 336, a digitizing circuit 338, a threshold circuit 340, a parallel/serial converter circuit 342, an encoder/decoder circuit 344 and a transmission/reception control circuit 346. To the control device 40, there are connected the image reading device 66, the operator's control panel, the residual toner amount sensor 142, the paper sensor 25, the original sensor 72 and the humidity sensor 64. The control device 40 is connected to a telephone line 359 through a MODEM 350 and a network control unit (NCU) 352, so that the control unit 40 communicates with a selected one of the remote facsimile systems 325 through the telephone line 359. The control device 40 controls the agitating motor 200 for the third agitating member 122, the original feeding device 70 and a ringing device 358 through the respective drivers 201, 354, 356.

The digitizing circuit 338 converts analog image data from the image reading device 66 into binary image data, using a threshold value given by the threshold circuit 340. The parallel/serial converter circuit 342 functions to parallel signals into serial signals or vice versa. The encoder/decoder circuit 344 functions to convert received coded image data into decoded image data in the form of dot data, and to convert the dot data into coded image data when the image data in the form of the dot data are transmitted to the remote facsimile system (remote facsimile receiver) 325. The transmission/reception control circuit 346 is used to effect the transmission and reception of ancillary data of the facsimile data, between the present facsimile system and the remote facsimile system 325, through the telephone line 359. The ancillary data include data indicative of the image resolution, and data indicative of the facsimile or telephone numbers of the present facsimile system and the remote facsimile system 325.

The MODEM 350 functions to modulate digital signals into analog signals, so that the analog signals are sent to the remote facsimile system 325 through the telephone line 359 and the NCU 352, and to demodulate analog signals from the remote facsimile system 325 into digital signals. The NCU 352 automatically receives the analog signals upon reception of a call signal from the remote facsimile system 325 through the telephone line 359, and automatically generates a call signal calling the remote facsimile system 325 upon data transmission to the remote facsimile system.

The ringing device 358 is activated by the driver 356 to generate a ringing sound, in response to the call signal received from the remote facsimile system 325 (through a telephone company), or in response to a command from the control device 40. The driver circuit 356 applies a voltage signal to the ringing device 358 depending upon the pattern of the received call signal.

The voltage applied to the ringing device 358 through the driver 356 changes in two steps. The device 358 is energized to produce a sound when the voltage is low, and is de-energized when the voltage is high. Each call signal has ON and OFF states (ON and OFF times) corresponding to the low and high levels of the voltage applied to the ringing device 358. Different call signals have different patterns which are defined by the numbers and time lengths of the ON and OFF states. In each pattern, the number of the ON state or states in each period of the call signal is equal to the number of the OFF state or states, and one long OFF state is included in each period of the call signal so that each period can be determined by detecting the long OFF state. The present facsimile system of distinctive ringing type uses different telephone or facsimile numbers which are called by the respective call signals having different patterns.

Figure 20:
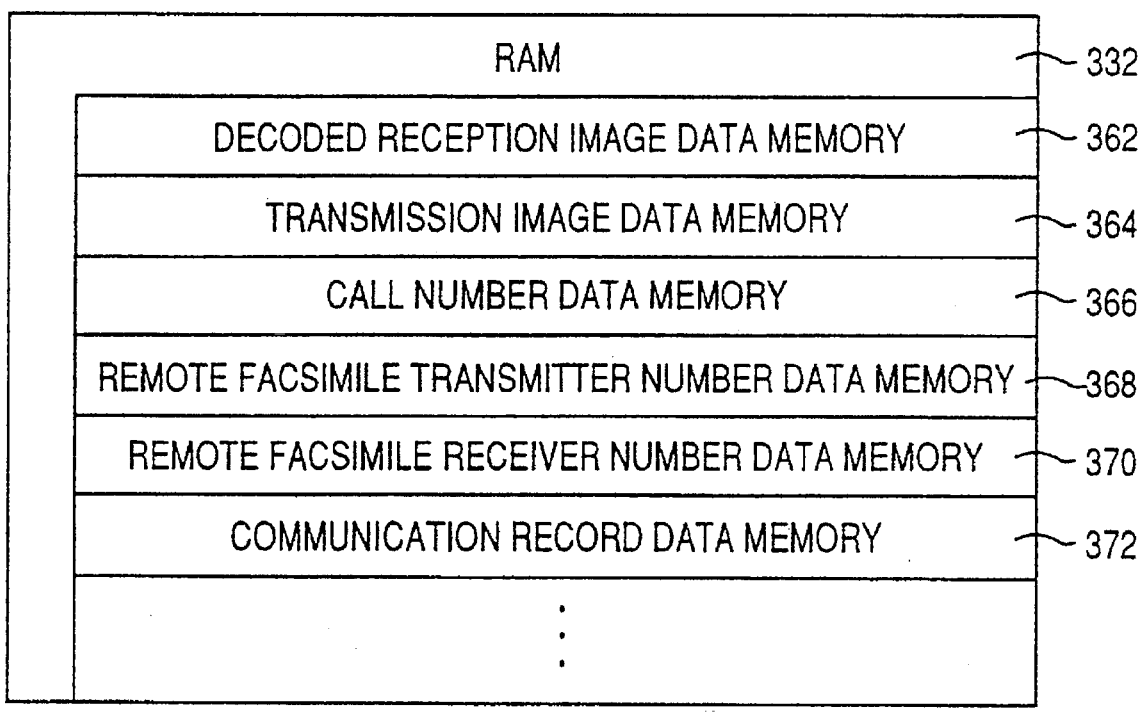
FIG. 20 is a view schematically indicating an arrangement of a RAM of the control device of FIG. 17.

As shown in FIG. 20, the RAM 332 includes: an ENCODED RECEPTION IMAGE DATA memory 360 for storing coded image data received from the remote facsimile system 325; a DECODED RECEPTION IMAGE DATA memory 362 for storing decoded image data (i.e., dot data) obtained from the encoded image data; a TRANSMISSION IMAGE DATA memory 364 for storing image data obtained by the image reading device 66; a CALL NUMBER DATA MEMORY 366 for storing number-related data indicative of the distinctive ringing telephone number of the present facsimile system which has been actually called by the call signal received from the remote facsimile transmitter 325; a REMOTE FACSIMILE TRANSMITTER NUMBER DATA memory 368 for storing number-related data indicative of the facsimile number of the remote facsimile transmitter 325 from which image data have been received; a REMOTE FACSIMILE RECEIVER NUMBER DATA memory 370 for storing data associated with the facsimile numbers of the selected remote facsimile receivers 325; and a COMMUNICATION RECORD DATA memory 372 for storing facsimile communication record data representative of a communication record which indicates facsimile communications with the remote facsimile systems 325.

Figure 21:
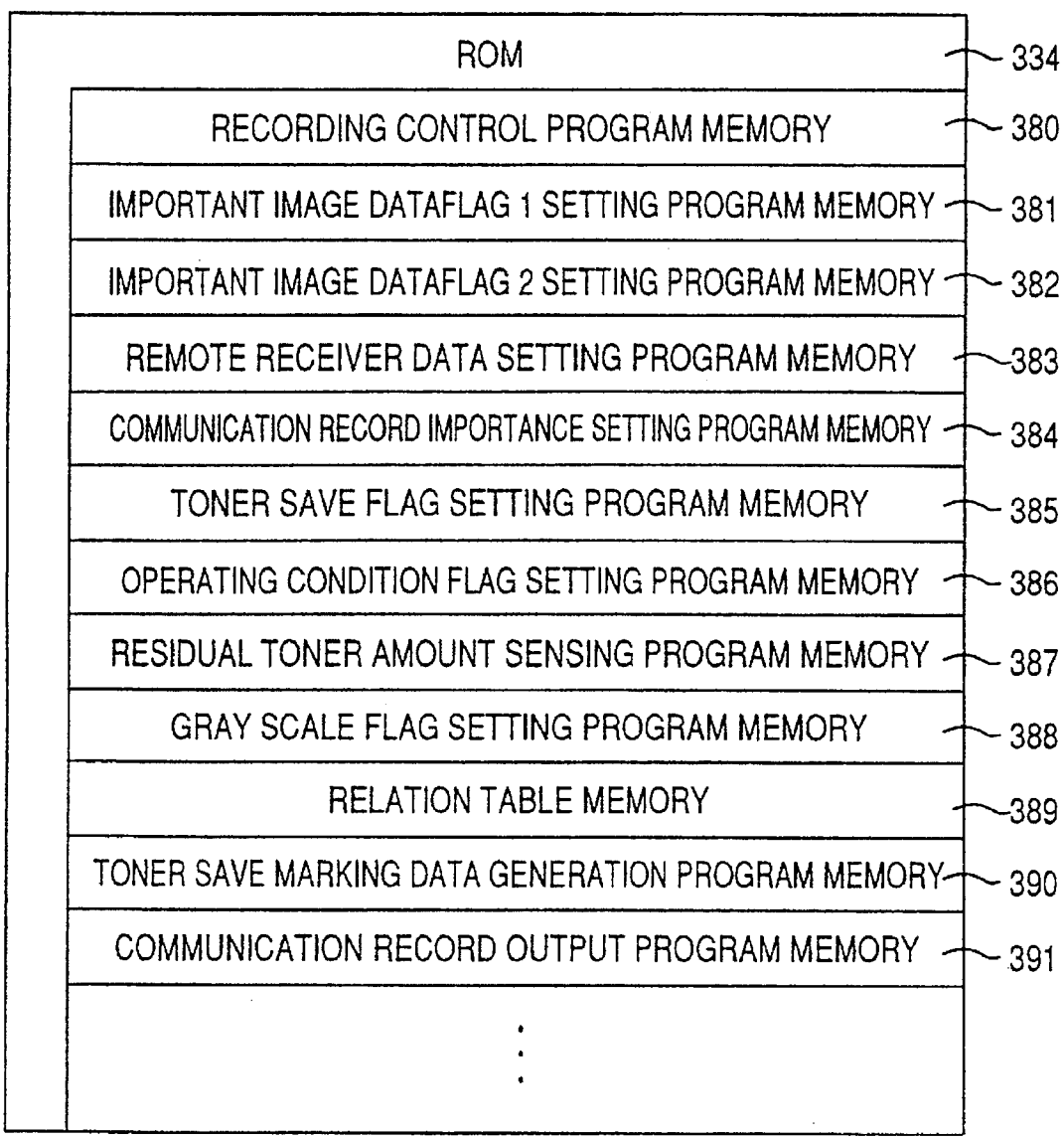
FIG. 21 is a view schematically indicating an arrangement of a ROM of the control device.
Figure 22:
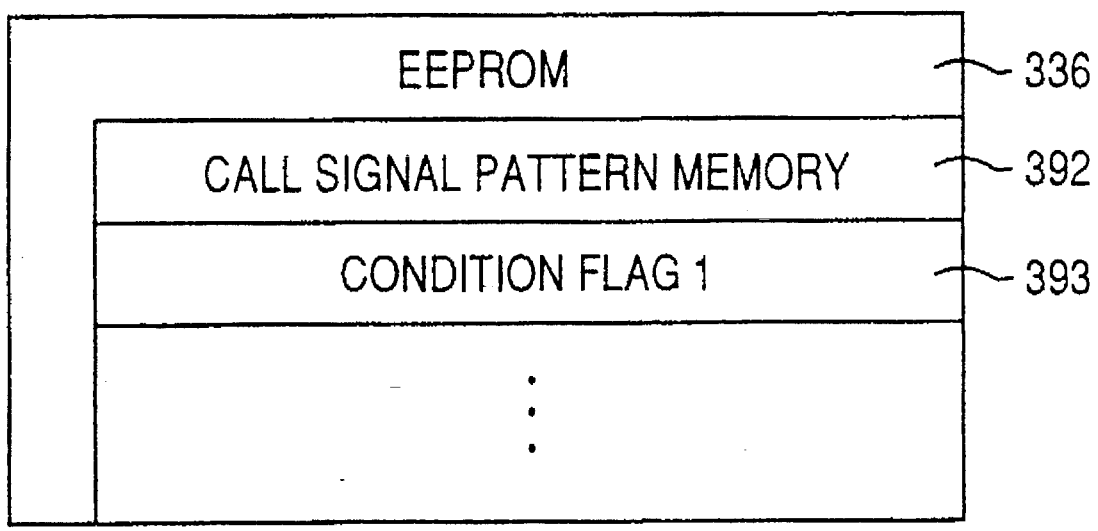
FIG. 22 is a view schematically indicating an arrangement of an EEPROM of the control device.

As shown in FIG. 21, the ROM 334 includes: a RECORDING CONTROL program memory 380; an IMPORTANT IMAGE DATA FLAG 1 SETTING program memory 381; an IMPORTANT IMAGE DATA FLAG 2 SETTING program memory 382; a REMOTE RECEIVER DATA SETTING program memory 383; a COMMUNICATION RECORD IMPORTANCE SETTING program memory 384; a TONER SAVE FLAG SETTING program memory 385; an OPERATING CONDITION FLAG SETTING program memory 386; a RESIDUAL TONER AMOUNT SENSING program memory 387; a GRAY SCALE FLAG SETTING program memory 388; a RELATION TABLE memory 389; a TONER SAVE MARKING DATA GENERATION program memory 390; and a COMMUNICATION RECORD OUTPUT program memory 391. The programs stored in these program memories 380–391 will be described below.

The EEPROM 336 includes a CALL SIGNAL PATTERN memory 392 and a CONDITION flag 1. The CALL SIGNAL PATTERN memory 392 stores data indicative of the different patterns of selected ones of the call signals assigned to call the respective distinctive ringing telephone numbers of the present facsimile system. The OPERATING CONDITION flag 1 is set to "1" when the control device 40 determines, on the basis of the output of the residual toner amount sensor 142, that the amount of the toner 50 remaining in the toner cartridge 120 is smaller than a predetermined limit.

There will be described an operation of the present facsimile system.

The facsimile system operates to effect recording on the paper sheet or sheets 18 according to image data generated on the basis of facsimile data received from the remote facsimile transmitter 325, under the control of the Control device 40 When the TONER SAVE flag is set at "0", the control device 40 is placed in the NON-TONER-SAVE recording mode in which the scanner unit 34 is operated according to the original image data (non-toner-save image data). When the TONER SAVE flag is set at "1", the control device 40 is placed in a TONER-SAVE recording mode in which the scanner unit 34 is operated according to toner-save image data. The toner-save image data are generated on the basis of the original image data as received from the remote facsimile transmitter 325.

While the TONER SAVE flag may be manually set by the user of the present facsimile system, this flag is automatically set by the control device 40 in the present embodiment, as described below, in a TONER SAVE FLAG SETTING routine according to a program stored in the program memory 385, as illustrated in the flow chart of FIG. 23.

The TONER SAVE FLAG SETTING routine is initiated with step S1 to determine whether an IMPORTANT IMAGE DATA flag 3 is set at "1". If a negative decision (NO) is obtained in step S1, the control flow goes to step S2 to determine whether a GRAY SCALE flat is set at "1". If a negative decision (NO) is obtained in step S2, the control flow goes to step S3 to determine whether any one of other flags such as an OPERATING CONDITION flag and a USER-SET flag is set at "1". If an affirmative decision (YES) is obtained in any one of steps S1–S3, that is, if any one of the IMPORTANT IMAGE DATA flag 3, GRAY SCALE flag and the other flags is set at "1", the control flow goes to step S4 to reset the TONER SAVE flag to "0". If the negative decision (NO) is obtained in all the steps S1–S3, the control flow goes to step S5 to set the TONER SAVE flag to "1".

The IMPORTANT IMAGE DATA flag 3 is set to "1" when the subject matter or content of primary data or image data of the facsimile data received from the remote facsimile transmitter 325 is considered to be important to the user of the present facsimile system. The IMPORTANT IMAGE DATA flag 3 is set or reset according to the states of an IMPORTANT IMAGE DATA flag 1 and an IMPORTANT IMAGE DATA flag 2. More specifically, the IMPORTANT IMAGE DATA flag 3 is set to "1" when either one of the IMPORTANT IMAGE DATA flags 1 and 2 is set at "1", and is reset to "0" when both of the IMPORTANT IMAGE DATA flags 1 and 2 are set at "0".

It is generally difficult to determine whether the subject matter or content of the received original image data is important or not, before an image is recorded or reproduced according to the received original image data. The present embodiment is uniquely arranged to estimate that the subject matter of the received original image data is important, if the remote facsimile transmitter 325 from which the image data have been received is one of predetermined remote facsimile transmitters or facsimile systems (remote parties) which are expected to transmit image data whose importance is relatively high.

Figure 24:
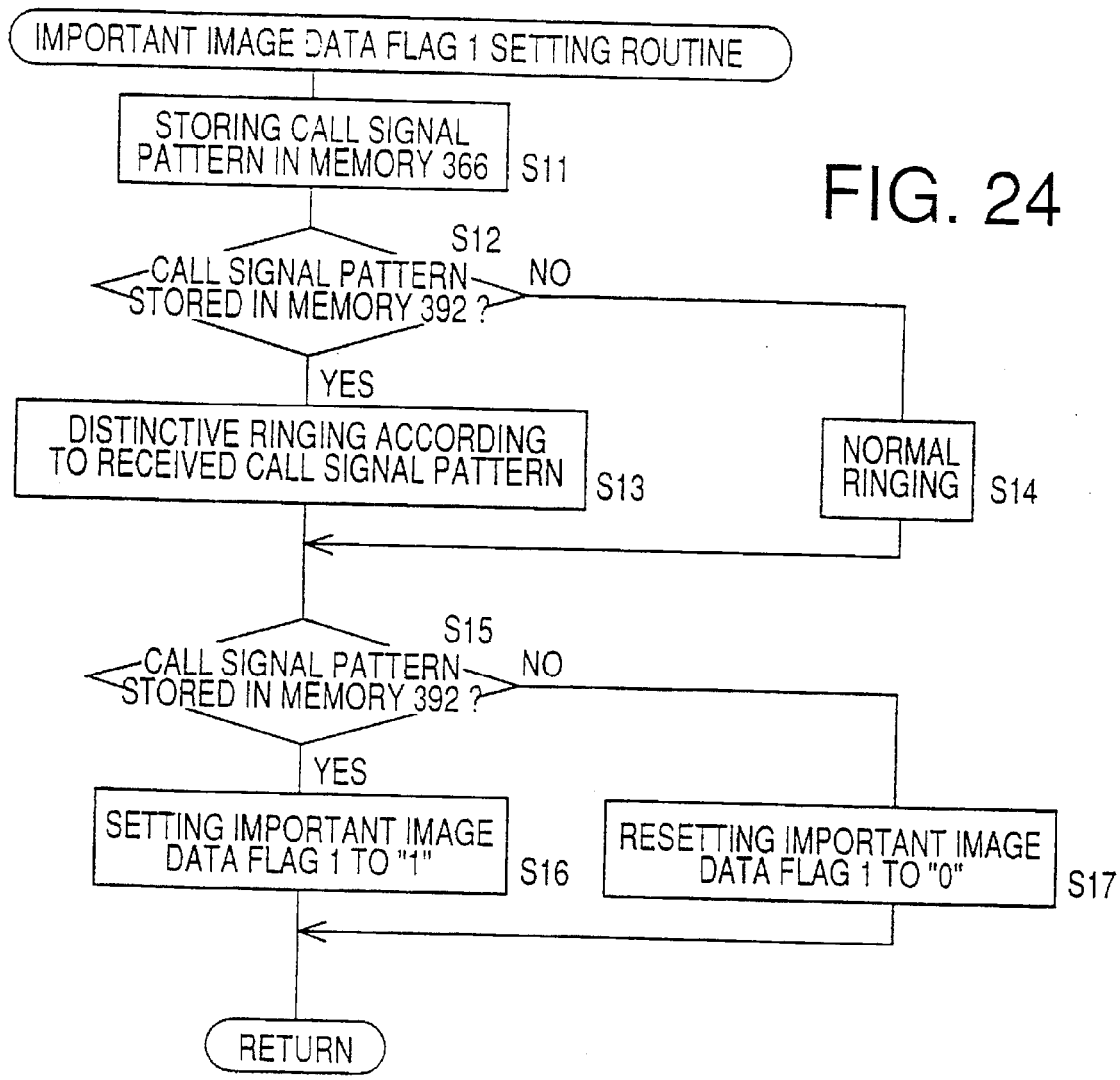
FIG. 24 is a flow chart illustrating an IMPORTANT IMAGE DATA FLAG 1 SETTING routine stored in the ROM.
Figure 25:
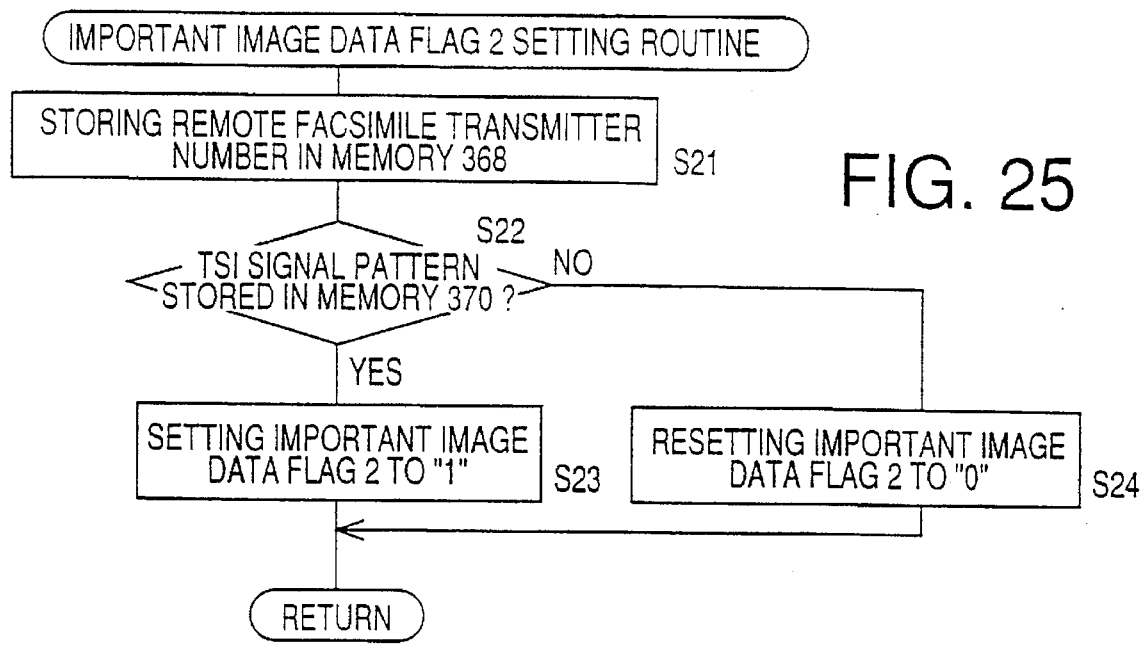
FIG. 25 is a flow chart illustrating an IMPORTANT IMAGE DATA FLAG 2 SETTING routine stored in the ROM.

To determine whether the remote facsimile transmitter 325 is one of the predetermined remote parties, an IMPORTANT IMAGE DATA FLAG 1 SETTING routine and an IMPORTANT IMAGE DATA FLAG 2 SETTING routine are executed according to the programs stored in the program memories 381 and 382, as illustrated in the flow charts of FIGS. 24 and 25, respectively. The routine of FIG. 24 for setting or resetting the IMPORTANT IMAGE DATA flag 1 is executed on the basis of the data stored in the CALL NUMBER DATA memory 366 and the data stored in the CALL SIGNAL PATTERN memory 392, while the routine of FIG. 25 for setting or resetting the IMPORTANT IMAGE DATA flag 2 is executed on the basis of the data stored in the REMOTE FACSIMILE TRANSMITTER NUMBER DATA memory 368 and the data stored in the REMOTE FACSIMILE RECEIVER NUMBER DATA memory 370. The data stored in the memories 366, 368 are received from the remote transmitter 325, as part of the facsimile data other than the primary data (image data), namely, as ancillary data associated with facsimile communications between the present facsimile system and the remote facsimile system.

The IMPORTANT IMAGE DATA flag 1 is a flag controlled on the basis of the data indicative of the facsimile number of the present or receiving facsimile system which is designated by the call signal received from the remote facsimile transmitter 325 (through a telephone company). As described above, the present facsimile system of the distinctive ringing type uses different telephone or facsimile numbers which are called by respective call signals of different patterns. When these different call signals are received, the ringing device 358 generate ringing sounds of the corresponding different patterns, under to a distinctive ringing service available from the telephone company. Usually, only the important remote calling parties (users of the remote facsimile transmitters 325) have been informed of the different facsimile numbers. Therefore, the remote facsimile transmitter 325 from which the call signal calling one of the different facsimile numbers of the present facsimile system has been received is considered to be one of the predetermined remote facsimile transmitters 325 which are expected to transmit image data whose subject matter or content is relatively important to the user of the present facsimile system.

To utilize the distinctive ringing service, the patterns of the call signals corresponding to selected ones of the plurality of facsimile numbers used by the present facsimile system (facsimile receiver) are stored in the CALL SIGNAL PATTERN memory 392 of the EEPROM 336. The patterns (combinations of time lengths of ON and OFF states) of the call signals are registered in a predetermined procedure by manipulation of the operator's control panel 14. When a call signal has been received from a certain remote facsimile transmitter 325, the facsimile number designated by the call signal and the corresponding pattern are stored in the CALL NUMBER DATA memory 366. This pattern of the received call signal stored in the memory 366 is compared with the patterns of the call signals stored in the CALL SIGNAL PATTERN memory 392, to determine whether the pattern of the received call signal is registered in the memory 392, according to the IMPORTANT IMAGE DATA FLAG 1 SETTING routine of FIG. 24.

The IMPORTANT IMAGE DATA FLAG 1 SETTING routine is initiated with step S11 in which the pattern of the received call signal is stored in the memory 366. Step S11 is followed by step S12 to determine whether the pattern stored in the memory 366 is identical with any one of the patterns stored in the memory 392. If an affirmative decision (YES) is obtained in step S12, step S13 is implemented to activate the ringing device 358 to generate a distinctive ringing sound corresponding to the registered pattern of the received call signal. If a negative decision (NO) is obtained in step S12, the control flow goes to step S14 to active the ringing device 358 to generate a predetermined normal ringing sound (according to a pattern not registered in the memory 392).

Steps S13 and S14 are followed by step S15 identical with step S12. If an affirmative decision (YES) is obtained in step S15, the control flow goes to step S16 to set the IMPORTANT IMAGE DATA flag 1 to "1". If a negative decision (NO) is obtained in step S15, the control flow goes to step S17 to reset the IMPORTANT IMAGE DATA flag 1 to "0". Thus, the IMPORTANT IMAGE DATA flag 1 is set to "1" when the received call signal designates one of the facsimile numbers of the distinctive ringing service, namely, when the subject matter of the received original image data is important.

The IMPORTANT IMAGE DATA flag 2 is a flag controlled on the basis of the data indicative of the facsimile number of the remote facsimile transmitter 325 from which facsimile data have been received. In the present facsimile system, the facsimile numbers of the selected remote facsimile receivers 325 are stored in the REMOTE FACSIMILE RECEIVER NUMBER DATA memory 370, in relation to the corresponding facsimile number codes (e.g., two- or three-digit codes), which are entered, rather than the facsimile numbers per se, by the SPEED DIAL and TEN keys 306, 304 on the operator's control panel to designate the desired remote facsimile receiver 325. The use of these facsimile number codes facilitate the facsimile transmission procedure. If the facsimile number of the remote facsimile transmitter 325 from which the image data have been received is one of the facsimile numbers of the remote facsimile receivers 325 stored in the memory 370, the IMPORTANT IMAGE DATA flag 2 is set to "1". Usually, the facsimile number codes are assigned to the predetermined remote facsimile systems 352 which are expected to transmit image data whose subject matter or content is important to the user of the present facsimile system.

The facsimile numbers and the corresponding codes of the predetermined remote facsimile systems (receivers) 325 are registered in the REMOTE FACSIMILE RECEIVER NUMBER DATA memory 370 through the operator's control panel 14. When image data have been received from a given remote facsimile transmitter 325, the facsimile number of that remote facsimile transmitter is stored in the REMOTE FACSIMILE TRANSMITTER NUMBER DATA memory 368, and is compared with the facsimile numbers stored in the REMOTE FACSIMILE RECEIVER NUMBER DATA memory 370, to determine whether the facsimile number stored in the memory 368 is identical with one of the facsimile numbers stored in the memory 370. To this end, the IMPORTANT IMAGE DATA FLAG 2 SETTING routine is executed as illustrated in the flow chart of FIG. 25.

The IMPORTANT IMAGE DATA FLAG 2 SETTING routine of FIG. 25 is initiated with step S21 in which the facsimile number of the remote facsimile transmitter 325 is stored in the memory 368. Step S21 is followed by step S22 to determine whether the facsimile number in the memory 368 is identical with any one of the facsimile numbers registered in the memory 370. If an affirmative decision (YES) is obtained in step S22, the control flow goes to step S23 to set the IMPORTANT IMAGE DATA flag 2 to "1". If a negative decision (NO) is obtained in step S22, the control flow goes to step S24 to reset the IMPORTANT IMAGE DATA flag 2 to "0".

The GRAY SCALE DATA flag is set to "1" when the received image data are gray scale data. If image recording is effected in the TONER-SAVE recording mode according to the gray scale image data, there may arise a problem relating to the uniformity and gradation of the image density.

The gray scale image data are formulated to form an image in a dither matrix, namely, to represent a gray scale image by only one of two levels "white" and "black" corresponding to dot data bits "0" and "1". Accordingly, the logical values of the adjacent dot data bits obtained from the gray scale data tend to change relatively frequently. In other words, a unit volume of the dot data obtained by conversion from the gray scale data have comparatively large number of pairs of adjacent bits which have different logical values "0" and "1". Therefore, a determination as to whether the received image data are gray scale data can be effected by checking if the number of such pairs of adjacent bits per unit volume of the dot data obtained from the received image data is larger than a predetermined threshold value. Alternatively, the determination may be made on the basis of compressed run length codes.

In the present embodiment, the determination is effected on the basis of an initial portion of a batch of dot data as indicated in FIG. 30, which is obtained by decoding encoded image data (as indicated in FIG. 29) received from the remote facsimile transmitter 325. If all of the dot data sets for the first, second and third lines of the image are determined to be gray scale data, the dot data batch is determined to be gray scale data. This method of determination assures reliable setting of the GRAY SCALE flag.

Figure 26:
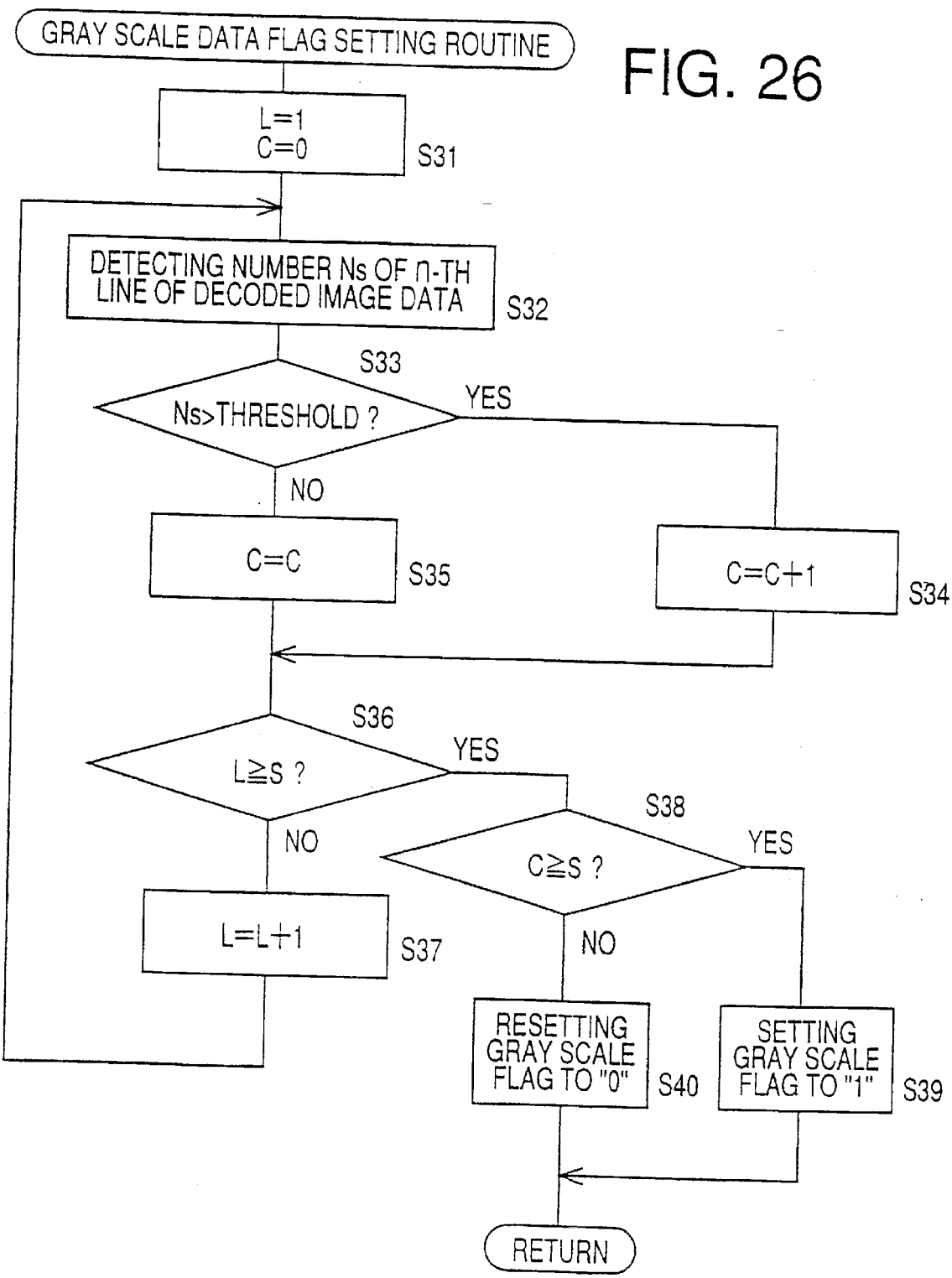
FIG. 26 is a flow chart illustrating a GRAY SCALE DATA FLAG routine stored in the ROM.

The GRAY SCALE flag is set or reset by a GRAY SCALE DATA FLAG SETTING routine according to a program stored in the GRAY SCALE DATA FLAG SETTING program memory 388, as illustrated in the flow chart of FIG. 26.

The GRAY SCALE DATA FLAG SETTING routine of FIG. 26 is initiated with step S31 in which line number "L" and count "C" are initialized to "0". Step S31 is followed by step S32 to calculate the number "Ns" of the pairs of adjacent dot data bits having different logical states, which pairs are included in the dot data set for the first line of image. Then, the control flow goes to step S33 to determine whether the number "Ns" is larger than a predetermined threshold. If an affirmative decision (YES) is obtained in step S33, the control flow goes to step S34 to increment the count "C". If a negative decision (NO) is obtained in step S33, step S35 is implemented to maintain the present count "C". Steps S34 and S35 are followed by step S36 to determine whether the line number "L" is equal to or larger than a predetermined value "s". In this specific example, the value "s" is equal to "3", as indicated above. A negative decision (NO) is obtained in step S36 in the first cycle of execution of the routine (in which the line number "L" is equal to "1"). In this case, step S37 is implemented to increment the line number "L", and the control flow goes back to step S32 and repeat the following steps S33–S37 until an affirmative decision (YES) is obtained in step S36. When the step S33 has been implemented for the number "Ns" for the third line of image, the affirmative decision (YES) is obtained in step S36, and the control flow goes to step S38 to determine whether the count "C" is equal to or larger than the predetermined value "3". If the number "Ns" is equal to "3", step S39 is implemented to set the GRAY SCALE DATA flag to "1". If the number "Ns" is equal to "0", "1" or "2", the control flow goes to step S40 to reset the GRAY SCALE DATA flag to "0".

Figure 27:
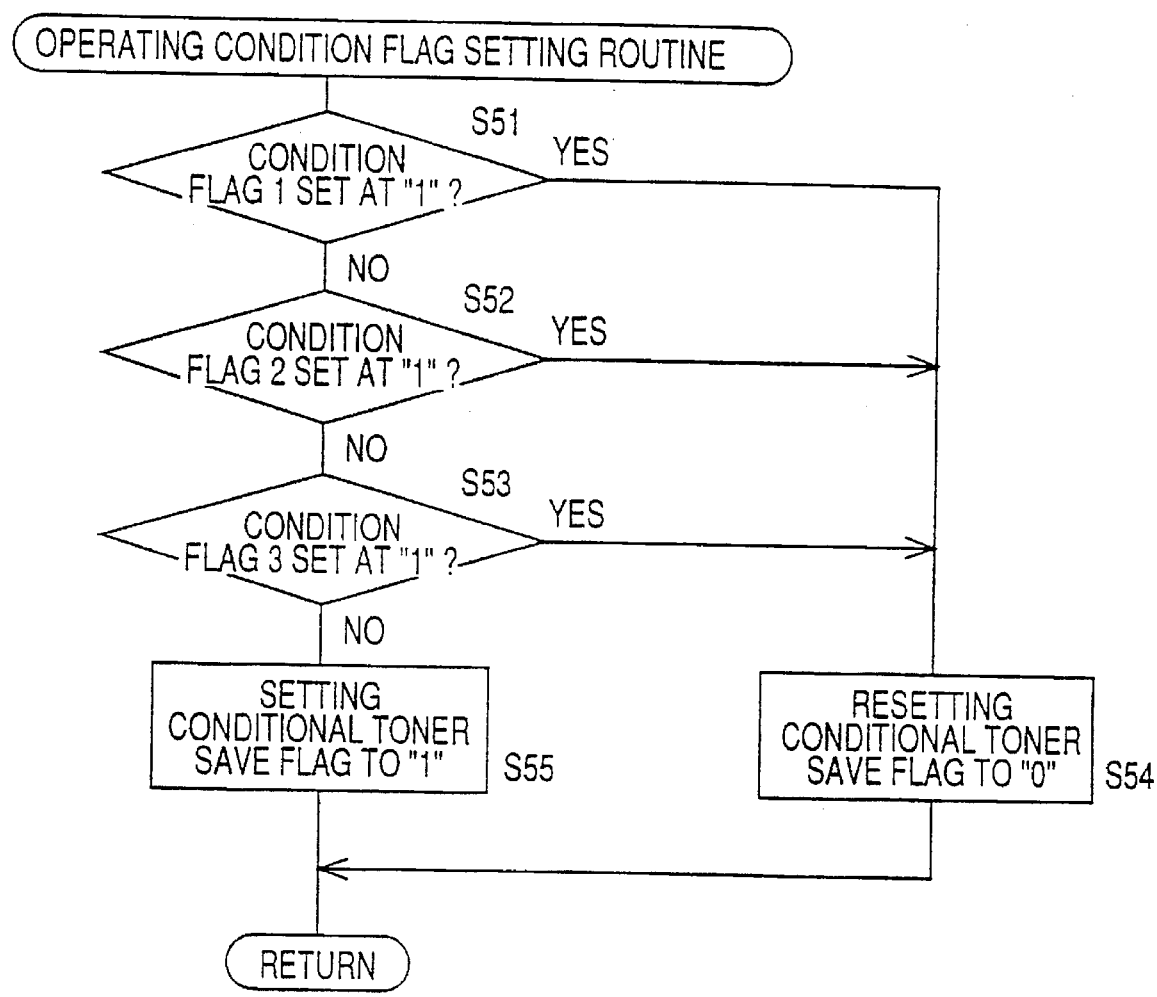
FIG. 27 is a flow chart illustrating a CONDITIONAL TONER SAVE FLAG SETTING routine stored in the ROM.

The OPERATING CONDITION flag is set or reset by the OPERATING CONDITION SETTING routine according to a program stored in the memory 386, as illustrated in the flow chart of FIG. 27, depending upon selected operating conditions of the present facsimile system, that is, the detected amount of the toner 50 remaining in the toner cartridge 120, detected humidity within the facsimile system, and absence or presence of the paper sheet 18 on the manual sheet insertion table 24.

The OPERATING CONDITION FLAG SETTING routine of FIG. 27 is initiated with step S51 to determine whether the CONDITION flag 1 stored in the EEPROM 336 is set at "1". If a negative decision (NO) is obtained in step S51, the control flow goes to step S52 to determine whether a CONDITION flag 2 is set at "1". If a negative decision (NO) is obtained in step S52, step S53 is implemented to determine whether a CONDITION flag 3 is set at "1". If an affirmative decision (YES) is obtained in any one of the steps S51–S53, the control flow goes to step S54 to reset the OPERATING CONDITION flag to "0" to select the TONER-SAVE recording mode (with the negative decision obtained in step S3), if the IMPORTANT IMAGE DATA flag 3 and the GRAY SCALE flag are both set at "0". If the negative decision (NO) is obtained in all of the three steps S51–S53, the control flow goes to step S55 to set the OPERATING CONDITION flag to "1" to select the NON-TONER-SAVE recording mode (with the affirmative decision obtained in step S3).

The CONDITION flag 1 is set to "1" if the amount of the toner 50 remaining in the toner cartridge 120 is smaller than the predetermined threshold. In this case, the TONER-SAVE recording mode is selected to reduce the rate of consumption of the toner 50 and thereby defer the replacement of the toner cartridge 120 with a new one.

Figure 28:
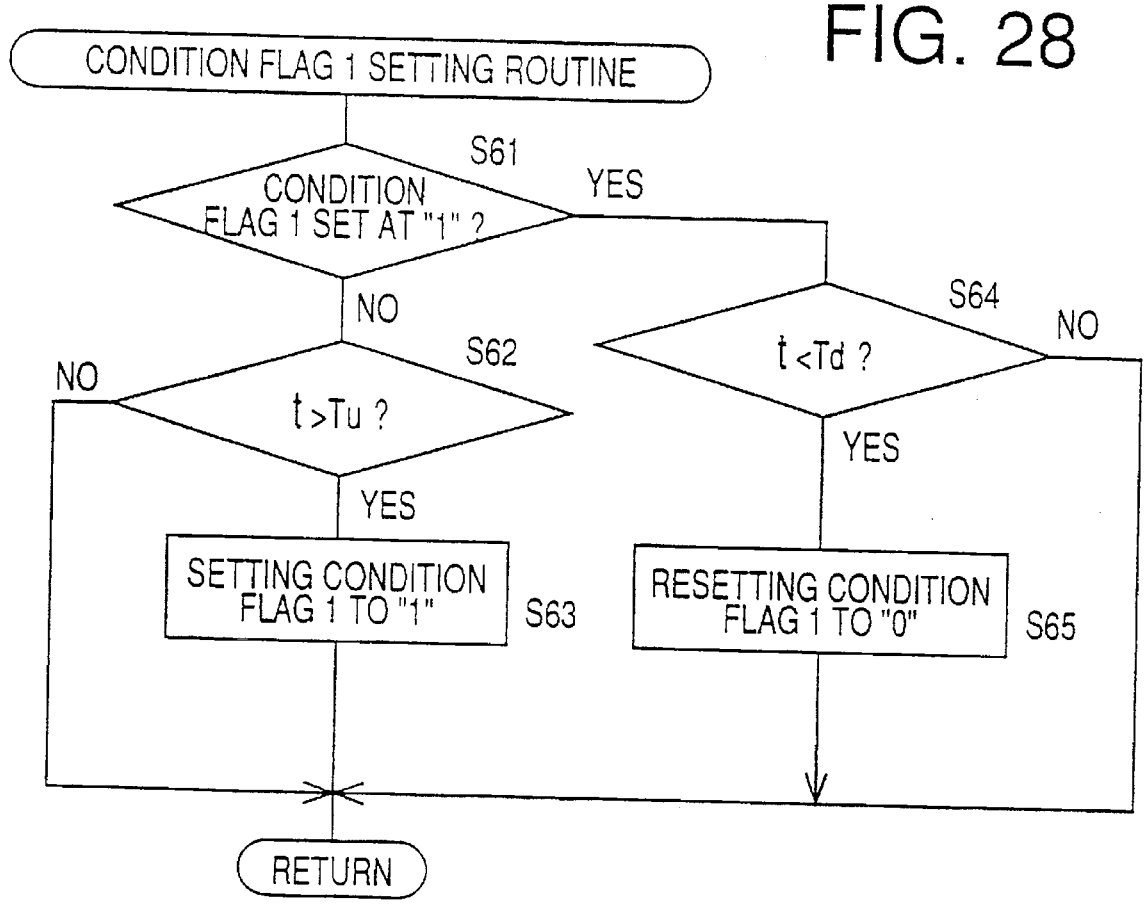
FIG. 28 is a flow chart illustrating an OPERATING CONDITION FLAG 1 SETTING routine.

The residual amount of the toner 50 is detected on the basis of the output signal of the residual toner amount sensor 142, by a RESIDUAL TONER AMOUNT SENSING routine according to a program stored in the program memory 387, as illustrated in the flow chart of FIG. 28.

Figure 16:
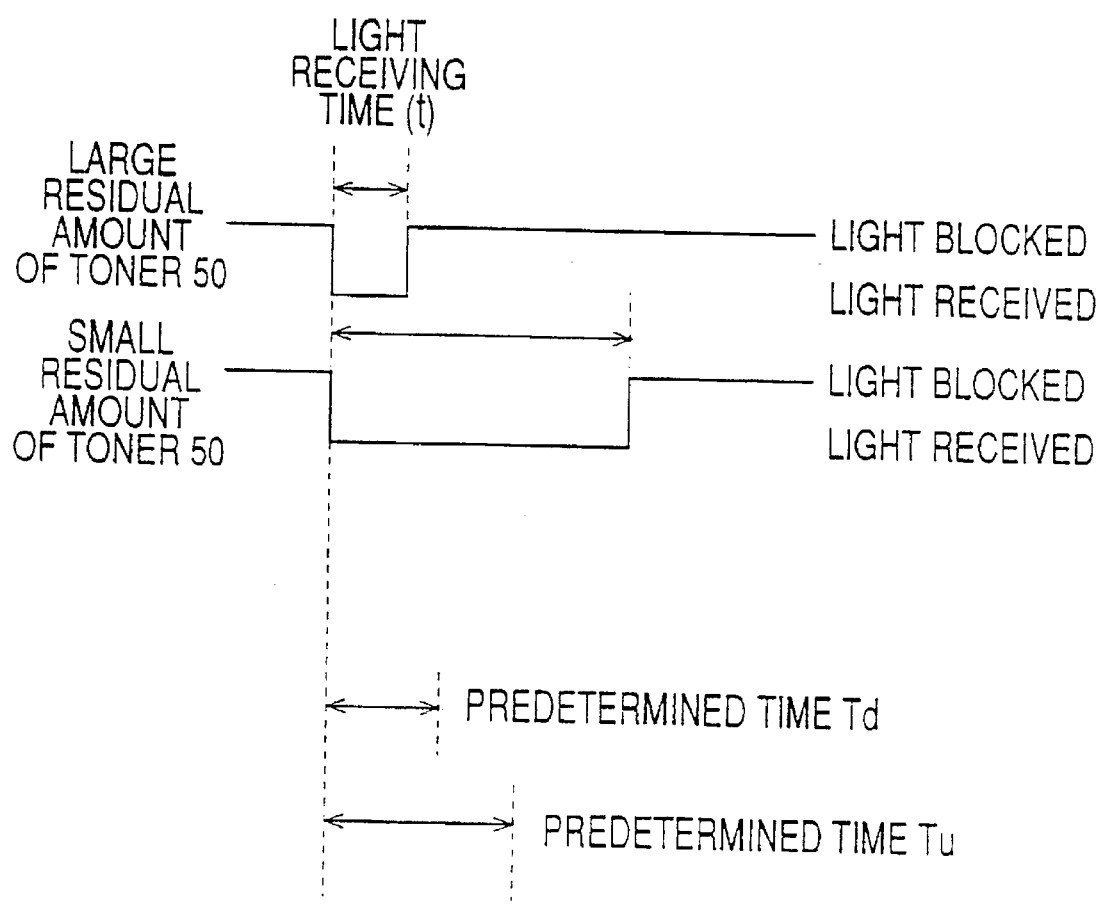
FIG. 16 is a view indicating outputs of the residual toner amount sensor of FIG. 14.

In the present embodiment, the output signal of the sensor 142 is detected three times upon starting of a recording operation according to image data. The CONDITION flag 1 is set to "1" if all of the three detections indicate that the residual amount of the toner 50 is smaller than the threshold value. Described more specifically, the routine of FIG. 28 is initiated with step S61 to determine whether the CONDITION flag 1 is currently set at "1". If the amount of the toner 50 is sufficiently large and the CONDITION flag 1 is currently set at "0", the control flow goes to step S62 to determine whether the light receiving time "t" of the light sensitive element of the sensing portion 144 of the sensor 142 is longer than a predetermined threshold "Tu". See FIG. 16. If an affirmative decision (YES) is obtained in step S62 for all the three detections of the output signals of the sensor 142, it means that the amount of the toner 50 is smaller than the predetermined value, and the control goes to step S63 to set the CONDITION flag 1 to "1". In this case, the OPERATING CONDITION flag is reset to "0", and the negative decision (NO) is obtained in step S3, whereby the TONER-SAVE flag is set to "1" to establish the TONER-SAVE recording mode if the negative decision (NO) is obtained also in steps S1 and S2.

If the CONDITION flag is currently set at "1", the affirmative decision (YES) is obtained in step S61, and the control flow goes to step S64 to determine whether the light receiving time "t" is shorter than a predetermined threshold "Td". If an affirmative decision (YES) is obtained in step S64 for all the three detections of the output signals of the sensor 142, the control goes to step S65 to reset the CONDITION flag 1 to "0", since the residual amount of the toner 50 is still sufficient and the CONDITION flag 1 has been erroneously set at "1".

As indicated above, the two different threshold values "Tu" and "Td" are used to change the value of the CONDITION flag 1. Namely, the two threshold values "Tu" and "Td" provide a control hysteresis to prevent "hunting", namely, frequent changes in the state of the CONDITION flag 1.

If the light receiving time "t" is not smaller than the threshold value "Td", the CONDITION flag 1 is held at "1".

The CONDITION flag 2 is set or reset depending upon the humidity within the present facsimile system, as a parameter representative of an operating environment of the facsimile system. More specifically described, the CONDITION flag 2 is reset to "0" to select the NON-TOE-SAVE recording mode if the humidity detected by the humidity sensor 64 is higher than a predetermined threshold. When the humidity is relatively high, the toner 50 tends to easily adhere to the surface of the photosensitive drum 30, and is less likely to be easily transferred to the paper sheets 18. If the developing device 48 is operated in the TONER-SAVE recording mode, the recorded image tends to be unclear.

The CONDITION flag 3 is set or reset depending upon the recording medium on which the recording is effected. Described more specifically, the CONDITION flag 3 is set to "1" to select the TONER-SAVE recording mode if the paper sheet 18 placed on the manual sheet insertion table 24 is detected by the sensor 25. Usually, the paper sheet 18 placed on the manual sheet insertion table 24 is a reclaimed paper sheet or a partially used sheet (one surface of which has a recorded image), which sheets are not expected to be kept for a long time. That is, a recording on such a paper sheet in the TONER-SAVE mode is generally acceptable.

Figure 23:
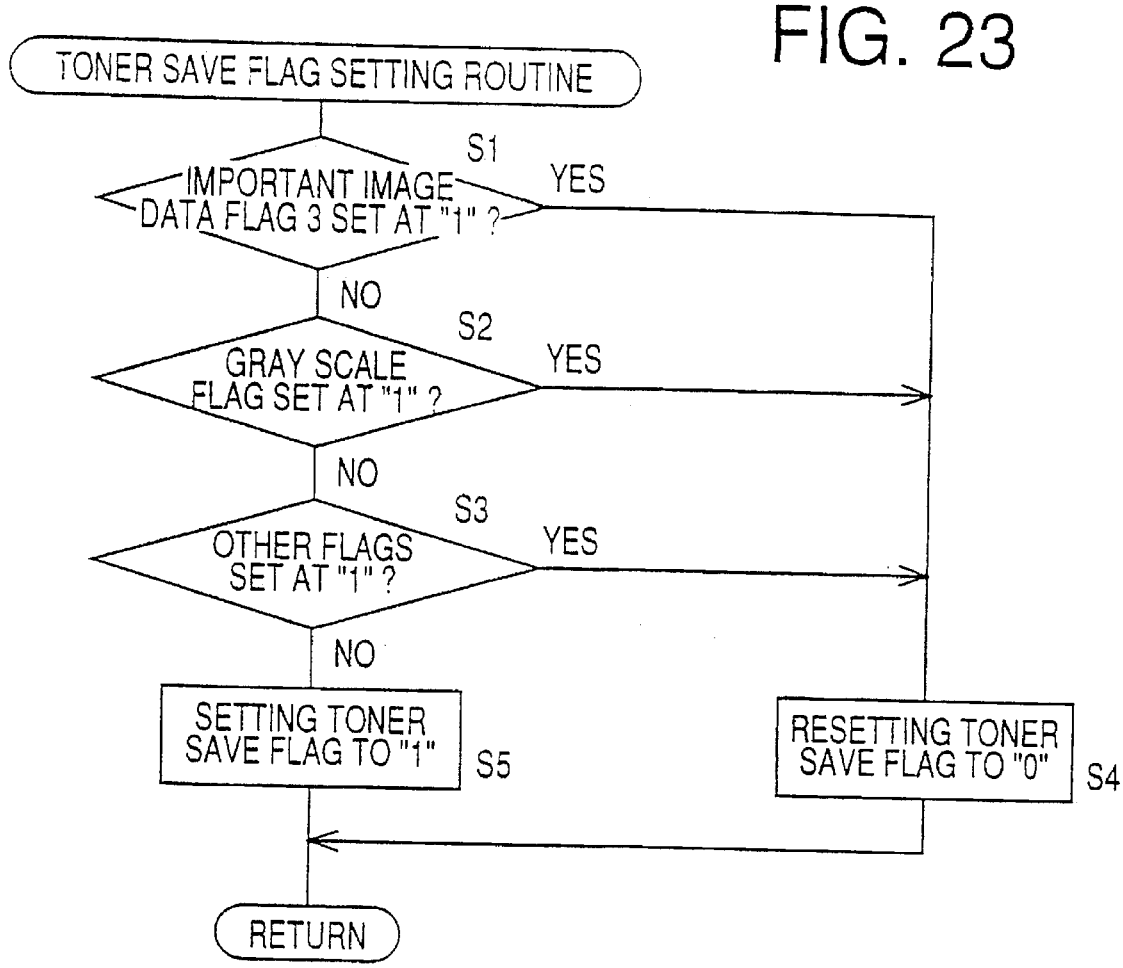
FIG. 23 is a flow chart illustrating a TONER SAVE FLAG SETTING routine stored in the ROM of FIG. 21.

The USER-SET flag which is also to be checked by step S3 of the TONER SAVE FLAG SETTING routine of FIG. 23 is set or reset manually by the user of the present facsimile system.

To set or reset the USER-SET flag, the FUNCTION key 314 and a numeral key "5" of the TEN keys 304 are pressed to provide a menu of functions on the display 300. Then, a numeral key "6" of the TEN keys 304 is pressed, whereby the display 300 provides an indication "6. TONER SAVE". Then, the SET key 316 is pressed, and the display 300 alternately provides indications "TONER SAVE: OFF" and "SELECT < > & SET". The indication "TONER SAVE: OFF" means that the NON-TONER-SAVE recording mode is currently selected, while the indication "SELECT < > & SET" prompts the user to select the TONER-SAVE or NON-TONER-SAVE recording mode by the CURSOR key 322, 324 and press the SET key 316.

If the TONER-SAVE recording mode is selected by the CURSOR key 324 according to the prompting indication, the display 300 provides an indication "TONER SAVE". If the NON-TONER-SAVE recording mode is selected by the CURSOR key 322, the display 300 provides an indication "TONER SAVE: OFF". In either of these cases, the SET key 316 should be pressed. Then, the display 300 provides the indication "6. TONER SAVE."

Thus, the user may set or reset the USER-SET flag to set or reset the TONER SAVE flag depending upon the degree of importance of original image data to be reproduced, or set the TONER SAVE flag if the user desires to effect a recording in the TONER-SAVE mode for some reason or other. It will be understood that the FUNCTION key 314, CURSOR keys 322, 324, SET key 316 and TEN keys 304 provide operator-controlled means for changing the state of the TONER SAVE flag or for selecting the TONER-SAVE or NON-TONER-SAVE recording mode.

The TONER SAVE flag is automatically set to "1" also when the user commands the control device 40 to produce a facsimile communication record which includes some of the ancillary data indicated above, which represent the facsimile numbers of the remote facsimile systems 325 to and from which facsimile data have been transmitted or received. Such ancillary data are stored in the COMMUNICATION RECORD DATA memory 372. The facsimile communication record is produced according to a program stored in the program memory 391. Since the degree of importance of the facsimile communication record is considered to be comparatively low, the TONER SAVE flag is set to "1" to produce the record in the TONER-SAVE recording mode.

To command the control device 40 to produce the facsimile communication record, the FUNCTION key 314 and a numeral key "3" of the TEN keys 304 are first pressed. As a result, the display 300 provides an indication "1. COMMUNICATION RECORD". In this condition, the SET key 316 is pressed, and the TONER SAVE flag is set to "1". The display 300 then provides an indication "PRESS START key". When the START key 308 is pressed, an operation to produce the facsimile communication record is started, and the display 300 provides the indication "1. COMMUNICATION RECORD".

As described above, the TONER SAVE flag is automatically set or reset depending upon the importance or nature or type of the original image to be reproduced, and depending upon the operating conditions or environment of the present facsimile system. A recording operation is effected in the TONER-SAVE or NON-TONER-SAVE mode selected by the TONER SAVE flag, according to the original image data generated on the basis of the primary data of the facsimile data received from a remote facsimile transmitter 325, or ancillary data of the facsimile data stored in the COMMUNICATION RECORD DATA memory 372. The original image data as received from the remote facsimile receiver 325 take the form of encoded image data and are stored in the ENCODE RECEPTION IMAGE DATA memory 360. The encoded image data are converted by the encoder/decoder circuit 344, into decoded image data in the form of dot data, and are stored in the DECODE RECEPTION IMAGE DATA memory 362.

The dot data consist of a multiplicity of dot data bits which indicate the presence or absence of image dots at the respective local spots or picture element positions 42 (FIG. 18) of a dot matrix. The position of each picture element 42 in the dot matrix is defined by line number and column number of the matrix. The number of the picture elements 42 in one line of the dot matrix varies depending upon the size of the paper sheet 18. Where the paper sheet 18 is the A4-size sheet, each line of the dot matrix consists of a total of 1728 picture elements 42 corresponding to the columns of the dot matrix. Accordingly, the dot data for each line of image consists of 1728 bits (=216 bytes). Usually, the dot data are processed at one time for each page of image to be reproduced.

Each rotation of the photosensitive drum 30 corresponds to one page of image, and the scanner unit 34 is controlled to imagewise expose the drum 30 along each scanning line according to 216 bytes of dot data. Each byte of the dot data is identified by the line number (represented by an address) and the byte number. Each byte corresponds to eight columns of the dot matrix.

Figure 32:
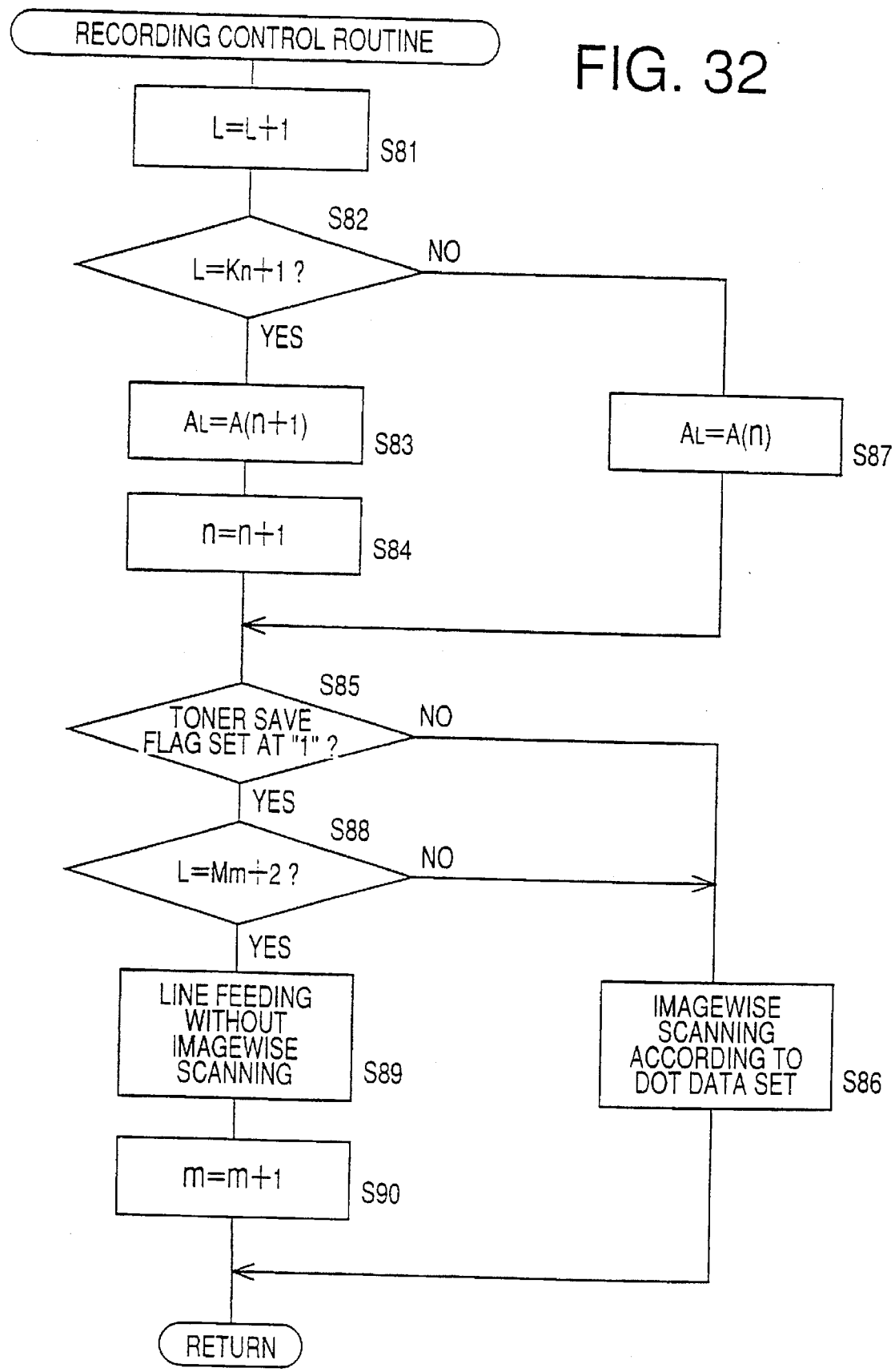
FIG. 32 is a flow chart illustrating a recording control routine stored in the ROM.

The line number and the byte number of the dot data are designated by a RECORDING CONTROL routine according to a program stored in the program memory 380, as illustrated in the flow chart of FIG. 32.

The routine of FIG. 32 uses two control constants K and M, which are both positive integers. These control constants K, M are automatically determined on the basis of the image resolution of the scanner unit 34 of the present facsimile system (hereinafter referred to as "own resolution") and the image resolution of the remote facsimile system 325 (hereinafter referred to as "remote resolution"), and according to a relation table stored in the RELATION TABLE memory 389 as indicated in FIG. 31. The own resolution corresponds to the size of the picture elements 42 of the dot matrix of the image to be reproduced by the present facsimile system. The remote resolution is the resolution of the original image represented by the original image data received from the remote facsimile transmitter 325.

The size of the picture element 42 in the secondary scanning direction (in the direction of the column of the dot matrix) varies with the image resolution as indicated below.

SUPER-FINE: $1/15.4$ mm

FINE: $1/7.7$ mm

STANDARD: $1/3.85$ mm

For example, the size of the picture elements 42 in the secondary scanning direction when the SUPER-FINE image resolution is selected is one half that when the FINE image resolution is selected. Therefore, when the own resolution is SUPER-FINE while the remote resolution is FINE, the size of the image reproduced on the present facsimile system is reduced to a half that of the original image represented by the received original image data. To compensate for a difference between the own and remote resolutions, in this case, original image data for one line of image should be used to reproduce two lines of the same images. To this end, the control constant K is set at "2". For the same reasons, the control constant K is set at "1" when the own and remote resolutions are the same. When the own and remote resolutions are SUPER-FINE and STANDARD, respectively, the constant K is set at "4".

The control constant M designates the degree of saving of the toner 50 in the TONER-SAVE recording mode. The degree of saving of the toner decreases with an increase in the constant M. When the constant M is "2", the ratio of the number of lines to be reproduced according to the original image data to the total number of the lines which include blank lines for saving the toner 50 is equal to ½. When the constant M is "4", the ratio is equal to ¾. If the total number of lines is "4", in this case, only one blank line is provided. In the present embodiment, each blank line is provided by rotating the photosensitive drum 30 by the predetermined incremental angle corresponding to one line, without imagewise scanning of the drum 30. However, each blank line is formed according to a dummy dot data set whose bits are all "0".

Although the constant K may be determined independently of the constant M or depending upon the constant M, the present embodiment is adapted such that the constant M is set at "2" in all cases independently of the constant K and the own and remote image resolutions, as indicated in FIG. 31. Even when the own and remote resolutions are the same, the constant M is set at "2", so that the recording is effected in the TONER-SAVE recording mode.

There will be described a recording operation in the NON-TONER-SAVING recording mode with the TONER-SAVE flag set at "0". In this case, a negative decision (NO) is obtained in step S85 of the routine of FIG. 32, and all lines are recorded according to the original image data, more precisely, according to respective sets of dot data obtained from the encoded reception image data received from the remote transmitter 325. In the flow chart of FIG. 32, "L" designates each line of electrostatic latent image formed on the photosensitive drum 30, but not the line of an original image as represented by the corresponding set of the dot data. When the constant K is not "1", the two or more lines of electrostatic latent images are formed corresponding to one line of the original image represented by a set of dot data. In the routine of FIG. 32, the line number "L" and integers "m" and "n" are initially zeroed.

Each set of dot data representing a line of original image consists of 216 bytes (8×216 bits=1728 bits) where the paper sheet 18 is an A4 size sheet, and is designated by (n+1) represented by the respective address, as indicated in FIG. 30, where "n"=0, 1, 2, 3, . . . This dot data set (n+1) is used for forming electrostatic latent image lines (K×n+1) through {K×(n+1)}. When the integer "n" is "0", the first dot data set (0+1) is used for the first (K×0+1) through K-th {K×(0+1)} lines of electrostatic latent images. When the integer "n" is "1", the second dot data set (1+1) is used for the (K+1)th through 2K-th lines of electrostatic latent images.

The routine of FIG. 32 where the constant K is set at "4" will be described by way of example.

The routine is initiated with Step S81 to increment the line number L. In the first cycle of execution of the routine of FIG. 32, the line number L (initially set at "0") is incremented to "1". Then, the control flow goes to step S82 to determine whether the line number L is equal to (Kn+1). Since the integer is initially set at "0", step S82 in the first cycle of execution of the routine is to determine whether the number line L is equal to (4×0+1), namely, equal to "1" or not. Therefore, an affirmative decision (YES) is initially obtained in step S82, and the control flow goes to step S83 to set the address $A_L$ (=A1) of the line number L (first line of the electrostatic latent image) to (0000) corresponding to the (n+1)th line, namely, first line of the original image represented by the first set of the dot data. Thus, the first dot data set designated by the address (0000) is retrieved. Step S83 is followed by S84 to increment the integer "n" and S85 to determine whether the TONER SAVE flag is set at "1". In the present case where the flag is set at "0", a negative decision is obtained in step S85, and the control goes to step S86 to imagewise scan the photosensitive drum 30 according to the first dot data set which consists of 216 bytes (Y1 through Y216) at the address (0000) as indicated in FIG. 30, whereby the first line of electrostatic latent image is formed such that the local spots corresponding to the picture elements 42 are laser-irradiated when the corresponding dot data bits are "1", and not laser-irradiated when the dot data bits are "0", as indicated in FIG. 18. As the drum 30 is imagewise scanned, the drum is rotated by the predetermined incremental angle corresponding to one line.

The imagewise exposure of the photosensitive drum 30 by a laser beam is started a predetermined time after the horizontal synchronizing signal is generated, so that the retrieval of the appropriate dot data set is synchronized with the imagewise exposure of the photosensitive drum 30. The predetermined time indicated above corresponds to a dummy scanning area which precedes the line of electrostatic latent image to be formed within a predetermined area corresponding to the width of the paper sheet 18.

Upon completion of step S86, the control flow returns to step S81 to increment the line number L to "2". Step S81 is followed by step S82 to determine whether the line number L is equal to "5" (=4×1+1). In this case where the line number L is "2", a negative decision (NO) is obtained in step S82, and the control flow goes to step S87 to set the address $A_L$ (=A2) of the second line of electrostatic latent image to (0000) corresponding to the n-th line, namely, first line of the original image represented by the first set of the dot data. Thus, the first dot data set designated by the address (0000) is retrieved for the second line of electrostatic latent image, too. Then, the control flow goes to step S85, and to step S86 to imagewise scan the drum 30 to form the second line of electrostatic latent image according to the first dot data set. Consequently, the second line of electrostatic latent image is completely the same as the first line of electrostatic latent image.

Similarly, the third and fourth lines of electrostatic latent image are formed according to the first dot data set, with the line number L set to "3" and "4".

When the line number L is incremented to "5" in step S81, an affirmative decision (YES) is obtained in step S82, and the control flow goes to step S83 in which the address A5 of the fifth line of electrostatic latent image is set to (00D8) corresponding to the (n+1)th line of the original image, namely, second line of the original image. Therefore, the second dot data set designated by the address (00D8) is retrieved, and the fifth line of electrostatic latent image is formed according to the second dot data set in step S86. For the reasons described above with respect to the second through fourth lines of electrostatic latent images, the sixth through eighth lines of electrostatic latent images are also formed according to the second dot data set designated by the address (00D8).

Figure 33:
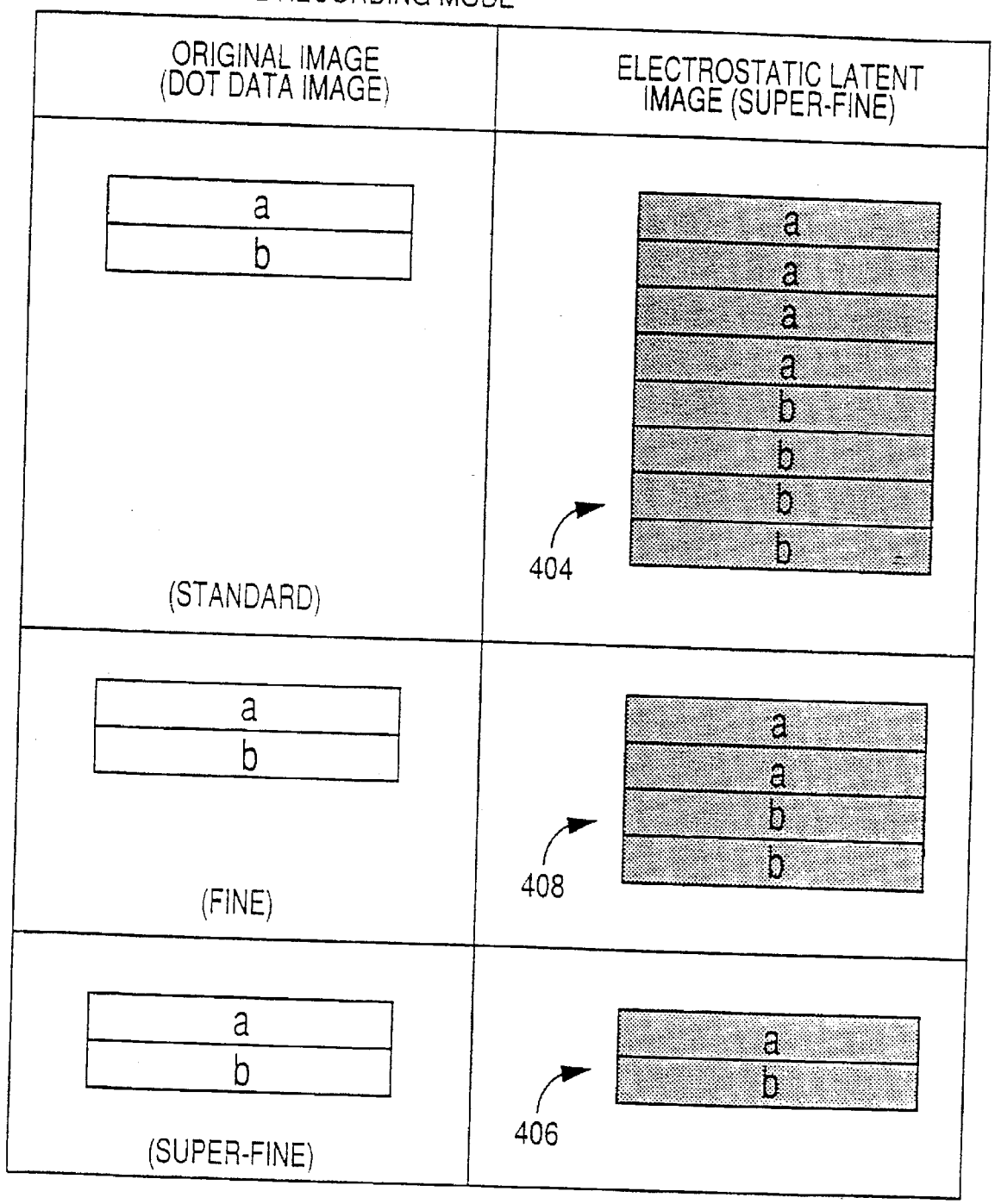
FIG. 33 is a view schematically indicating an image recorded on a recording medium in a non-toner-save recording mode of the facsimile system.

Thus, the first through eighth lines of electrostatic latent image are formed as indicated at 404 in FIG. 33, according to the first and second dot data sets. Each of the four latent image lines "a" of the latent image 404 is the same as the original image line "a" represented by the first dot data set, while each of the four latent image lines "b" of the latent image 404 is the same as the original image line "b" represented by the second dot data set.

The photosensitive drum 30 is rotated at a speed corresponding to the own image resolution, that is, SUPER-FINE resolution, as the electrostatic latent image is formed by the scanner unit 34.

While the electrostatic latent image 404 is formed where the control constant K is equal to "4", namely, where the own resolution is SUPER-FINE and the remote resolution is STANDARD, an electrostatic latent image 406 is formed where the control constant K is equal to "1", namely, where the own and remote resolutions are both SUPER-FINE, for example. An electrostatic latent image 408 is formed where the control constant K is equal to "2", namely, where the own resolution is SUPER-FINE while the remote resolution is FINE. Visible images to be formed on the paper sheet 18 correspond to the electrostatic latent images 404, 406, 408.

The dot data sets used to activate the scanner unit 34 in the NON-TONER-SAVE mode as described above are referred to as the original image data or "non-toner-save image data".

Where the TONER SAVE flag is set at "1", every M-th line of electrostatic latent image is formed as a blank line (consisting of 1728 white or non-imaged local spots). In other words, where the line number is equal to (M×m+p), the scanner unit 34 is not supplied with any dot data set, so that imagewise scanning is not effected for that line number (M×m+p), but the drum 30 is rotated by a predetermined incremental angle corresponding to one line. That is, no local spots in that line number (M×m+p) are irradiated by a scanning laser beam, as if all bits of the dot data set for that line number were "0".

In the present specific example, the constant M is equal to "2" and the value "p" is also equal to "2". Since the constant M is "2", one of two successive lines formed on the drum 30 is the blank line. Since the value "p" is "2", the first one of these two successive lines is the blank line.

When the line number L is "1", the dot data set designated by the address (0000) is retrieved in step S83, and the affirmative decision (YES) is obtained in step S85, since the TONER SAVE flag is set at "1". Consequently, step S88 is implemented to determine whether the line number L is equal to (Mm+2), namely, equal to "2" (2×0+2). As the line number L is currently "1", a negative decision (NO) is obtained in step S88, and the control flow goes to step S86 to activate the scanner unit 34 to form the first electrostatic latent image line according to the first dot data set.

When the line number L is incremented to "2", an affirmative decision (YES) is obtained in step S88, and the control flow goes to step S89 in which only the drum 30 is rotated by the incremental angle without activation of the scanner unit according to any dot data set. Thus, no imagewise scanning is effected for the second line (L=2) of the first two successive lines. A command to rotate the drum 30 by the predetermined incremental angle in step S89 without imagewise scanning is considered to be a non-imaging data set for making the second line blank. Step S89 is followed by step S90 to increment the integer "m" to "1".

When the line number L is "3" the negative decision (NO) is obtained in step S88, since the line number "3" is not equal to (2×1+2)=4. In this case, the scanner unit 34 is activated according to the first dot data set. When the line number L is "4", the affirmative decision (YES) is obtained in step S88, and the drum 30 is rotated without imagewise scanning by the scanner unit 34. Then, the integer "m" is incremented to "2" in step S90.

When the line number L is "5" the second dot data set designated by the address (00D8) is retrieved in S83 because the affirmative decision (YES) is obtained in step S82. Since the negative decision (NO) is obtained in step S88, step S86 is implemented to activate the scanner unit 34 to form the fifth line of electrostatic latent image according to the second dot data set. When the line number L is then incremented to "6", the affirmative decision (YES) is obtained in step S88, and the sixth line is made blank, with the drum 30 rotated without imagewise scanning according to the second dot data set.

With the routine repeatedly executed as described above, every second line (second, fourth, sixth, etc.) is made the blank line, since the control constant "M" is set at "2". These even-numbered lines may be considered as electrostatic latent image lines formed according to dot data sets whose bits are all "0".

As a result, a latent image is formed on the drum 30 as indicated at 410 in FIG. 34, according to the original image lines "a" and "b" represented by the first and second dot data sets. The latent image 410 is developed into the corresponding visible image on the paper sheet 18.

The data used to form the latent image 410 in the TONER-SAVE recording mode are referred to as "toner-save image data", which is different from the original image data.

In the case where the scanner unit 34 is operated in the TONER SAVE recording mode according to the toner-save image data, a suitable TONER SAVE marking 411 is provided at a right upper corner of the paper sheet 18, as indicated in FIG. 35. The marking 411 indicates that the visible image on the sheet 18 has been recorded in the TONER SAVE recording mode. This marking 411 is recorded according to the TONER SAVE MARKING DATA GENERATION routine stored in the program memory 390 of the ROM 334. It is also noted that when the TONER SAVE recording mode is established, the TONER SAVE light 302 is illuminated on the operator's control panel 14.

Although the recording on the paper sheet 18 according to the original image data received from the remote facsimile transmitter 325 has been described above, the selective use of the TONER-SAVE or NON-TONER-SAVE recording mode according to the present invention is also applicable to a copying operation on the present facsimile system, on the basis of an original image data which are obtained from the image reading device 66 and which are stored in the TRANSMISSION IMAGE DATA memory 364. Usually, the image data in the memory 364 are used as image data to be transmitted to the remote facsimile receiver 325. However, the image data in the memory 364 may be used to make a copy of the original read by the image reading device 66.

When the copying operation as indicated above is effected, the TONER SAVE flag is set or reset according to a suitable routine stored in the ROM 334, which does not use the IMPORTANT IMAGE DATA flags 1, 2 and 3 as used in the routine of FIGS. 23–25. That is, the TONER SAVE flag is set on the basis of the GRAY SCALE DATA flag, OPERATING CONDITION flag, etc.

In the copying operation, the OPERATING CONDITION flag is set and reset in the same manner as described above with respect to the facsimile reception recording on the basis of the image data received from the remote facsimile transmitter 325. Although the GRAY SCALE DATA flag is set and reset by the routine of FIG. 26 in the case of the facsimile reception recording, this flag used in the copying operation is set and reset, depending upon whether a GRAY SCALE mode has been established by manipulation of the RESOLUTION key 320 and other switches on the operator's control panel 14. The GRAY SCALE DATA flag is set when the GRAY SCALE mode has been established, and is reset when the GRAY SCALE mode has not bee established.

In the copying operation, the resolution set by the user is substituted for the remote resolution (image resolution of the remote facsimile system 325).

It will be understood from the foregoing description of the present facsimile system that selected entire lines of the dot matrix image are made blank to save the consumption of the toner 50 in the TONER-SAVE recording mode. This arrangement permits easier data processing than in the case where the toner save recording is effected by providing blank local spots at the selected picture element positions along each line of the dot matrix. Further, the toner-save image data are generated based on the decoded image data in the form of the dot data representative of the original image, so that the toner-save image data represent a toner-save image which is recognizable as an image similar to the original image.

Since the control constants K and M are determined depending upon the own resolution (resolution of the present facsimile system) and the remote resolution (resolution of the remote facsimile system 325, the toner-save visible image has a suitable density and can be recognized as an image similar to the original image.

The TONER SAVE light 302 informs the user of the present facsimile system as to whether that the system is placed in the TONER-SAVE recording mode. This arrangement permits the user to know whether the reduced density of the visible image recorded on the paper sheet 18 is due to the recording in the TONER-SAVE recording mode, or due to insufficient amount of the toner 50 in the toner cartridge 120.

The TONER SAVE marking 411 recording on the paper sheet 18 permits the reader of the paper sheet 18 to know whether the recording on the sheet 18 has been conducted in the TONER-SAVE or NON-TOE-SAVE recording mode, even after a long time has passed after the recording.

It is important to note that the TONER SAVE flag is automatically set or reset on the basis of the degree of importance or type (gray scale data or not) of the image data to be reproduced, and the operating condition and environment of the facsimile system. That is, the user does not have to manipulates a mode selector switch to select the TONER-SAVE or NON-TONER-SAVE recording mode. The automatic setting of the TONER SAVE flag assures selection of the TONER-SAVE recording mode as needed.

The user of the facsimile system does not have to know the importance, nature or type of the image data received, and does not have to check the operating condition or environment of the system, since the TONER SAVE flag is automatically controlled as described above.

Nevertheless, the user is provided with means for for manually selecting the TONER-SAVE or NON-TONER-SAVE recording mode, namely, changing the mode from the TONER-SAVE mode to the NON-TONER-SAVE mode or vice versa, depending upon the density of the actually formed image on the paper sheet 18 and the TONER SAVE marking 411 on the sheet 18.

In the present embodiment, the developing device 48 including the scanner unit 34 constitutes a recording portion for recording an image on the basis of original image data. The decoded image data in the form of dot data obtained from the encoded image data received from the remote facsimile system 325 serve as the original image data which are stored in original image data memory means in the form of the DECODED RECEPTION IMAGE DATA memory 362. However, the encoded image data or dot data may be considered to be the original image data. The encoded image data or decoded image data (dot data) are considered to be the primary data of the facsimile data received from the remote facsimile transmitter 325.

The toner-save image data used in the TONER-SAVE recording mode (with the affirmative decision obtained in step S85) consist of the original dot data sets (step S86), and the command (step S89) to rotate the drum 30 by the predetermined incremental angle corresponding to one line, without imagewise scanning of the drum 30. Thus, a portion of the control device 40 assigned to implement steps S85–S89 is considered as means for generating the toner-save image data, and as a toner-save control portion for controlling the recording portion (developing device 48) in the TONER-SAVE recording mode. The RELATION TABLE 389 and a portion of the control device 40 assigned to determine the control constants K and M on the basis of the own and remote resolutions cooperate to constitute means for determining the control constants.

A portion of the control device 40 assigned to implement steps S81–S85 and S87 constitutes a non-toner-save control portion for controlling the recording portion (developing device 48) in the NON-TONER-SAVE recording mode. The program memory 385 storing the TONER SAVE FLAG SETTING routine and a portion of the control device 40 assigned to execute this routine cooperate to constitute mode selecting means for selecting one of the TONER-SAVE recording mode and the NON-TONER-SAVE recording mode, or means for activating one of the non-toner-save control portion and the toner-save control portion to control the recording portion (developing device 48) in the corresponding NON-TONER-SAVE or TONER-SAVE recording mode.

It is also noted that the program memory 390 storing the TONER SAVE MARKING DATA GENERATION routine and a portion of the control device 40 assigned to execute this routine cooperate to constitute a marking device for recording a marking on the sheet 18, which indicates the recording in the TONER-SAVE mode. The TONER SAVE light 302 and a portion of the control device assigned to control the light 302 depending upon the TONER SAVE flag cooperate to constitute a display device for indicating the selection of the TONER-SAVE recording mode. The marking device and the display device constitute an indicator device for indicating the recording in the TONER-SAVE recording mode.

The residual toner amount sensor 142, humidity sensor 64 and paper sheet sensor 25 cooperate with the control device 40 to constitute respective devices for detecting the amount of the toner 50 remaining in the toner cartridge 120, detecting the operating environment of the facsimile system, and detecting a special paper sheet 18 (sheet 18 placed on the manual sheet insertion table 24). Further, the program memory 386 storing the OPERATING CONDITION FLAG SETTING routine cooperates with a portion of the control device to execute this routine to constitute mode selector means for selecting the TONER-SAVE or NON-TONER-SAVE recording mode depending upon the operating condition or environment of the facsimile system.

It is further noted that step S32 of the GRAY SCALE FLAG SETTING routine stored in the program memory 388 and a portion of the control device 40 assigned to implement this step S32 cooperate to constitute means for detecting gray scale image data, and that steps S38–S40 of the GRAY SCALE FLAG SETTING routine and a portion of the control device 40 to implement these steps S38–S40 cooperate to constitute mode selector means for selecting the TONER-SAVE or NON-TONER-SAVE recording mode, which mode selector means includes image data type determining means for determining the type of the image data, so that the recording mode is selected depending upon the determined type of the image data. Namely, the gray scale data representative of an image in a dither matrix are one type of the image data.

As indicated above, the facsimile data consist of image data as the primary data, and the ancillary data which include: data indicative of the image resolution; data (stored in the memory 368) indicative of the facsimile number of the remote facsimile transmitter 325 from which image data have been received; and data (stored in the memory 366) indicative of the facsimile number of the present facsimile system which is designated by the call signal received from the remote facsimile transmitter 325. The primary data include the encoded image data and decoded image data (dot data). The memories 366 and 368 function as ancillary data memory means for storing the ancillary data. This ancillary data memory means comprises remote party information memory means for storing (a) number-related data indicative of the distinctive ringing facsimile number of the present facsimile system which has been called by the remote facsimile system and (b) number-related data indicative of the facsimile number of the remote facsimile system from which the facsimile data have been received by the present facsimile system. The memory 370 serves as remote facsimile receiver number-related memory means for storing the facsimile numbers of the remote facsimile receivers 325 to which the facsimile data are highly expected to the transmitted. The CALL SIGNAL PATTERN memory 392 serves as reception facsimile number-related memory means for storing number-related data indicative of selected ones of the facsimile numbers of the present facsimile system available for reception of facsimile data from the remote facsimile transmitters 325, which are highly expected to transmit important original image data.

The program memory 391 storing the COMMUNICATION RECORD OUTPUT routine and a portion of the control device 40 assigned to execute this routine cooperate to constitute record data generating means for generating communication record data for producing a record of the facsimile communications between the present and remote facsimile systems.

The program memory 381 storing the IMPORTANT IMAGE DATA FLAG 1 SETTING routine and a portion of the control device 40 assigned to execute this routine cooperate to constitute importance determining means for determining the degree of importance of the received image data depending upon the facsimile number of the present facsimile system which is designated by the distinctive ringing call signal received from the remote facsimile transmitter 325. The program memory 382 storing the IMPORTANT IMAGE DATA FLAG 2 SETTING routine and a portion of the control device 40 assigned to execute this routine cooperate to constitute importance determining means for determining the degree of importance of the received image data depending upon the facsimile number of the remote facsimile transmitter 325. These importance determining means function as means for determining the importance of the received image data, on the basis of the data received from the remote facsimile system 325.

It is also noted that the program memory 3S4 storing the COMMUNICATION RECORD IMPORTANCE SETTING routine and a portion of the control device 40 assigned to execute this routine cooperate to constitute means for determining that the communication record as the original image data has a relatively low degree of importance. This means function as means for determining the degree of importance of the recording data on the basis of the nature or type of the recording data. A portion of the control device 40 assigned to set the TONER SAVE flag to "1" upon manipulation of the operator's control panel 14 to produce a communication record constitutes means for selecting the TONER-SAVE recording mode for producing the communication record. This means may be considered to constitute the mode selector means for selecting the TONER-SAVE or NON-TONER-SAVE recording mode depending upon the degree of importance of the subject matter of the image data or recording data.

In the illustrated embodiment described above, the CONDITION flag 1 is set to "1" to set the TONER SAVE flag to "1" for selecting the TONER-SAVE recording mode, when the amount of the toner 50 remaining in the toner cartridge 120 is smaller than the predetermined threshold. However, the CONDITION flag 1 is reset to "0" to select the NON-TONER-SAVE recording mode when the residual toner amount is smaller than the threshold. This arrangement prevents excessively low density of the recorded image which would occur due to the recording in the TONER-SAVE mode with a considerably small amount of the toner, and assures sufficiently clear recording of the image for a prolonged period time. In some situations, the quality of the recorded image is more important than the prolongation of the life of the toner cartridge 120 by reduction of the toner consumption.

While the IMPORTANT IMAGE DATA flags 1 and 2 are set to "1" to select the NON-TONER-SAVE recording mode where the remote facsimile system 325 from which image data have been received is one of the predetermined remote facsimile systems, these flags 1 and 2 may be reset to "0" to select the TONER-SAVE recording mode in the above case, if the predetermined remote facsimile systems are those remote parties who tend to transmit facsimile data whose subject matters can be relatively easily understood or recognized by the user of the present facsimile system, or those remote parties whom the user may easily contact to clarify the subject matter or content of the received facsimile data.

It is possible to inhibit the recording in the TONER-SAVE mode for a desired portion of a page of image, for example, an upper part of the first page of the received original image data, which generally contains information that identifies the remote facsimile system 325. For instance, the upper part of the first page for which the recording in the TONER-SAVE mode is inhibited may be between the upper edge of the page and a line about 100 mm below the upper edge. In this case, the recording in that upper part is effected in the NON-TONER-SAVE mode even if the remote facsimile system 325 from which the facsimile data have been received is one of the predetermined remote parties.

The TONER SAVE flag may be set or reset to select the TONER-SAVE or NON-TONER-SAVE mode, according to different rules for different parts of the same page of image, for example, according to different rules relating to the GRAY SCALE DATA flag.

In the illustrated embodiment of FIG. 23, the TONER SAVE flag is set to "1" only where the IMPORTANT IMAGE DATA flag 3, GRAY SCALE DATA flag, OPERATING CONDITION flag and the other flags are all set at "0". However, the TONER SAVE flag may be set to "1" when the negative decision (NO) is obtained in at least one of steps S1–S3 or when the number of the flags for which the negative decision is obtained in steps S1–S3 is larger than a predetermined value.

The TONER SAVE flag may be set and reset depending upon only the IMPORTANT IMAGE DATA flags 1 and 2.

The routines of FIGS. 23–28 for the TONER SAVE flag may be modified as needed.

In the embodiment of FIG. 26, the GRAY SCALE DATA flag is set on the basis of the dot data bits. However, the encoded image data as received from the remote facsimile transmitter 325 may be used in the routine of FIG. 26, in place of the binary dot data. For instance, the GRAY SCALE DATA flag may be set on the basis of the number of the run-length codes in the compressed coded image data.

While the predetermined number "s" used in the routine of FIG. 26 is equal to "3" to check the first three dot data sets, the number "s" may be "4" or more. Although the number Ns is compared with the predetermined threshold in step S33 for each of the dot data sets, the total number Ns of all the dot data sets in question may be compared with a predetermined threshold in setting or resetting the GRAY SCALE DATA flag.

The routine of FIG. 26 is based on the fact that gray scale data of dither matrix generally have a relatively large number of changes of adjacent data bits. In this connection, it is noted that image data representing a minute image (e.g., an image consisting of relatively small characters) also have a relatively large number of changes of adjacent data bits. Therefore, the routine of FIG. 26 may be used to determine or detect the minuteness of the image.

Figure 41:
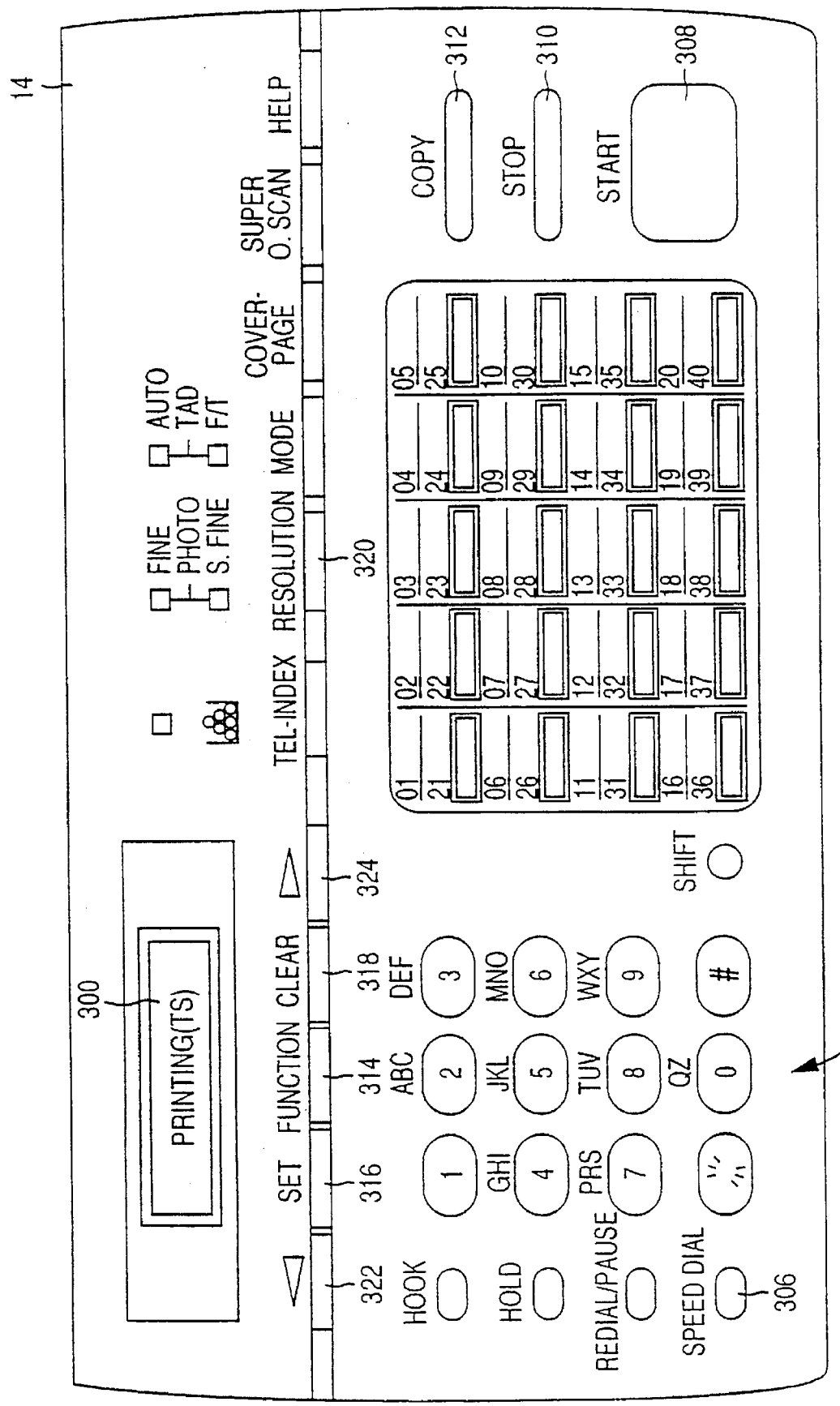
FIG. 41 is a plan view of the operator's control panel provided in a facsimile system according to a yet further embodiment of this invention.

While the TONER SAVE light 302 as indicated in FIG. 19 is turned on to indicate the selection of the TONER-SAVE recording mode, the display 300 may be adapted to provide an indication of the selection of the TONER-SAVE recording mode, as indicated in FIG. 41. The indication may be provided as long as the TONER-SAVE recording mode is established, or only during an image recording operation in the TONER-SAVE mode.

The TONER SAVE light 302 or the indication of the TONER-SAVE recording mode on the display 300 is not essential, particularly where the TONER SAVE marking 411 is recorded on the paper sheet 18 or the recording in the TONER SAVE mode can be recognized from the image recorded on the paper sheet 18.

In the illustrated embodiment, the control constant M determining the ratio of saving of the toner in the TONER-SAVE recording mode is determined on the basis of the resolutions of the present and remote facsimile systems. However, the control constant M may be determined on the basis of the operating conditions (e.g., detected residual toner amount) of the present facsimile system.

For example, the constant M is automatically selected according to a predetermined relationship between the detected residual amount of the toner 50 and the constant M. The relationship may be formulated such that the constant M is changed continuously with the detected residual toner amount, or in steps corresponding to predetermined two ore more ranges of the residual toner amount.

If the constant M is reduced as the residual toner amount is reduced, the toner saving ratio is increased as the residual toner amount is reduced. This arrangement prevents an unexpected sudden change from the NON-TONER-SAVE mode to the TONER-SAVE mode when the residual toner amount becomes smaller than a predetermined threshold, but permits a continuous or stepped increase of the toner saving ratio.

The constant M may be increased as the residual toner amount is reduced. The residual toner amount sensor 142 may be modified as needed. For example, the agitating arm 204 and wiper 206 may be disposed so as to extend toward the agitating portion 202 of the third agitating member 122.

The control constants K and M may be determined on the basis of both of the own and remote resolutions and the detected residual toner amount, or independently of the resolutions and/or residual toner amount in the embodiment of FIG. 32, step S88 is adapted to determine whether the line number L is equal to (Mm+2). However, the variable (Mm+2) may be replaced by (Mm+1) or (Mm+3), so that the first line of two successive lines or the third lines of three successive lines is made blank in the TONER-SAVE recording mode, for example.

Figure 36:
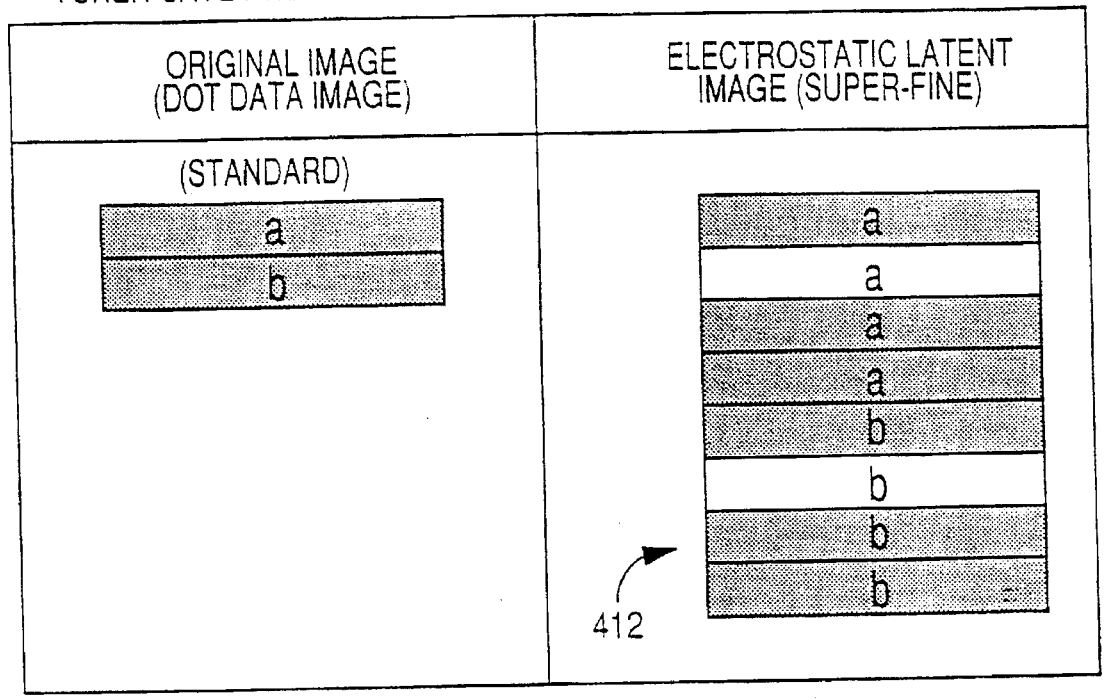
FIG. 36 is a view schematically indicating an image recorded on the medium in the toner-save recording mode by a facsimile system constructed according to another embodiment of the invention.

In the present embodiment wherein the constant M is set at "2" where the own resolution is SUPER-FINE while the remote resolution is STANDARD, as indicated in the table of FIG. 31, the constant may be set at "4" in this case, so that two or three lines of four successive lines may be made blank. For instance, the second and third lines, or the second and fourth lines may be made blank, or alternatively, the second through fourth lines may be made blank.

Where the constant M is "4" while the second line of the four successive lines is made blank, the affirmative decision (YES is obtained in step S88 in the routine of FIG. 32 when the line number L is "2", "6" and "10", so that these lines are made blank, as indicated in FIG. 36 in which an electrostatic latent image (or visible image) formed is indicated at 412.

Figure 37:
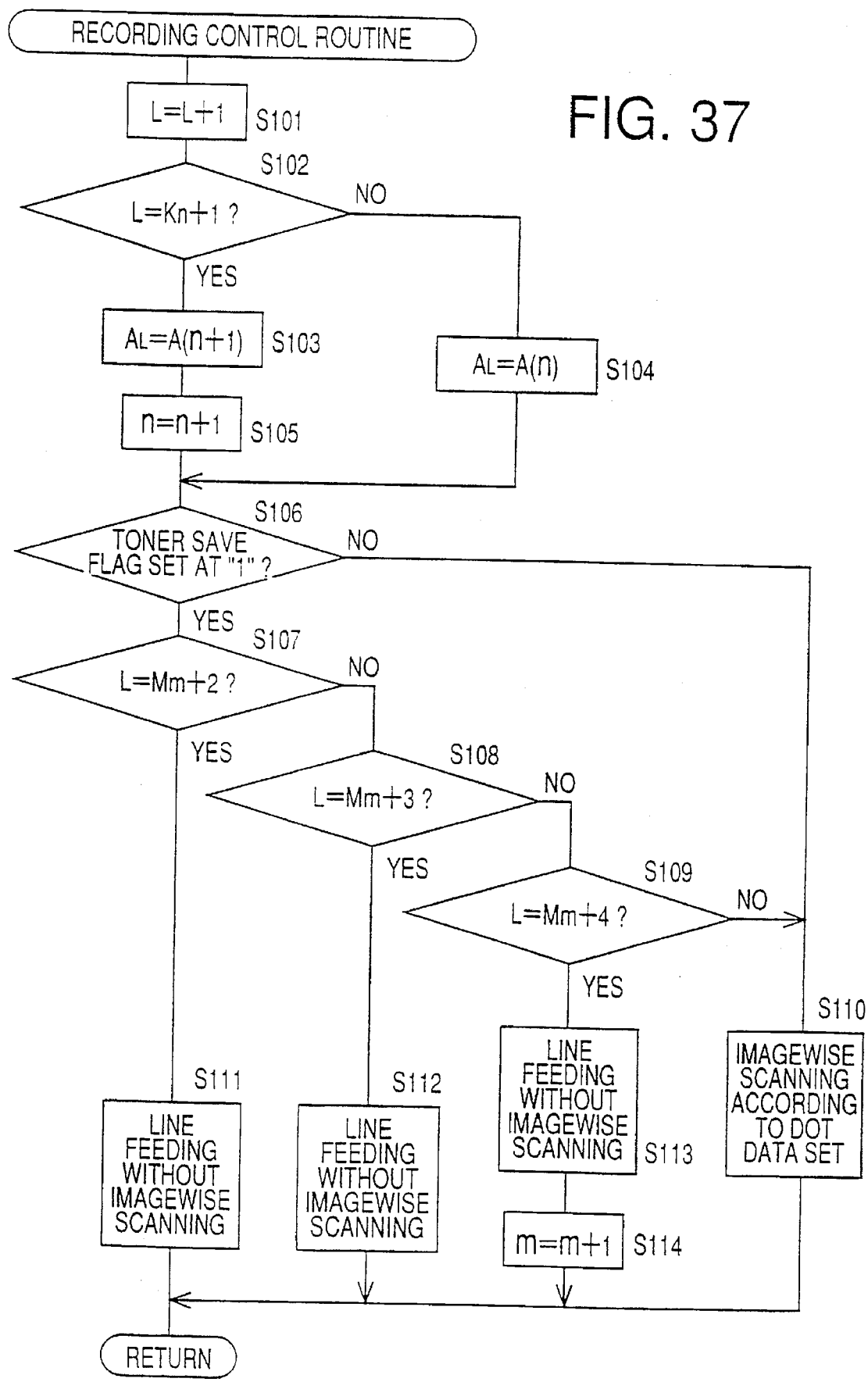
FIG. 37 is a flow chart illustrating a recording control routine stored in the ROM of a facsimile system according to a further embodiment of the invention.

In the case where the second, third and fourth lines of four successive lines are made blank, the RECORDING CONTROL routine of FIG. 32 is modified as illustrated in the flow chart of FIG. 37.

Steps S101 through S106 of the routine of FIG. 37 are identical with steps S81–S85 and S87 of the routine of FIG. 32. Where the line number L is "1", the negative decision (NO) is obtained in step S107, since the line number L is not equal to (4×0+2)=2. Therefore, the control flow goes to steps S108 and S109 to determine whether the line number L is equal to "3" or "4". The negative decision (NO) is obtained in these steps S108, S109, whereby the dot data set designated by the address (0000) is supplied to the scanner unit 34 to image wise scan the photosensitive drum 30.

Where the line number L is incremented to "2", the affirmative decision (YES is obtained in step S107, and the control flow goes to step S111 in which the drum 30 is rotted by the incremental angle without imagewise scanning.

Where the line number L is "3", the affirmative decision (YES) is obtained in step S108, and the control flow goes to step S112 to rotate the drum 30 by the incremental angle without imagewise scanning. Where the line number L is "4", the affirmative decision (YES) is obtained in step S109, and step S113 is implemented to rotate the drum 30 without imagewise scanning. Step S113 is followed by step S114 to increment the integer "m". Thus, the routine of FIG. 37 is adapted such that the second, third and fourth lines of the four successive lines are made blank without imagewise scanning of the drum 30.

Where the line number L is incremented to "5", the affirmative decision (YES) is obtained in step S102, and the second dot data set designated by the address (00D8) corresponding to the second line of the dot data is retrieved in step S103. Since the negative decision (NO) is obtained in steps S107–S109, the control flow goes to step S110 to activate the scanner unit 34 according to the second dot data set.

Where the line number L is "6", "7" or "8", the scanner unit 34 is not activated according to the second dot data set (steps S111–S113), and the sixth through eighth lines are made blank.

Figure 38:
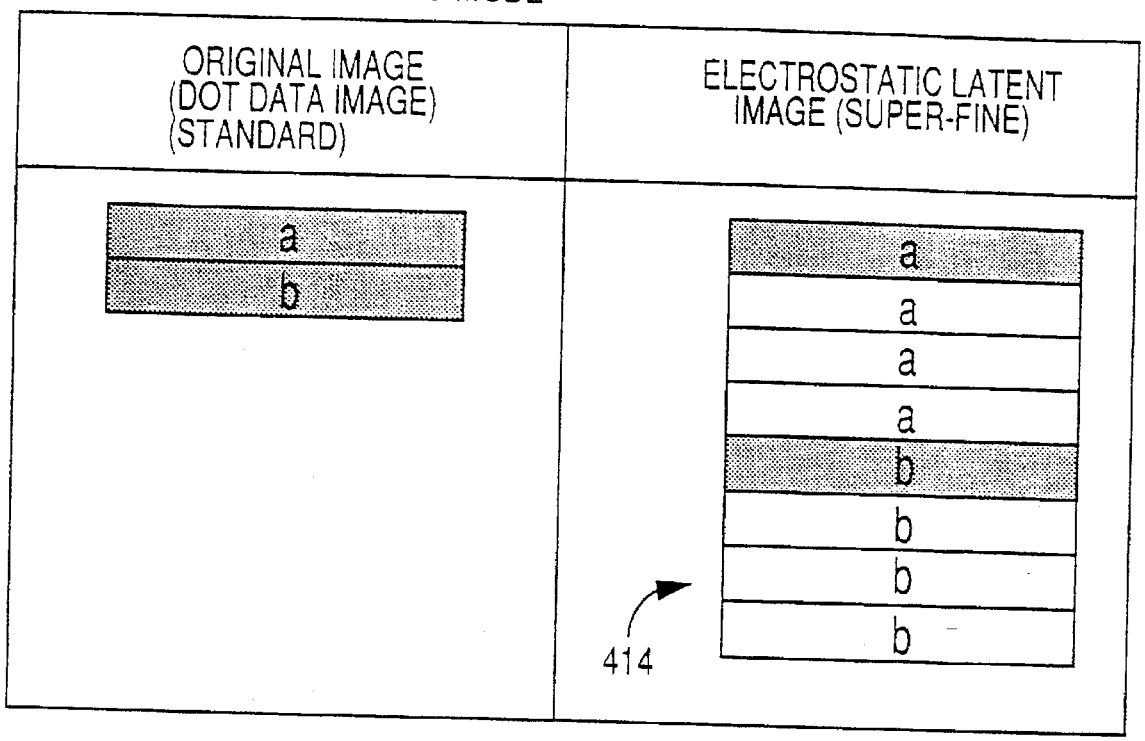
FIG. 38 is a view schematically indicating an image recorded on the medium in the toner-save recording mode in the embodiment of FIG. 37.

Thus, the line numbers "1", "5", "9", . . . are formed according to the respective dot data sets, while the line numbers "2" through "4" and "6" through "8", . . . are made blank, whereby an electrostatic latent image or visible image 414 as indicated in FIG. 38 is formed on the drum 30 or paper sheet 18. In the present embodiment of FIGS. 37 and 38, the toner saving ratio is higher than in the embodiment of FIGS. 32, 34 and 36 in which only one of successive lines is made blank.

Although the embodiment of FIGS. 37–38 to inhibit imagewise scanning of the drum 30 for the three lines of the four successive lines, it is possible to designate one of the four successive lines for which the drum 30 is imagewise scanned. The function achieved by the routine of FIG. 37 can be achieved by modifying the routine of FIG. 32 such that the variable (Mm+2) used in step S88 is changed to (Mm+1) and steps S86 and S89 are switched so that step S86 follows step S88 if the affirmative decision is obtained in step S88 while step S89 follows step S88 when the negative decision is obtained in step S88. In this modified routine, the first line of the four successive lines is formed by imagewise scanning of the drum 30.

Thus, where "P" represents the number of successive lines corresponding to each original dot data set while "p" (p<P) represents the number of the blank line or lines formed without imagewise scanning of the drum 30, the designation of the number p is practically the same as the designation of the number (P-p) of the lines formed by imagewise scanning of the drum 30 according to the respective dot data sets.

In step S89 of FIG. 32 and steps S111–S113 of FIG. 37, the drum 30 is merely rotated by the incremental angle corresponding to one line, without imagewise scanning by the scanner unit according to the appropriate dot data set so that the line in question is made blank in the TONER-SAVE recording mode. However, steps S89 and S111–S113 may be modified so that the drum 30 is scanned by the scanner unit 34 according to a dummy dot data set whose bits are all "0". The dummy dot data set is considered to be the non-imaging data set for forming a blank line.

Figure 40:
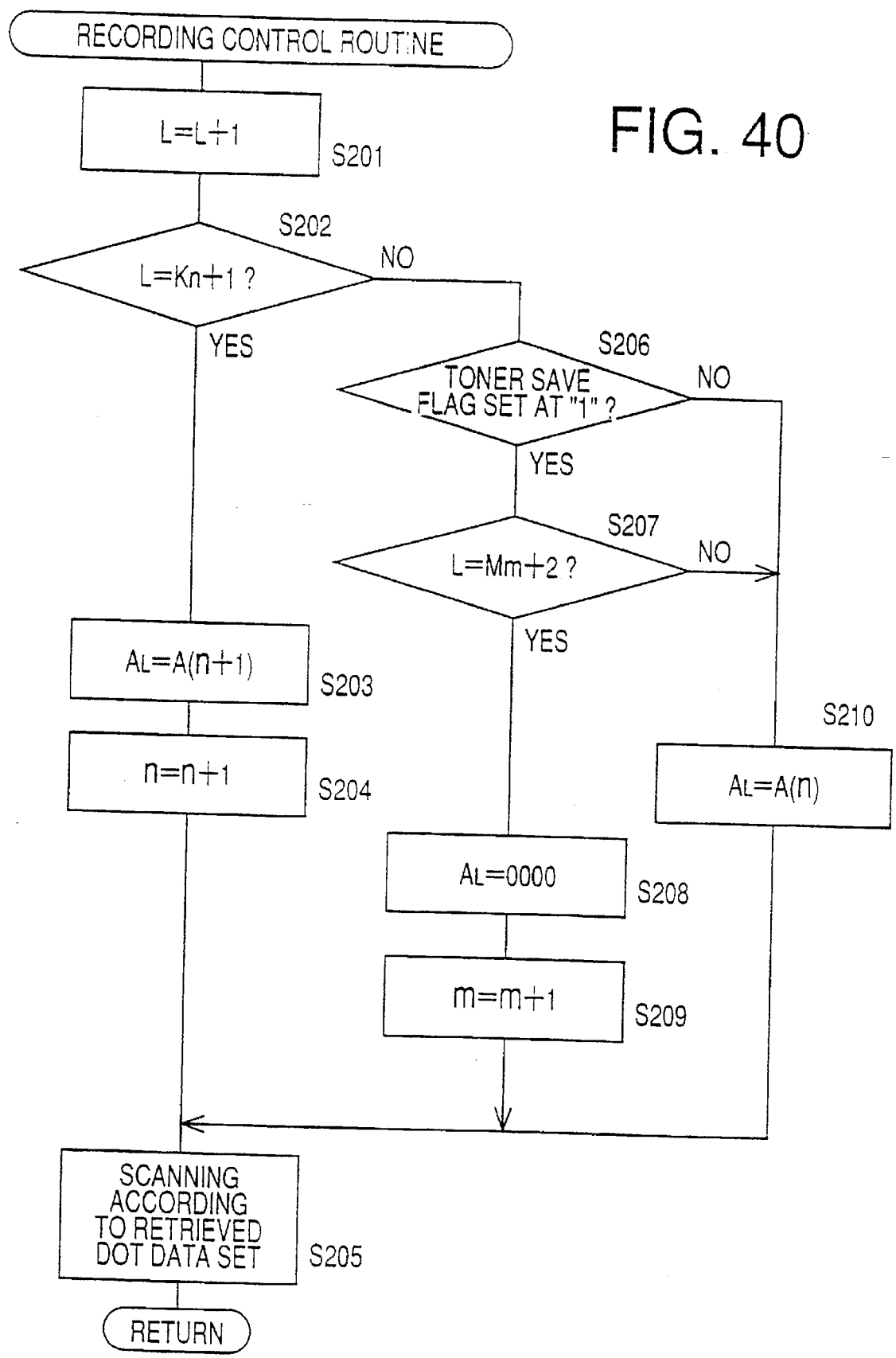
FIG. 40 is a flow chart illustrating a recording control routine stored in the ROM of the control device used in the embodiment of FIG. 39.

In the above modification, a batch of dot data as indicated in FIG. 30 generated by the encoder/decoder circuit 344 on the basis of the received batch of encoded image data is modified as indicated in FIG. 39. Namely, a dummy dot data set designated by an address (0000) is added as the zeroth dot data set. The dummy dot data set consists of 1728 bits which are all "0".

Where the dummy dot data set is used, the recording operation is controlled in a routine as illustrated in the flow chart of FIG. 40, wherein the control constants K and M are set at "4" and "2", respectively, and the integers "L", "m", "n" are initially set at "0", as in the routine of FIG. 32

Since the recording in the NON-TONER-SAVE mode in the routine of FIG. 40 is the same as that in the routine of FIG. 32, only the recording in the TONER-SAVE mode in the routine of FIG. 40 will be described.

Where the line number L is "1", the affirmative decision (YES) is obtained in step S202, and the control flow Goes to step S203 in Which the first dot data set designated by the address (00D8) corresponding to the first line (A1) is retrieved. Step S203 is followed by step S204 to increment the integer "n", and step S205 in which the drum 30 is imagewise scanned according to the first dot data set.

When the line number L is incremented to "2", the negative decision (NO) is obtained in step S202 while the affirmative decision (YES) is obtained in step S206, whereby step S207 is implemented to determine whether the line number L is equal to (Mm+2), namely, (2×0+2)=2. Since the affirmative decision (YES) is obtained in step S207, the control flow goes to step S208 in which the zeroth dot data set, that is, the dummy dot data set designated by the address (0000) is retrieved for the second line. Step S208 is followed by step S209 to increment the integer "m", and step S205 in which the drum 30 is not only rotated by the incremental angle, but also scanned by the scanner unit 34 according to the retrieved zeroth or dummy dot data set whose bits are "0". Accordingly, no local spots are irradiated by the laser beam along the second line, and the second line is made blank.

When the line number L is "3", the negative decision (NO) is obtained in step S202 and the affirmative decision (YES) is obtained in step S206, and the negative decision (NO) is obtained in step S207, whereby the first dot data set designated by the address (00D8) is retrieved in step S210, and the drum 30 is imagewise scanned along the third line according to the retrieved first dot data set.

When the line number L is "4", the affirmative decision (YES) is obtained in step S207, and the zeroth or dummy dot data set is retrieved in step S208, whereby the fourth line is made blank. With the routine of FIG. 40 repeatedly executed, the image 410 as indicated in FIG. 34 is formed in the TONER-SAVE recording mode.

The embodiment of FIGS. 39–40 also permits easy data processing due to the scanning according to the dummy dot data set for each blank line.

While the recording operation according to a batch of image data received from the remote facsimile transmitter 325 has been described with respect to the various embodiments, the present facsimile system may be operated to process binary image data obtained from the line image sensor 84 of the image reading device 66, by a routine similar to that of FIG. 40, to thereby obtain dot data for toner-save recording, which dot data are encoded into coded image data to be transmitted to the remote facsimile receiver 325.

Image data (dot data) for toner-saving may be obtained by controlling the image reading device 66 such that the image reading by the line image sensor 84 is not effected for the lines to be recorded in blank.

The toner-saving image data generated by the image reading device 66 are effective particularly where the present facsimile system is used as a copying machine to copy an original image read by the device 66, or where the device 66 is used in an exclusive copying machine. However, the toner-saving image data generated by the device 66 may be advantageously used for toner saving recording in the remote facsimile receiver 325 when the remote facsimile receiver 325 is found to be placed in the TONER-SAVE recording mode. On the basis of information stored in the present facsimile system, or information received from the remote facsimile system 325, the present facsimile system may determine that the remote facsimile receiver 325 is placed in the TONER-SAVE recording mode. Alternatively, the user of the present facsimile system may determine that the remote facsimile receiver 325 is in the TONER-SAVE recording mode.

In the above case, the toner-saving image data are converted into coded image data to be sent to the remote facsimile receiver 325, which converts the coded image data into the toner-saving image data in the form of dot data, so that the recording is effected in the TONER-SAVE mode in the remote facsimile receiver 325.

The present facsimile system may deal with coded image data which are generated by MH or MR method by the remote facsimile system 325.

Although the embodiments illustrated above are all adapted to insert blank lines parallel to the scanning direction of the scanner unit 34 in the TONER-SAVE recording mode, it is possible to insert blank columns parallel to the rotating direction of the drum 30 in the TONER-SAVE recording mode. This arrangement also assures easier data processing than in the conventional arrangement which requires a determination as to whether an image dot is formed at each local spot in a line or column of the dot matrix.

In the case of insertion of the blank columns, decoded image data or dot data corresponding to one page of image are first generated from the corresponding coded image data received from the remote facsimile transmitter, and are then processed so that the all dot data bits corresponding to the picture elements in each of the selected blank columns are "0". However, the dot data bits corresponding to the picture elements in all the selected blank columns are zeroed each time the dot data set for each line is supplied to the scanner unit 34.

Further, both blank lines and blank columns may be provided in the TONER-SAVE recording mode. In this case, the processing of the dot data for the blank lines and the processing for the blank columns may be effected simultaneously or at different times. For instance, the processing for the blank columns is effected for dot data corresponding to one page of image, while the processing for the blank lines is effected when the dot data sets are supplied to the scanner unit 34.

It is to be understood that the present invention may be embodied with various other changes, modifications and improvements, which may occur to those skilled in the art, without departing from the spirit and scope of the invention defined in the following claims.

What is claimed is:

1. A facsimile system comprising:

facsimile data memory means for storing facsimile data;

image data generating means for generating original image data on the basis of said facsimile data, said original image data representing an original image;

a recording portion for effecting a recording operation on a recording medium in a matrix of dots by selective application of a toner to local spots on said medium, said local spots corresponding to picture elements of said dot matrix;

a non-toner-save control portion for controlling said recording portion according to said original image data to form said original image in a non-toner-save recording mode;

a toner-save control portion for controlling said recording portion according to a toner-save image data to form a toner-save image in a toner-save recording mode, said toner-save image having a lower density of image dots than said original image and being recognizable as an image similar to the original image, said toner-save control portion generating said toner-save image data on the basis of said original image data; and mode selector means for activating one of said non-toner-save control portion and said toner-save control portion to select a corresponding one of said non-toner-save and toner-save recording modes, on the basis of a degree of importance of a subject matter of said original image data.

2. A facsimile system according to claim 1, wherein said facsimile data comprise primary data, and ancillary data associated with facsimile communication between the claimed present facsimile system and a remote facsimile system from which said present facsimile system receives said facsimile data, said facsimile data memory means comprising ancillary data memory means for storing said ancillary data of said facsimile data, and primary data memory means for storing said primary data, said image data generating means comprising means for generating said original image data on the basis of said primary data, and wherein said ancillary data memory means comprises remote party information memory means for storing remote party information indicative of said remote facsimile system, said mode selector means comprising importance determining means for determining said degree of importance of the subject matter of said original image data, on the basis of said remote party information.

3. A facsimile system according to claim 2, wherein said mode selector means further comprises remote facsimile receiver number-related memory means for storing number-related data related to a facsimile number of each of at least one remote facsimile receiver to which facsimile data are expected to be transmitted from the present facsimile system, said remote party information comprises number-related data related to a facsimile number of said remote facsimile system from which said facsimile data have been received by the present facsimile system, said importance determining means determining said degree of importance of the subject matter of said original image data, by comparing said number-related data stored in said remote party information memory means with said number-related data stored in said remote facsimile receiver number-related memory means.

4. A facsimile system according to claim 2, wherein said mode selector means further comprises reception facsimile number-related memory means for storing number-related data related to at least one of a plurality of reception facsimile numbers of the present facsimile system which are available for reception of facsimile data from remote facsimile transmitters, and said remote party information stored in said remote party information memory means comprises number-related data related to one of said reception facsimile numbers which has been called by said remote facsimile system from which said facsimile data have been received by the present facsimile system, said importance determining means determining said degree of importance of the subject matter of said original image data, by comparing said number-related data stored in said remote party information memory means, with said number-related data stored in said reception facsimile number-related memory means.

5. A facsimile system according to claim 1, wherein said matrix of dots is defined by a plurality of parallel lines extending in a first direction, and a plurality of parallel columns extending in a second direction perpendicular to said first direction, said toner-save control portion generating said toner-save image data which include non-imaging data sets for inhibiting the application of said toner to all of said local spots which are arranged along selected ones of said parallel lines and/or said parallel columns of said matrix of dots, so that said toner-save image is partially defined by blank lines and/or blank columns of local spots which correspond to said non-imaging data sets, respectively, said toner-save control portion controlling said recording portion in the toner-save recording mode, according to the toner-save image data including the non-imaging data sets, said blank lines and said blank columns appearing in said toner-save image as respective lines and columns represented by at least one equation L=M×m+p, where "L" represents said blank lines and blank columns, "M" is an integer not smaller than "2", "m" is an integer which increases from "0" in increment of "1", and "p" is an integer between "1" (inclusive) and "M" (inclusive).

6. A facsimile system according to claim 1, wherein said mode selector means comprises importance determining means for determining the degree of importance of the subject matter of said original image data, on the basis of said original image data.

7. A facsimile system according to claim 6, wherein said facsimile data comprise primary data, and ancillary data associated with facsimile communication between the claimed present facsimile system and a remote facsimile system from which said present facsimile system receives said facsimile data, said facsimile data memory comprising ancillary data memory means for storing said ancillary data of said facsimile data, and primary data memory means for storing said primary data, said image data generating means comprising means for generating said original image data on the basis of said primary data, and means for generating communication record data on the basis of said ancillary data stored in said ancillary data memory means, said communication record data being representative of a communication record as said original image indicative of facsimile communications between the present facsimile system and a remote facsimile system from which said facsimile data have been received, said importance determining means of said mode selector means determining that said communication record has a relatively low degree of importance, and activates said toner-save control portion to control said recording portion for recording said communication record in said toner-save recording mode.

8. A facsimile system according to claim 1, wherein said mode selector means comprises local importance determining means for determining that a predetermined portion of said original image data is important, and activates said non-toner-save control portion to control said recording portion according to said predetermined portion of said original image data in said non-toner-save recording mode, even if said toner-save control portion is activated to select said toner-save recording mode for the other portion of said original image data.

9. A facsimile system according to claim 1, wherein said mode selector means comprises importance determining means for determining said degree of importance of the subject matter of said original image data, and image data type determining means for determining a type of said original image data, said mode selector means activating one of said non-toner-save control portion and said toner-save control portion, on the basis of the type of said original image data determined by said image data type determining means, as well as on the basis of said degree of importance.

10. A facsimile system according to claim 9, wherein said image data type determining means includes means for recognizing said original image data as gray scale image data which represent said original image data in a dither matrix, said mode selector means activating said non-toner-scale control portion if said original image data are recognized as the gray scale image data.

11. A facsimile system according to claim 10, wherein said image data generating means generates dot data as said original image data, said dot data comprising data bits representative of presence or absence of image dots at said local spots corresponding to said picture elements of said dot matrix, and wherein said means for recognizing said original image data as gray scale image data recognizes said original image data as said gray scale image data if the number of changes of adjacent ones of said data bits of said dot data per unit volume of said dot data is larger than a predetermined threshold.

12. A facsimile system according to claim 1, wherein said mode selector means comprises importance determining means for determining said degree of importance of the subject matter of said original image data, and operating condition detecting means for detecting at least one operating condition of the present facsimile system, said mode selector means activating one of said non-toner-save control portion and said toner-save control portion, on the basis of said at least one operating condition detected by said operating condition detecting means, as well as on the basis of said degree of importance.

13. A facsimile system according to claim 12, wherein said recording portion comprises a toner supply for accommodating said toner, and said operating condition detecting means comprises a toner amount sensor for sensing an amount of said toner remaining in said toner supply, said mode selector means activating one of said non-toner-save control portion and said toner-save control portion depending upon whether said amount of the toner remaining in said toner supply is smaller than a predetermined threshold, as well as on the basis of said degree of importance.

14. A facsimile system according to claim 1, further comprising an indicator device for indicating that said toner-save recording mode is selected.

15. A facsimile system according to claim 14, wherein said indicator device comprises a display for providing an indication that said toner-save recording mode is selected.

16. A facsimile system according to claim 14, wherein said indicator device comprises a marking device for operating said recording portion to form a marking on said recording medium, said marking indicating that said toner-save image has been recorded in said toner-save recording mode..

* * * * *